(12) United States Patent
Costello et al.

(10) Patent No.: US 12,141,743 B2
(45) Date of Patent: Nov. 12, 2024

(54) SYSTEM FOR INVENTORY MANAGEMENT

(71) Applicant: RTC Industries, Inc., Rolling Meadows, IL (US)

(72) Inventors: Patrick Costello, Arlington Heights, IL (US); Stephen N. Hardy, Wadsworth, OH (US); Tony Dipaolo, Naperville, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 351 days.

(21) Appl. No.: 16/671,894

(22) Filed: Nov. 1, 2019

(65) Prior Publication Data
US 2020/0065755 A1    Feb. 27, 2020

Related U.S. Application Data

(63) Continuation of application No. 16/135,151, filed on Sep. 19, 2018, now Pat. No. 11,182,738, which is a
(Continued)

(51) Int. Cl.
*G06Q 10/08* (2024.01)
*A47F 1/00* (2006.01)
(Continued)

(52) U.S. Cl.
CPC ............ *G06Q 10/087* (2013.01); *A47F 1/00* (2013.01); *A47F 1/126* (2013.01); *A47F 5/0861* (2013.01); *G08B 13/1436* (2013.01); *G08B 13/1481* (2013.01); *G08B 13/149* (2013.01); *G09F 3/204* (2013.01); *G09F 3/208* (2013.01);
(Continued)

(58) Field of Classification Search
CPC .............. G06Q 10/087; G08B 13/1481; G08B 13/149; G08B 13/1436; H04W 4/35; A47F 2010/025
See application file for complete search history.

(56) References Cited

U.S. PATENT DOCUMENTS

| 154,940 A | 9/1874 | Adams |
| 355,511 A | 1/1887 | Danner |

(Continued)

FOREIGN PATENT DOCUMENTS

| AU | 2007233199 A1 | 10/2007 |
| BE | 906083 A2 | 4/1987 |

(Continued)

OTHER PUBLICATIONS

Apr. 2, 2014—(RU)—Office Action—App 2013109955.
(Continued)

*Primary Examiner* — Ko H Chan
(74) *Attorney, Agent, or Firm* — Michael Best & Friedrich LLP

(57) ABSTRACT

Sensor-equipped display management systems and methods that may be used to calculate a number of products removed from a display management system based upon motion of one or more mechanisms within the display management system. Additionally, the systems and methods may be used to detect patterns from the sensor data, which may be indicative of attempted theft of products stored within the display management system.

22 Claims, 58 Drawing Sheets

Related U.S. Application Data continuation-in-part of application No. 14/939,220, filed on Nov. 12, 2015, now Pat. No. 10,339,495.

(60) Provisional application No. 62/622,560, filed on Jan. 26, 2018, provisional application No. 62/560,498, filed on Sep. 19, 2017, provisional application No. 62/078,809, filed on Nov. 12, 2014.

(51) Int. Cl.
  A47F 1/12    (2006.01)
  A47F 5/08    (2006.01)
  G06Q 10/087  (2023.01)
  G08B 13/14   (2006.01)
  G09F 3/20    (2006.01)
  H04W 4/35    (2018.01)
  A47F 5/00    (2006.01)
  A47F 10/02   (2006.01)

(52) U.S. Cl.
  CPC ............... H04W 4/35 (2018.02); A47F 1/121 (2013.01); A47F 5/005 (2013.01); A47F 5/0869 (2013.01); A47F 2010/025 (2013.01)

(56) References Cited

U.S. PATENT DOCUMENTS

| | | |
|---|---|---|
| 632,231 A | 12/1905 | Blades |
| 808,067 A | 12/1905 | Briggs |
| 847,863 A | 3/1907 | Watts |
| 1,156,140 A | 10/1915 | Hair |
| 1,682,580 A | 8/1928 | Pratt |
| 1,703,987 A | 3/1929 | Butler |
| 1,712,080 A | 5/1929 | Kelly |
| 1,714,266 A | 5/1929 | Johnson |
| 1,734,031 A | 11/1929 | Carlston |
| 1,786,392 A | 12/1930 | Kemp |
| 1,964,597 A | 6/1934 | Rapellin |
| 1,971,749 A | 8/1934 | Hamilton |
| 1,991,102 A | 2/1935 | Kernaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,185,605 A | 1/1940 | Murphy |
| 2,218,444 A | 10/1940 | Vineyard |
| 2,499,088 A | 2/1950 | Brill |
| 2,516,122 A | 7/1950 | Hughes |
| 2,538,165 A | 1/1951 | Randtke |
| 2,555,102 A | 5/1951 | Anderson |
| 2,563,570 A | 8/1951 | Williams |
| 2,652,154 A | 9/1953 | Stevens |
| 2,670,853 A | 3/1954 | Schneider |
| 2,678,045 A | 5/1954 | Erhard |
| 2,732,952 A | 1/1956 | Skelton |
| 2,738,881 A | 3/1956 | Michel |
| 2,750,049 A | 6/1956 | Hunter |
| 2,775,365 A | 12/1956 | Mestman |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 2,964,154 A | 12/1960 | Erickson |
| 3,083,067 A | 3/1963 | Vos et al. |
| 3,103,396 A | 9/1963 | Portnoy |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,452,899 A | 7/1969 | Libberton |
| 3,481,482 A | 12/1969 | Wilkens |
| 3,497,081 A | 2/1970 | Field |
| 3,501,020 A | 3/1970 | Krikorian |
| D219,058 S | 10/1970 | Kaczur |
| 3,550,979 A | 12/1970 | Protzmann |
| 3,598,246 A | 8/1971 | Galli |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,724,715 A | 4/1973 | Auriemma |
| 3,751,129 A | 8/1973 | Wright et al. |
| 3,767,083 A | 10/1973 | Webb |
| 3,814,490 A | 6/1974 | Dean et al. |
| 3,815,519 A | 6/1974 | Meyer |
| 3,830,169 A | 8/1974 | Madey |
| 3,848,745 A | 11/1974 | Smith |
| 3,868,021 A | 2/1975 | Heinrich |
| 3,870,156 A | 3/1975 | O'Neill |
| 4,007,841 A | 2/1977 | Seipel |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,448,653 A | 5/1984 | Wegmann |
| 4,454,948 A | 6/1984 | Spamer |
| 4,460,096 A | 7/1984 | Ricci |
| 4,463,854 A | 8/1984 | MacKenzie |
| 4,467,927 A | 8/1984 | Nathan |
| 4,476,985 A | 10/1984 | Norberg et al. |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,762,235 A | 8/1988 | Howard et al. |
| 4,762,236 A | 8/1988 | Jackle, III et al. |
| 4,768,661 A | 9/1988 | Pfeifer |
| 4,775,058 S | 10/1988 | Yatsko |
| 4,776,472 A | 10/1988 | Rosen |
| 4,790,037 A | 12/1988 | Phillips |
| 4,809,856 A | 3/1989 | Muth |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,934,645 A | 6/1990 | Breslow |
| 4,954,697 A | 9/1990 | Kokubun et al. |
| 5,009,334 A | 4/1991 | Bodkins |
| 5,012,936 A | 5/1991 | Crum |
| 5,025,936 A | 6/1991 | Lamoureaux |
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |

(56) References Cited

U.S. PATENT DOCUMENTS

| | | |
|---|---|---|
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,172,314 A | 12/1992 | Poland et al. |
| 5,178,258 A | 1/1993 | Smalley et al. |
| 5,183,166 A | 2/1993 | Belokin, Jr. et al. |
| 5,190,186 A | 3/1993 | Yablans et al. |
| 5,203,463 A | 4/1993 | Gold |
| 5,215,199 A | 6/1993 | Bejarano |
| 5,240,126 A | 8/1993 | Foster et al. |
| 5,255,802 A | 10/1993 | Krinke et al. |
| 5,257,090 A | 10/1993 | Meinzer et al. |
| 5,265,738 A | 11/1993 | Yablans et al. |
| 5,316,154 A | 5/1994 | Hajec, Jr. |
| 5,341,945 A | 8/1994 | Gibson |
| 5,351,839 A | 10/1994 | Beeler et al. |
| 5,366,099 A | 11/1994 | Schmid |
| 5,381,908 A | 1/1995 | Hepp |
| 5,390,802 A | 2/1995 | Pappagallo et al. |
| 5,413,229 A | 5/1995 | Zuberbuhler et al. |
| 5,415,297 A | 5/1995 | Klein et al. |
| 5,448,226 A | 9/1995 | Failing, Jr. et al. |
| 5,450,969 A | 9/1995 | Johnson et al. |
| 5,458,248 A | 10/1995 | Alain |
| 5,464,105 A | 11/1995 | Mandeltort |
| 5,469,975 A | 11/1995 | Fajnsztajn |
| 5,469,976 A | 11/1995 | Burchell |
| 5,537,312 A | 7/1996 | Sekiguchi et al. |
| 5,542,552 A | 8/1996 | Yablans et al. |
| 5,548,282 A | 8/1996 | Escritt et al. |
| 5,562,217 A | 10/1996 | Salveson et al. |
| 5,613,621 A | 3/1997 | Gervasi et al. |
| D378,888 S | 4/1997 | Bertilsson |
| 5,615,780 A | 4/1997 | Nimetz et al. |
| 5,634,564 A | 6/1997 | Spamer et al. |
| 5,638,963 A | 6/1997 | Finnelly et al. |
| 5,665,304 A | 9/1997 | Heinen et al. |
| 5,671,362 A | 9/1997 | Cowe et al. |
| 5,671,851 A | 9/1997 | Johnson et al. |
| 5,673,801 A | 10/1997 | Markson |
| D386,363 S | 11/1997 | Dardashti |
| 5,685,664 A | 11/1997 | Parham et al. |
| 5,702,008 A | 12/1997 | Thalenfeld et al. |
| 5,711,432 A | 1/1998 | Stein et al. |
| 5,730,320 A | 3/1998 | David |
| 5,737,504 A | 4/1998 | Yamada |
| 5,738,019 A | 4/1998 | Parker |
| 5,740,944 A | 4/1998 | Crawford |
| 5,743,428 A | 4/1998 | Rankin, VI |
| 5,746,328 A | 5/1998 | Beeler et al. |
| 5,788,090 A | 8/1998 | Kajiwara |
| 5,803,276 A | 9/1998 | Vogler |
| 5,826,731 A | 10/1998 | Dardashti |
| 5,839,588 A | 11/1998 | Hawkinson |
| 5,855,283 A | 1/1999 | Johnson |
| 5,859,414 A | 1/1999 | Grimes et al. |
| 5,873,473 A | 2/1999 | Pater |
| 5,878,895 A | 3/1999 | Springs |
| 5,880,449 A | 3/1999 | Teicher et al. |
| 5,906,283 A | 5/1999 | Kump et al. |
| 5,933,813 A | 8/1999 | Teicher et al. |
| 5,963,134 A | 10/1999 | Bowers et al. |
| 5,971,204 A | 10/1999 | Apps |
| 5,992,652 A | 11/1999 | Springs |
| 5,992,653 A | 11/1999 | Anderson et al. |
| 6,006,678 A | 12/1999 | Merit et al. |
| 6,041,720 A | 3/2000 | Hardy |
| 6,076,670 A | 6/2000 | Yeranossian |
| 6,082,557 A | 7/2000 | Leahy |
| 6,082,558 A | 7/2000 | Battaglia |
| 6,089,385 A | 7/2000 | Nozawa |
| 6,105,004 A | 8/2000 | Halperin et al. |
| 6,105,791 A | 8/2000 | Chalson et al. |
| 6,112,938 A | 9/2000 | Apps |
| 6,124,851 A | 9/2000 | Jacobson |
| 6,129,218 A | 10/2000 | Henry et al. |
| 6,142,317 A | 11/2000 | Merl |
| 6,158,598 A | 12/2000 | Josefsson |
| 6,164,491 A | 12/2000 | Bustos et al. |
| 6,173,845 B1 | 1/2001 | Higgins et al. |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| 6,253,190 B1 | 6/2001 | Sutherland |
| D445,615 S | 7/2001 | Burke |
| 6,253,954 B1 | 7/2001 | Yasaka |
| 6,269,285 B1 | 7/2001 | Mignault |
| 6,289,326 B1 | 9/2001 | LaFleur |
| 6,357,606 B1 | 3/2002 | Henry |
| 6,378,727 B1 | 4/2002 | Dupuis et al. |
| 6,382,431 B1 | 5/2002 | Burke |
| 6,389,991 B1 | 5/2002 | Morrisson |
| 6,401,942 B1 | 6/2002 | Eckert |
| 6,405,880 B1 | 6/2002 | Webb |
| 6,409,026 B2 | 6/2002 | Watanabe |
| 6,409,027 B1 | 6/2002 | Chang et al. |
| 6,409,028 B2 | 6/2002 | Nickerson |
| 6,464,089 B1 | 10/2002 | Rankin, VI |
| 6,484,891 B2 | 11/2002 | Burke |
| 6,497,326 B1 | 12/2002 | Osawa |
| 6,497,367 B2 | 12/2002 | Conzola et al. |
| 6,507,352 B1 | 1/2003 | Cohen et al. |
| 6,523,664 B2 | 2/2003 | Shaw et al. |
| 6,523,703 B1 | 2/2003 | Robertson |
| 6,527,127 B2 | 3/2003 | Dumontet |
| 6,533,131 B2 | 3/2003 | Bada |
| 6,536,658 B1 | 3/2003 | Rantze |
| D472,411 S | 4/2003 | Burke |
| 6,550,674 B1 | 4/2003 | Neumark |
| 6,598,754 B2 | 7/2003 | Weiler |
| 6,622,874 B1 | 9/2003 | Hawkinson |
| 6,655,536 B2 | 12/2003 | Jo et al. |
| 6,666,533 B1 | 12/2003 | Stavros |
| D485,699 S | 1/2004 | Mueller et al. |
| 6,717,516 B2 | 4/2004 | Bridgelall |
| 6,738,628 B1 | 5/2004 | McCall et al. |
| 6,772,888 B2 | 8/2004 | Burke |
| 6,830,157 B2 | 12/2004 | Robertson et al. |
| 6,866,156 B2 | 3/2005 | Nagel et al. |
| 6,886,699 B2 | 5/2005 | Johnson et al. |
| 6,889,854 B2 | 5/2005 | Burke |
| 6,897,763 B2 | 5/2005 | Schulmerich et al. |
| 6,914,648 B2 | 7/2005 | Niiyama et al. |
| 6,948,900 B1 | 9/2005 | Neuman |
| 6,964,235 B2 | 11/2005 | Hardy |
| 7,002,451 B2 | 2/2006 | Freeman |
| 7,084,769 B2 | 8/2006 | Bauer et al. |
| 7,090,125 B2 | 8/2006 | Goel et al. |
| 7,093,546 B2 | 8/2006 | Hardy |
| 7,114,606 B2 | 10/2006 | Shaw et al. |
| 7,152,040 B1 | 12/2006 | Hawthorne et al. |
| 7,152,791 B2 | 12/2006 | Chappidi et al. |
| 7,155,238 B2 | 12/2006 | Katz |
| 7,216,770 B2 | 5/2007 | Mueller et al. |
| 7,252,230 B1 | 8/2007 | Sheikh et al. |
| 7,319,397 B2 | 1/2008 | Chung et al. |
| 7,400,251 B2 | 7/2008 | Czyszczewski et al. |
| 7,458,473 B1 | 12/2008 | Mason |
| 7,493,336 B2 | 2/2009 | Noonan |
| 7,520,429 B2 | 4/2009 | Koster |
| 7,526,762 B1 | 4/2009 | Astala et al. |
| 7,542,283 B1 | 6/2009 | Curran et al. |
| 7,565,108 B2 | 7/2009 | Kotola et al. |
| 7,580,845 B2 | 8/2009 | Burman et al. |
| 7,614,065 B2 | 11/2009 | Weissmueller, Jr. et al. |
| 7,641,057 B2 | 1/2010 | Mueller et al. |
| 7,675,422 B2 | 3/2010 | Stevens et al. |
| 7,686,185 B2 | 3/2010 | Zychinski |
| 7,743,984 B2 | 6/2010 | Olsen et al. |
| 7,768,399 B2 | 8/2010 | Hachmann et al. |
| 7,775,130 B2 | 8/2010 | Harish et al. |

(56) References Cited

U.S. PATENT DOCUMENTS

| | | |
|---|---|---|
| 7,775,430 B2 | 8/2010 | Lin |
| 7,792,711 B2 | 9/2010 | Swafford, Jr. et al. |
| 7,815,060 B2 | 10/2010 | Iellimo |
| 7,823,734 B2 | 11/2010 | Hardy |
| 7,837,106 B2 | 11/2010 | Fabre et al. |
| 7,853,477 B2 | 12/2010 | O'Shea et al. |
| 7,864,041 B2 | 1/2011 | Godlewski |
| 7,896,172 B1 | 3/2011 | Hester |
| 7,904,333 B1 | 3/2011 | Perkowski |
| 7,982,622 B2 | 7/2011 | Burchell et al. |
| 8,047,385 B2 | 11/2011 | Hardy |
| 8,089,357 B2 | 1/2012 | Irmscher et al. |
| 8,135,482 B2 | 3/2012 | Caldwell et al. |
| 8,144,245 B2 | 3/2012 | Vik |
| 8,171,142 B2 | 5/2012 | Kolin et al. |
| 8,184,005 B2 | 5/2012 | Kamel |
| 8,207,819 B2 | 6/2012 | Bonner et al. |
| 8,219,558 B1 | 7/2012 | Trandal et al. |
| 8,231,017 B2 | 7/2012 | Clontz et al. |
| 8,255,500 B2 | 8/2012 | Cacheria, III et al. |
| 8,280,784 B2 | 10/2012 | Hurtis et al. |
| 8,284,059 B2 | 10/2012 | Ross |
| 8,284,061 B1 | 10/2012 | Dione |
| 8,312,999 B2 | 11/2012 | Hardy |
| 8,321,302 B2 | 11/2012 | Bauer et al. |
| 8,322,544 B2 | 12/2012 | Hardy |
| 8,342,340 B2 | 1/2013 | Rataiczak, III et al. |
| 8,376,154 B2 | 2/2013 | Sun |
| 8,410,931 B2 | 4/2013 | Petite et al. |
| 8,463,431 B2 | 6/2013 | Segal et al. |
| 8,489,452 B1 | 7/2013 | Warner et al. |
| 8,534,469 B2 | 9/2013 | Northrup, Jr. et al. |
| 8,602,224 B2 | 12/2013 | Casey |
| 8,629,772 B2 | 1/2014 | Valiulis et al. |
| 8,655,795 B1 * | 2/2014 | Kolchin ............... G06Q 10/047 |
| | | 705/341 |
| 8,662,325 B2 | 3/2014 | Davis et al. |
| 8,698,606 B2 | 4/2014 | Choi et al. |
| 8,739,984 B2 | 6/2014 | Hardy |
| 8,751,318 B2 | 6/2014 | Kim et al. |
| 8,781,622 B2 | 7/2014 | Mockus et al. |
| 8,810,392 B1 | 8/2014 | Teller et al. |
| 8,823,521 B2 * | 9/2014 | Overhultz ............... G07F 9/026 |
| | | 340/568.1 |
| 8,844,431 B2 | 9/2014 | Davis et al. |
| 8,978,904 B2 | 3/2015 | Hardy |
| 9,072,394 B2 * | 7/2015 | Hardy .................. A47B 57/581 |
| 9,167,913 B2 * | 10/2015 | Hardy .................... A47F 3/002 |
| 9,167,916 B2 | 10/2015 | Grant et al. |
| 9,275,361 B2 | 3/2016 | Meyer |
| 9,318,007 B2 | 4/2016 | Valiulis et al. |
| 9,318,008 B2 | 4/2016 | Valiulis et al. |
| 9,468,315 B2 | 10/2016 | Ha et al. |
| 9,576,417 B2 * | 2/2017 | Christianson ........... G07F 9/026 |
| 9,697,709 B2 | 7/2017 | King et al. |
| 9,706,857 B2 | 7/2017 | Hardy et al. |
| 9,820,587 B1 | 11/2017 | Cheng et al. |
| 9,898,712 B2 | 2/2018 | Johnson et al. |
| 10,007,892 B1 | 6/2018 | Jahn et al. |
| 10,210,478 B2 | 2/2019 | Johnson et al. |
| 10,262,293 B1 | 4/2019 | Prater et al. |
| 10,271,666 B2 | 4/2019 | Taylor et al. |
| 10,334,964 B2 | 7/2019 | Hachmann |
| 10,410,277 B2 | 9/2019 | Bynum et al. |
| 10,420,427 B2 | 9/2019 | Hachmann |
| 2001/0010302 A1 | 8/2001 | Nickerson |
| 2001/0017284 A1 | 8/2001 | Watanabe |
| 2001/0051901 A1 | 12/2001 | Hager et al. |
| 2002/0036178 A1 | 3/2002 | Tombu |
| 2002/0108916 A1 | 8/2002 | Nickerson |
| 2002/0148794 A1 | 10/2002 | Marihugh |
| 2002/0158133 A1 | 10/2002 | Conzola et al. |
| 2002/0170866 A1 | 11/2002 | Johnson et al. |
| 2002/0178013 A1 | 11/2002 | Hoffman et al. |
| 2003/0000956 A1 | 1/2003 | Maldonado |
| 2003/0010732 A1 | 1/2003 | Burke |
| 2003/0053014 A1 | 3/2003 | Niiyama et al. |
| 2003/0055727 A1 | 3/2003 | Walker et al. |
| 2003/0057167 A1 | 3/2003 | Johnson et al. |
| 2003/0061973 A1 | 4/2003 | Bustos |
| 2003/0078691 A1 | 4/2003 | Holt et al. |
| 2003/0085187 A1 | 5/2003 | Johnson et al. |
| 2003/0106867 A1 | 6/2003 | Caterinacci |
| 2003/0141265 A1 | 7/2003 | Jo et al. |
| 2003/0150829 A1 | 8/2003 | Linden et al. |
| 2003/0193481 A1 | 10/2003 | Sokolsky |
| 2003/0217980 A1 | 11/2003 | Johnson et al. |
| 2003/0233288 A1 | 12/2003 | Sweeney et al. |
| 2004/0104239 A1 | 6/2004 | Black et al. |
| 2004/0118795 A1 | 6/2004 | Burke |
| 2004/0119681 A1 | 6/2004 | Albert et al. |
| 2004/0140278 A1 | 7/2004 | Mueller et al. |
| 2004/0140279 A1 | 7/2004 | Mueller et al. |
| 2004/0145451 A1 | 7/2004 | Failing |
| 2004/0178156 A1 | 9/2004 | Knorring et al. |
| 2004/0245197 A1 | 12/2004 | McElvaney |
| 2004/0260572 A1 | 12/2004 | George et al. |
| 2005/0033645 A1 | 2/2005 | DuPhily et al. |
| 2005/0040123 A1 | 2/2005 | Ali |
| 2005/0077259 A1 | 4/2005 | Menz |
| 2005/0086133 A1 | 4/2005 | Scherer et al. |
| 2005/0092702 A1 | 5/2005 | Nagel |
| 2005/0108098 A1 | 5/2005 | Syed et al. |
| 2005/0131578 A1 | 6/2005 | Weaver |
| 2005/0165649 A1 | 7/2005 | Mahaffey et al. |
| 2005/0168345 A1 | 8/2005 | Swafford et al. |
| 2005/0190072 A1 | 9/2005 | Brown et al. |
| 2005/0195081 A1 | 9/2005 | Studnicki et al. |
| 2005/0228718 A1 | 10/2005 | Austin |
| 2005/0279722 A1 | 12/2005 | Ali |
| 2006/0049122 A1 | 3/2006 | Mueller et al. |
| 2006/0071774 A1 | 4/2006 | Brown et al. |
| 2006/0102718 A1 | 5/2006 | Kajino et al. |
| 2006/0131401 A1 | 6/2006 | Do et al. |
| 2006/0157431 A1 | 7/2006 | Nagelski et al. |
| 2006/0163272 A1 | 7/2006 | Gamble |
| 2006/0163349 A1 | 7/2006 | Neugebauer |
| 2006/0186064 A1 | 8/2006 | Merit et al. |
| 2006/0237381 A1 | 10/2006 | Lockwood et al. |
| 2006/0279527 A1 | 12/2006 | Zehner et al. |
| 2006/0289637 A1 | 12/2006 | Brice et al. |
| 2007/0016494 A1 | 1/2007 | Brown et al. |
| 2007/0024551 A1 | 2/2007 | Gelbman |
| 2007/0034581 A1 | 2/2007 | Weck et al. |
| 2007/0095903 A1 | 5/2007 | Suenbuel |
| 2007/0159298 A1 | 7/2007 | Zegelin et al. |
| 2007/0194037 A1 | 8/2007 | Close |
| 2007/0278164 A1 | 12/2007 | Lang et al. |
| 2007/0283615 A1 | 12/2007 | Mastakis et al. |
| 2007/0289344 A1 | 12/2007 | Fawcett et al. |
| 2008/0074264 A1 | 3/2008 | Sharpe et al. |
| 2008/0136647 A1 | 6/2008 | Brown |
| 2008/0142458 A1 | 6/2008 | Medcalf |
| 2008/0164310 A1 | 7/2008 | Dupuy et al. |
| 2008/0208695 A1 | 8/2008 | Condron |
| 2008/0228346 A1 | 9/2008 | Lucas et al. |
| 2008/0249658 A1 | 10/2008 | Walker et al. |
| 2008/0250464 A1 | 10/2008 | Masucci et al. |
| 2008/0255894 A1 | 10/2008 | Falls et al. |
| 2008/0303637 A1 | 12/2008 | Gelbman et al. |
| 2009/0020548 A1 | 1/2009 | VanDruff |
| 2009/0084812 A1 | 4/2009 | Kirschner |
| 2009/0095695 A1 | 4/2009 | Moock et al. |
| 2009/0101606 A1 | 4/2009 | Olson |
| 2009/0133301 A1 | 5/2009 | Saxena et al. |
| 2009/0134103 A1 | 5/2009 | Saxena et al. |
| 2009/0139945 A1 | 6/2009 | Jacobson et al. |
| 2009/0157515 A1 | 6/2009 | Lafauci et al. |
| 2009/0179825 A1 | 7/2009 | Enarvi et al. |
| 2009/0248198 A1 | 10/2009 | Siegel et al. |
| 2009/0287992 A1 | 11/2009 | Bresolin et al. |
| 2009/0313365 A1 | 12/2009 | Whitehead |
| 2009/0319399 A1 | 12/2009 | Resta et al. |
| 2010/0017025 A1 | 1/2010 | Lockwood et al. |

(56) References Cited

U.S. PATENT DOCUMENTS

| | | |
|---|---|---|
| 2010/0072152 A1 | 3/2010 | Kim |
| 2010/0100460 A1 | 4/2010 | Aronson |
| 2010/0106588 A1 | 4/2010 | Jones et al. |
| 2010/0106662 A1 | 4/2010 | Ramaswamy |
| 2010/0108624 A1 | 5/2010 | Sparkowski |
| 2010/0133214 A1 | 6/2010 | Evans |
| 2010/0138304 A1 | 6/2010 | Boyarsky et al. |
| 2010/0169189 A1 | 7/2010 | Allison et al. |
| 2010/0169190 A1 | 7/2010 | Allison et al. |
| 2010/0175438 A1 | 7/2010 | Sankey |
| 2010/0176075 A1 | 7/2010 | Nagel et al. |
| 2010/0200526 A1 | 8/2010 | Barkdoll |
| 2010/0205045 A1 | 8/2010 | Zhang et al. |
| 2010/0206829 A1 | 8/2010 | Clements et al. |
| 2010/0258513 A1 | 10/2010 | Meyer et al. |
| 2010/0262554 A1 | 10/2010 | Elliott |
| 2010/0276383 A1 | 11/2010 | Hardy |
| 2011/0010271 A1 | 1/2011 | Black et al. |
| 2011/0017532 A1 | 1/2011 | Langford et al. |
| 2011/0018685 A1 | 1/2011 | Tanaka et al. |
| 2011/0022980 A1 | 1/2011 | Segal et al. |
| 2011/0106624 A1 | 5/2011 | Bonner et al. |
| 2011/0106653 A1 | 5/2011 | Wein |
| 2011/0128378 A1 | 6/2011 | Raji |
| 2011/0161146 A1 | 6/2011 | Walker et al. |
| 2011/0178863 A1 | 7/2011 | Daigle |
| 2011/0215060 A1 | 9/2011 | Niederhuefner |
| 2011/0234514 A1 | 9/2011 | Gothard |
| 2011/0251920 A1 | 10/2011 | Watson |
| 2011/0304316 A1 | 12/2011 | Hachmann et al. |
| 2012/0000869 A1 | 1/2012 | Hardy |
| 2012/0004769 A1 | 1/2012 | Hallenbeck et al. |
| 2012/0044056 A1 | 2/2012 | Byun et al. |
| 2012/0120327 A1 | 5/2012 | Marx et al. |
| 2012/0147055 A1 | 6/2012 | Pallakoff et al. |
| 2012/0204458 A1 | 8/2012 | Goehring |
| 2012/0223943 A1 | 9/2012 | Williams et al. |
| 2012/0228240 A1 | 9/2012 | Gentile et al. |
| 2012/0245969 A1 | 9/2012 | Campbell |
| 2012/0246023 A1 | 9/2012 | Starr |
| 2012/0273442 A1 | 11/2012 | Hardy |
| 2012/0280810 A1 | 11/2012 | Wheeler |
| 2012/0284085 A1 | 11/2012 | Walker et al. |
| 2012/0284132 A1 | 11/2012 | Kim et al. |
| 2012/0286937 A1 | 11/2012 | Cote et al. |
| 2012/0330781 A1 | 12/2012 | Borrero |
| 2013/0002422 A1 | 1/2013 | Wiese et al. |
| 2013/0024023 A1 | 1/2013 | Siegel et al. |
| 2013/0030953 A1 | 1/2013 | Marsic |
| 2013/0037562 A1 | 2/2013 | Close |
| 2013/0041752 A1 | 2/2013 | Crum |
| 2013/0057404 A1 | 3/2013 | Thibault |
| 2013/0109323 A1 | 5/2013 | Ruutu et al. |
| 2013/0132216 A1 | 5/2013 | Aihara et al. |
| 2013/0141240 A1 | 6/2013 | Valiulis et al. |
| 2013/0157569 A1 | 6/2013 | Torvmark et al. |
| 2013/0210360 A1 | 8/2013 | Ljung et al. |
| 2013/0214909 A1 | 8/2013 | Meijers et al. |
| 2013/0226742 A1 | 8/2013 | Johnson et al. |
| 2013/0235206 A1 | 9/2013 | Smith et al. |
| 2013/0275261 A1 | 10/2013 | Yoked |
| 2013/0317903 A1 | 11/2013 | Majrani |
| 2013/0332271 A1 | 12/2013 | Hay |
| 2014/0006225 A1 | 1/2014 | Bowman et al. |
| 2014/0006229 A1 | 1/2014 | Birch et al. |
| 2014/0043162 A1 | 2/2014 | Siciliano et al. |
| 2014/0055243 A1 | 2/2014 | Kerai |
| 2014/0100769 A1 | 4/2014 | Wurman et al. |
| 2014/0100999 A1 | 4/2014 | Mountz et al. |
| 2014/0110584 A1 | 4/2014 | Campbell |
| 2014/0113560 A1 | 4/2014 | Graube et al. |
| 2014/0139548 A1 | 5/2014 | Byers |
| 2014/0145828 A1 | 5/2014 | Bassan-Eskenazi et al. |
| 2014/0197953 A1* | 7/2014 | Valiulis ................ A47F 5/0861 340/568.8 |
| 2014/0201042 A1 | 7/2014 | Meyer |
| 2014/0210692 A1 | 7/2014 | Waters et al. |
| 2014/0214195 A1 | 7/2014 | Worsley |
| 2014/0220883 A1 | 8/2014 | Emigh et al. |
| 2014/0239061 A1 | 8/2014 | Smith et al. |
| 2014/0247116 A1 | 9/2014 | Davidson |
| 2014/0258028 A1 | 9/2014 | Bynum et al. |
| 2014/0268949 A1 | 9/2014 | Kayser |
| 2014/0291405 A1 | 10/2014 | Harkes |
| 2014/0299620 A1 | 10/2014 | Swafford, Jr. et al. |
| 2014/0299663 A1 | 10/2014 | Shah et al. |
| 2014/0305891 A1 | 10/2014 | Vogler et al. |
| 2014/0316561 A1 | 10/2014 | Tkachenko et al. |
| 2014/0316916 A1 | 10/2014 | Hay |
| 2014/0352372 A1 | 12/2014 | Grant et al. |
| 2014/0360953 A1 | 12/2014 | Pichel |
| 2015/0039477 A1 | 2/2015 | O'Neil |
| 2015/0088306 A1 | 3/2015 | Varrasso |
| 2015/0090675 A1 | 4/2015 | Vosshernrich |
| 2015/0091729 A1 | 4/2015 | Phillips et al. |
| 2015/0112827 A1 | 4/2015 | Davis et al. |
| 2015/0186982 A1 | 7/2015 | Higgins et al. |
| 2015/0356657 A1 | 12/2015 | Pas |
| 2015/0356666 A1 | 12/2015 | Pas et al. |
| 2015/0382150 A1 | 12/2015 | Ansermet et al. |
| 2016/0048798 A1 | 2/2016 | Meyer et al. |
| 2016/0132822 A1 | 5/2016 | Swafford |
| 2016/0132823 A1 | 5/2016 | Swafford et al. |
| 2016/0132949 A1 | 5/2016 | Adoni et al. |
| 2017/0024756 A1 | 1/2017 | Hulth |
| 2017/0061525 A1 | 3/2017 | McCoy et al. |
| 2020/0351474 A1* | 11/2020 | Gaudiano Del Bosque ................ G08B 13/19695 |

FOREIGN PATENT DOCUMENTS

| | | |
|---|---|---|
| BE | 1008382 A3 | 4/1996 |
| CA | 2693874 A1 | 7/2011 |
| CA | 2822926 A1 | 2/2014 |
| CA | 2822926 C | 3/2018 |
| CH | 223095 A | 8/1942 |
| CH | 412251 A | 4/1966 |
| CN | 1787003 A | 6/2006 |
| CN | 1906644 A | 1/2007 |
| CN | 1972228 A | 5/2007 |
| CN | 101208718 A | 6/2008 |
| CN | 101472509 A | 7/2009 |
| CN | 101507380 A | 8/2009 |
| CN | 103703476 A | 4/2014 |
| CN | 107105905 A | 8/2017 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 A1 | 12/1979 |
| DE | 3116145 A1 | 11/1982 |
| DE | 8308485 U1 | 9/1983 |
| DE | 3211880 A1 | 10/1983 |
| DE | 8426651 U1 | 2/1985 |
| DE | 8520125 U1 | 1/1986 |
| DE | 3628609 A1 | 2/1988 |
| DE | 4307082 A1 | 9/1994 |
| DE | 19745813 A1 | 4/1999 |
| DE | 299026888 | 7/1999 |
| DE | 102004037365 A1 | 3/2006 |
| DE | 102006061135 A1 | 6/2008 |
| EP | 0004921 A1 | 10/1979 |
| EP | 0018003 A2 | 10/1980 |
| EP | 0048479 A1 | 3/1982 |
| EP | 0176209 A2 | 4/1986 |
| EP | 0224107 A2 | 6/1987 |
| EP | 270016 A2 | 6/1988 |
| EP | 298500 A2 | 1/1989 |
| EP | 0337340 A2 | 10/1989 |
| EP | 0408400 A1 | 1/1991 |
| EP | 0454586 A1 | 10/1991 |
| EP | 0572119 A2 | 12/1993 |
| EP | 0587059 A2 | 3/1994 |

(56) References Cited

FOREIGN PATENT DOCUMENTS

| | | |
|---|---|---|
| EP | 0806749 A1 | 11/1997 |
| EP | 986980 A1 | 3/2000 |
| EP | 0779047 B1 | 4/2000 |
| EP | 1057164 A1 | 12/2000 |
| EP | 1249804 A2 | 10/2002 |
| EP | 1356425 A1 | 10/2003 |
| EP | 1395152 A1 | 3/2004 |
| EP | 1973034 A2 | 9/2008 |
| EP | 2309377 A1 | 4/2011 |
| EP | 2367101 A1 | 9/2011 |
| FR | 2385365 A1 | 10/1978 |
| FR | 2526338 A1 | 11/1983 |
| FR | 2617385 A1 | 1/1989 |
| FR | 2859364 A1 | 3/2005 |
| GB | 697994 A | 10/1953 |
| GB | 740311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | 2180527 A | 4/1987 |
| GB | 2 232 398 A | 12/1990 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2480462 A | 11/2011 |
| JP | 54168195 | 11/1979 |
| JP | 59218113 | 8/1984 |
| JP | 62060521 A | 3/1987 |
| JP | 6329463 | 2/1988 |
| JP | 6056224 | 3/1994 |
| JP | 6209945 | 7/1994 |
| JP | 7257714 | 9/1994 |
| JP | H07-017608 A | 1/1995 |
| JP | H11342054 A | 12/1999 |
| JP | 2007525393 A | 9/2007 |
| JP | 2007-284238 A | 11/2007 |
| JP | 2012-058854 A | 3/2012 |
| JP | 2012-089140 A | 5/2012 |
| KP | 10-2005-0066397 | 6/2005 |
| KR | 1020040089123 A | 10/2004 |
| KR | 10-2005-0066397 A | 6/2005 |
| KR | 1020060123497 | 6/2008 |
| KR | 1020090054501 | 12/2010 |
| KR | 1020100022890 | 8/2011 |
| KR | 1020100041969 | 11/2011 |
| KR | 10-1507380 B1 | 4/2015 |
| NL | 106617 A | 11/1963 |
| NO | 2007073334 A1 | 6/2007 |
| RU | 2101731 C1 | 1/1998 |
| SE | 394537 B | 6/1977 |
| SU | 1600615 A3 | 10/1990 |
| WO | 91/15141 A1 | 10/1991 |
| WO | 9311449 A1 | 6/1993 |
| WO | 0061438 A1 | 10/2000 |
| WO | 0071004 A1 | 11/2000 |
| WO | 02/091885 A1 | 11/2002 |
| WO | 03016938 A2 | 2/2003 |
| WO | 2003032775 | 4/2003 |
| WO | 03039301 A1 | 5/2003 |
| WO | 2004104951 A1 | 12/2004 |
| WO | 2005033645 A1 | 4/2005 |
| WO | 2005057444 A1 | 6/2005 |
| WO | 2006023954 A2 | 3/2006 |
| WO | 06133487 A1 | 12/2006 |
| WO | 2007024639 A2 | 3/2007 |
| WO | 07140800 A1 | 12/2007 |
| WO | 2007149967 A2 | 12/2007 |
| WO | 10082835 A1 | 7/2010 |
| WO | 10137883 A2 | 12/2010 |
| WO | 11001024 | 1/2011 |
| WO | 2011089452 A1 | 7/2011 |
| WO | 2012095825 A2 | 7/2012 |
| WO | 2012166613 A1 | 12/2012 |
| WO | 14080252 A1 | 5/2014 |
| WO | 2014/144631 A2 | 9/2014 |

OTHER PUBLICATIONS

Sep. 5, 2013—(US)—Office Action—U.S. Appl. No. 12/876,919.
FFrR Yellow pp. 02003 Product Catalog, "Merchandising Ideas Made Easy for Every Retail Environment!", Cover p. 9-11, 48-49, 52-58, Back Cover.
Letter from Maria Comninou of Harness Dickey to Stephanie Knapp dated Nov. 11, 2009.
Document entitled "Relevant Prior Art for U.S. Appl. No. 10/772,010".
Shelf-edge digital price tags invade the South of France http://www.digitalsignagetoday.com/article/196299/Shelf-edge-digital-price-tags-invade-the-South-of-France.
ESignage http://www.episys.com/page/25/esignage.htm.
Electronic Shelf-Edge Labels ("Realprice system") http://www.hitech-LCD.com/ESL.html.
Segmented Dot Matrix Electronic Shelf Label â€"SM Model and Segmented Dot Matrix Electronic Narrow Facing Label â€" MM http://www.ilid.com.au/product-range.php#sm.
Electronic Shelf-Edge Labels http://www.fujitsu.com/downloads/EU/uk/pdf/industries/retail/retail-solutions-electronic-self-edge-labels.pdf.
The NZ ESL range from pricer http://www.electronicshelflabelling.co.nz/products/.
Retailer introduces electronic shelf-edge labelling http://www.conveniencestore.co.uk/news/retailer-introduces-electronic-shelf-edge-labelling/231511.article.
Revolutionary Shelf Edge Displays from in the UK http://crystal-display.com/digital-signage/shelf-edge-displays/.
XDS-1068: 10-inch All-in-One Multi-touch Signboard with Power-over-Ethernet http://www.iadea.com/product/xds-1068.
ZBD Solutions, Shelf Edge Labelling http://www.zbdsolutions.com/solutions/index.html (printed Jan. 29, 2013).
Vectron, Speedy POS Solutions to make ezi-profits. 15 pages.
"How physics drives the supermarket industry," IOP Institute of Physics, Physicsworks. 4 pages.
John Ross, "Retail technology and the evolving shopper," Shopper Sciences. 11 pages.
Altierre Digital Retail, Altierre Corp., "Altierre Unveils E-Paper Product Family For Digital Signs and Price Tags." 2 pages, http://www.altierre.com/pr_e-paper.html (printed Jan. 31, 2013).
Suzanne Vita Palazzo, "New life for ESLs?, Advanced capabilities being built into electronic shelf labels may help overcome retailers' concerns about ROI.", Grocery Headquarters (www.groceryheadquarters.com), Mar. 2007, pp. 97-100.
Scott D. Walkins & Megan E. Henriksen of Anderson Economic Group, LLC, "Michigan's Item Pricing Law: The Price Tag for Retailers and Consumers," Dec. 11, 2010 (http://www.AndersonElectronicGroup.com) 39 pages.
"Product Range :: I LID—The next generation in electronic shelf labels," : http://www.ilid.com.au/product-range.php, printed on Mar. 5, 2013, dale of website unknown but prior to the filing of the present matter.
"Electronic Shelf Label controlling various information in real lime (ESL)," hllp:l/cesl.co.kr/eng/product-introduction/cest-esl.hlml, CEST—Center for Embedded Software Technology, printed on Mar. 5, 2013, dale of website unknown out prior to the filing of the present matter.
Jun. 24, 2014—(MX)—Office Action—App MX/a/2013/001455—Eng Tran.
Mar. 3, 2015—(AU) Office Action—App 2011285929.
Mar. 3, 2015—(AU) Office Action—App 2013205058.
Apr. 6, 2015—(PCT) International Search Report—App PCT/US14/29124.
Dec. 14, 2015—(EP) Exam Report—App 11745636.8.
Apr. 19, 2016—(KR) Office Action—App 10-2015-7027591.
Apr. 22, 2016—(PCT)—International Search Report—App PCT/US2015/060404.

(56) References Cited

OTHER PUBLICATIONS

Apr. 22, 2016 (PCT) ISR and Written Opinion—App PCT/US2015/060404.
Jun. 22, 2016—(AU) Search Report—App 2014225837.
Jun. 28, 2016—(AU) Examination Report—App 2014228923.
Aug. 18, 2016—(EP) Office Action—App 14716461.0.
Jun. 10, 2014—(PCT) ISR & Written Opinion—App PCT/US2014/020797.
Sep. 19, 2016—(PCT) International Search Report—App PCT/US2016/032328.
Robertson, "Food Packaging: Principles and Practice, Second Edition", CRC Press, XP055301114, ISBN: 978-0-8493-3775-8, vol. 0, p. 308, dated Sep. 22, 2005.
George Coulouris et al., "Distributed Systems: Concepts and Design (5th Edition)", Addison-Wesley, US, XP055261658, ISBN: 978-0-13-214301-1 pp. Ch01-Ch06, Ch09-Ch10, ch13,, Chapters 1, 3 and 19, dated May 7, 2011.
Oct. 27, 2016—(KR) Final Rejection—App 10-2015-7027591.
Nov. 18, 2016—(US) Final Office Action—U.S. Appl. No. 14/308,989.
Jul. 10, 2013—(US) Non-Final Office Action—U.S. Appl. No. 13/194,649.
Jan. 15, 2014—(US) Final Office Action—U.S. Appl. No. 13/194,649.
Jan. 3, 2014—(US) Final Office Action—U.S. Appl. No. 12/876,919.
Mar. 4, 2008—(US) Non-Final Office Action—U.S. Appl. No. 10/772,010.
Sep. 3, 2008—(US) Final Office Action—U.S. Appl. No. 10/772,010.
Mar. 9, 2009—(US) Non-Final Office Action—U.S. Appl. No. 10/772,010.
Aug. 19, 2009—(US) Final Office Action—U.S. Appl. No. 10/772,010.
Feb. 2, 2010—(US) Non-Final Office Action—U.S. Appl. No. 10/772,010.
Jun. 2, 2010—(US) Final Office Office Action—U.S. Appl. No. 10/772,010.
Oct. 7, 2015—(US) Non-Final Office Action—U.S. Appl. No. 14/308,989.
Jun. 2, 2020—(KR) Office Action—App. No. 10-2020-7002962.
Jul. 14, 2020—(EP) Office Action—App. No. 17177125.6.
Jun. 29, 2020—(CN) Third Office Action (w/translation)—App 201580072899.0.
Jan. 28, 2021—(AU) Office Action—AU 2018336797.
Dec. 2, 2020—(CN) First Office Action—CN 2018800734745.
Dec. 10, 2020—(KR) Office Action—App. No. 10-2020-7002962.
McAndrew, Sean T., et al., "Potential use of real-time data capture and job-tracking technology in the field," Facilities 2005, 23, pp. 31-46.
May 20, 2021—(AU) Examination Report—App 2020203256.
Jan. 5, 2021—(AU) Examination Report—App 2019271906.
Jan. 14, 2021—(CN) Notice of Re-examination—App 201480024831.0.
Jan. 27, 2021—(EP) Office Action—EP18783266.2.
Feb. 10, 2021—(AU) First Examination Report—App 2020203256.
Nov. 15, 2019—(WO) International Search Report and Written Opinion—PCT/US2019/051724.
Mar. 26, 2021—(EP) Second Office Action—App. No. 17177125.6.
Mar. 23, 2021—(WO) IPRP and Written Opinion—App. No. PCT/US2019/051724.
May 4, 2016—(US) Non-Final Office Action—U.S. Appl. No. 14/308,989.
Dec. 15, 2016—(US) Final Office Action—U.S. Appl. No. 13/836,680.
Jun. 2, 2016—(US) Non-Final Office Action—U.S. Appl. No. 13/836,680.
Sep. 23, 2014—(US) Non-Final Office Action—U.S. Appl. No. 13/836,680.
Mar. 24, 2015—(US) Non-Final Office Action—U.S. Appl. No. 13/836,680.
Dec. 14, 2015—(EP) Examination Report—U.S. Appl. No. 11/745,636.
Mar. 20, 2008—(WO) ISR and Written Opinion—App. No. PCT/US05/02836.
Jan. 28, 2011—(EP) Supplementary Search Report—App. No. 05712322.6-2221.
Dec. 6, 2011—(EP) Office Action—App. No. 05712322.6-2221.
May 25, 2011—(EP) Office Action—App. No. 05712322.6-2221.
Nov. 24, 2011—(WO) ISR and Written Opinion—App. No. PCT/US2011/046209.
Feb. 21, 2013—(WO) IPR and Written Opinion—App. No. PCT/US2011/046209.
Apr. 2, 2014—(RU) Office Action—App. No. 2013109955.
Sep. 24, 2015—(WO) IPRP and Written Opinion—App. No. PCT/US2014/29124.
Apr. 6, 2015—(WO) Written Opinion—App. No. PCT/US2014/29124.
Mar. 1, 2017—(AU) Second Office Action—App. No. 2014228923.
Aug. 19, 2016—(EP) Extended ESR—App. No. 14723571.7-1903.
Apr. 6, 2015—(WO) ISR—App. No. PCT/US2014/29124.
Jun. 19, 2017—(CN) First Office Action and ISR—App. No. 201480026575.9.
Jun. 7, 2017—(CN) ISR—App. No. 201480026575.9.
Jul. 18, 2017—(KR) Office Action—App. 10-2015-7029832.
Sep. 7, 2017—(US)—Final Office Action—U.S. Appl. No. 14/591,421.
Nov. 7, 2017—(EP) Extended Search Report—App. No. 17177125.6.
Nov. 7, 2017—(EP)—Communication 94(3) EPC—App 14716461.0.
Nov. 28, 2017 (US)—Non-Final Office Action—U.S. Appl. No. 14/713,809.
Feb. 23, 2018—(CN) Second Office Action—App. No. 201480026575.9.
Mar. 14, 2018—(EP) Communication Pursuant to Article 94(3) EPC—App 15798644.9.
Apr. 6, 2018—(KR) Office Action—App 10-2017-7015819.
Jan. 18, 2018—(AU) Examination Report—App 2015346254.
Apr. 2, 2018—(CN) First Office Action—App 201480024831.0.
May 30, 2018—(AU) Examination Report—App 2015346254.
Jul. 26, 2018 (US)—Non-Final Office Action—U.S. Appl. No. 14/939,220.
Jul. 6, 2018—(CN) Third Office Action—App 201480026575.9.
FFr Yello pp. 02003 Product Catalog, "Merchandising Ideas Made Easy for Every Retail Environment!", Cover p. 9-11, 48-49, 52-58, Back Cover.
Oct. 28, 2018—(KR) Final Rejection—App 10-2017-7015819.
Dec. 17, 2018—(US) Final Office Action—U.S. Appl. No. 14/591,421.
Dec. 26, 2018—(KR) Notice of Allowance—App 10-2017-7015819.
Jan. 11, 2019—(KR) Notice of Allowance—App 10-2015-7027591.
Jan. 31, 2019—(CN)—Second Office Action—App 201480024831.0.
Feb. 11, 2019—(KR) Office Action—App 10-2017-736152.
Mar. 15, 2019—(EP) Extended Europen Search Report and European Search Opinion—App 19153057.5.
Jan. 10, 2019—(WO) International Search Report and Written Opinion—App. No. PCT/US2018/051775.
Apr. 22, 2019—(KR) Office Action—App. No. 10-2018-7015060.
Jun. 14, 2019—(EP) Partial European Search Report—App 19158063.8.
Jul. 5, 2019—(CN) Office Action—App. No. 201580072899.0.
Jul. 30, 2019—(EP) Examination Report—App 16744914.9.
Iddo Genuth, "The Future of Electronic Paper," Oct. 15, 2007, XP002513292, Down oaded from http://thefutureofthings.com/articles/1000/the-future-of-eloectornic-paper.html, 7 pages.
Aug. 28, 2019—(AU) First Examination Report—App 2018241074.
Aug. 16, 2019—(CN) Third Office Action—App 201480024831.0.
Nov. 5, 2019—(AU) Second Examination Report—App 2018241074.
Nov. 27, 2019—(KR) Office Action—App 10-2017-7036152.
Jan. 7, 2020—(CN) Rejection Decision—App 201480024831.0.
https://smartshelf.com/retail_solutions.html#led.
https://www.youtube.com/watch?v=ULucc1ZVBnM&feature=youtu.be.
Oct. 15, 2020—(EP) Office Action—App 16744914.9.
Brazilian Patent Office Action for Application No. BR112021004525-2 dated Jun. 20, 2023 (5 pages).

(56) References Cited

OTHER PUBLICATIONS

Chinese Patent Office First Office Action for application 201980074582.9, dated Feb. 7, 2023 (31 pages with translation).

* cited by examiner

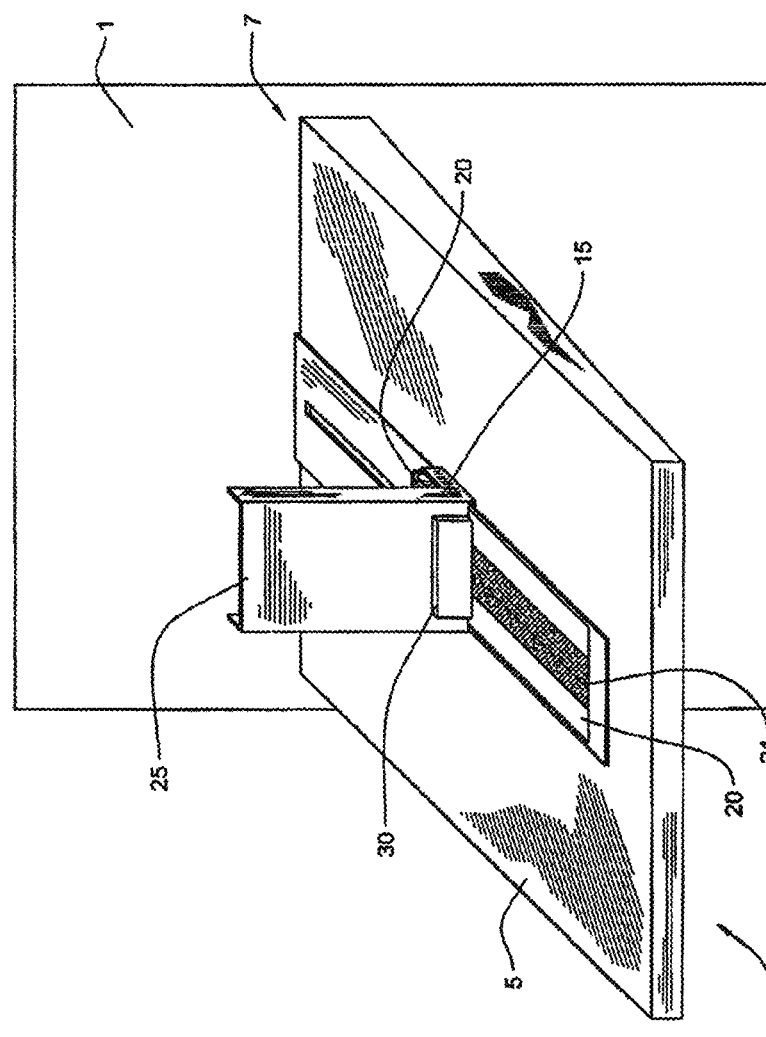

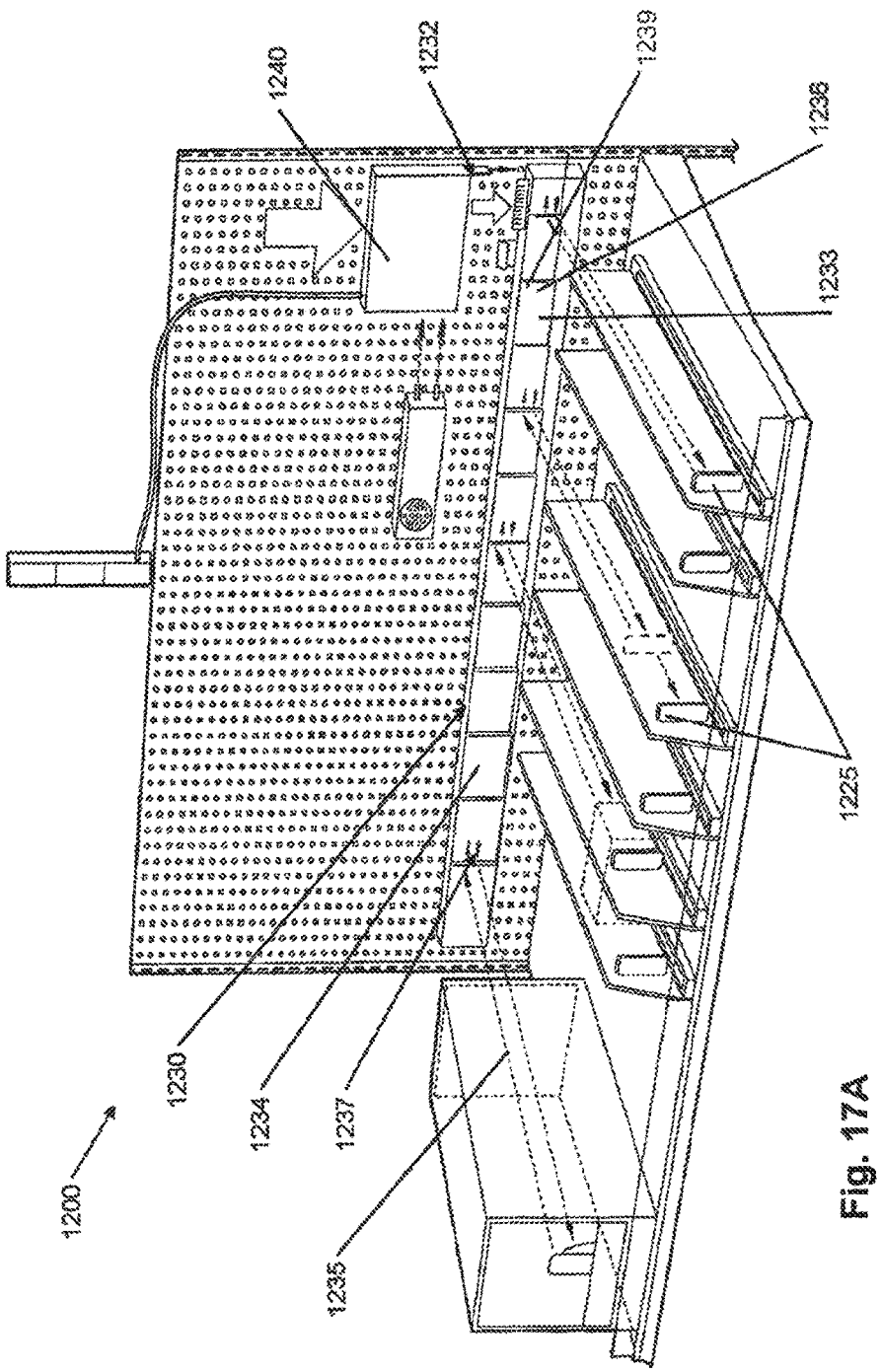

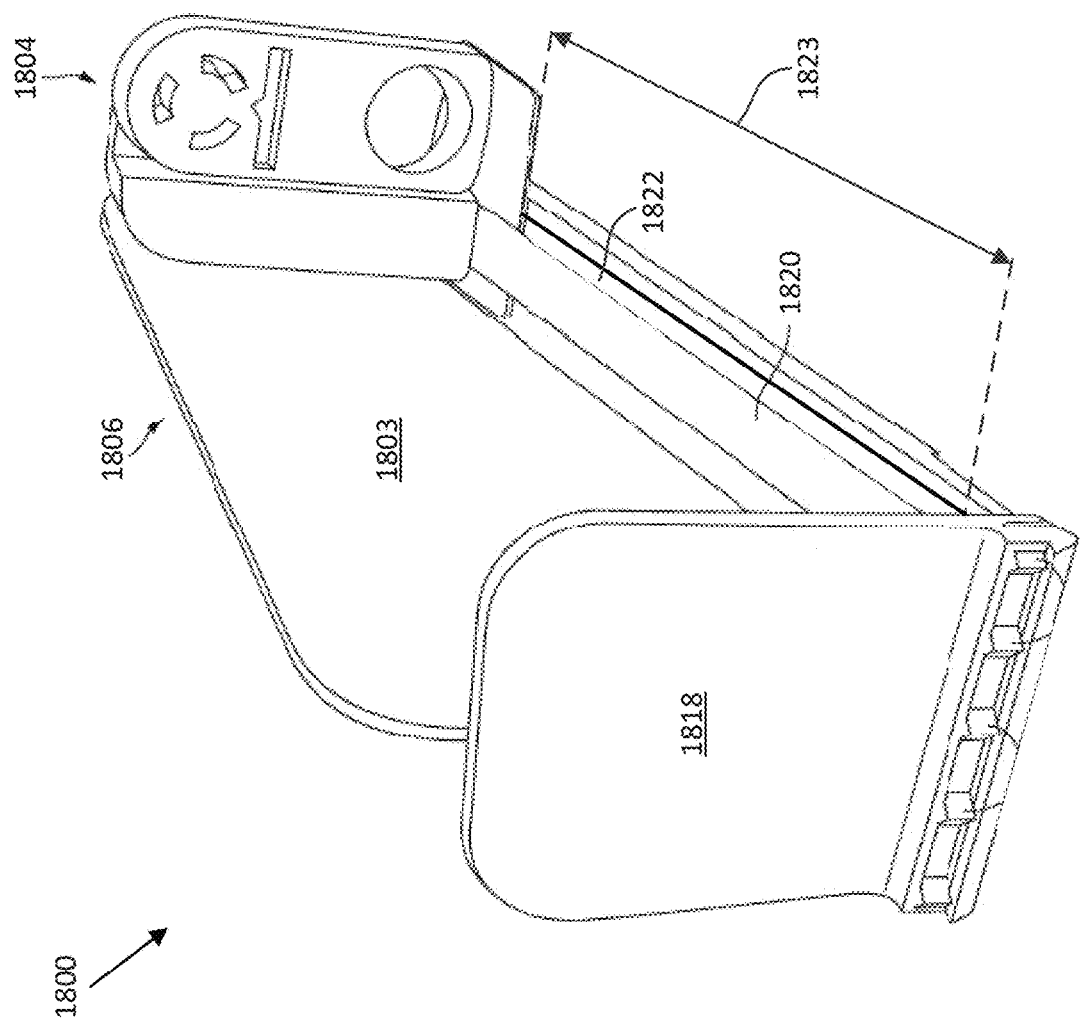

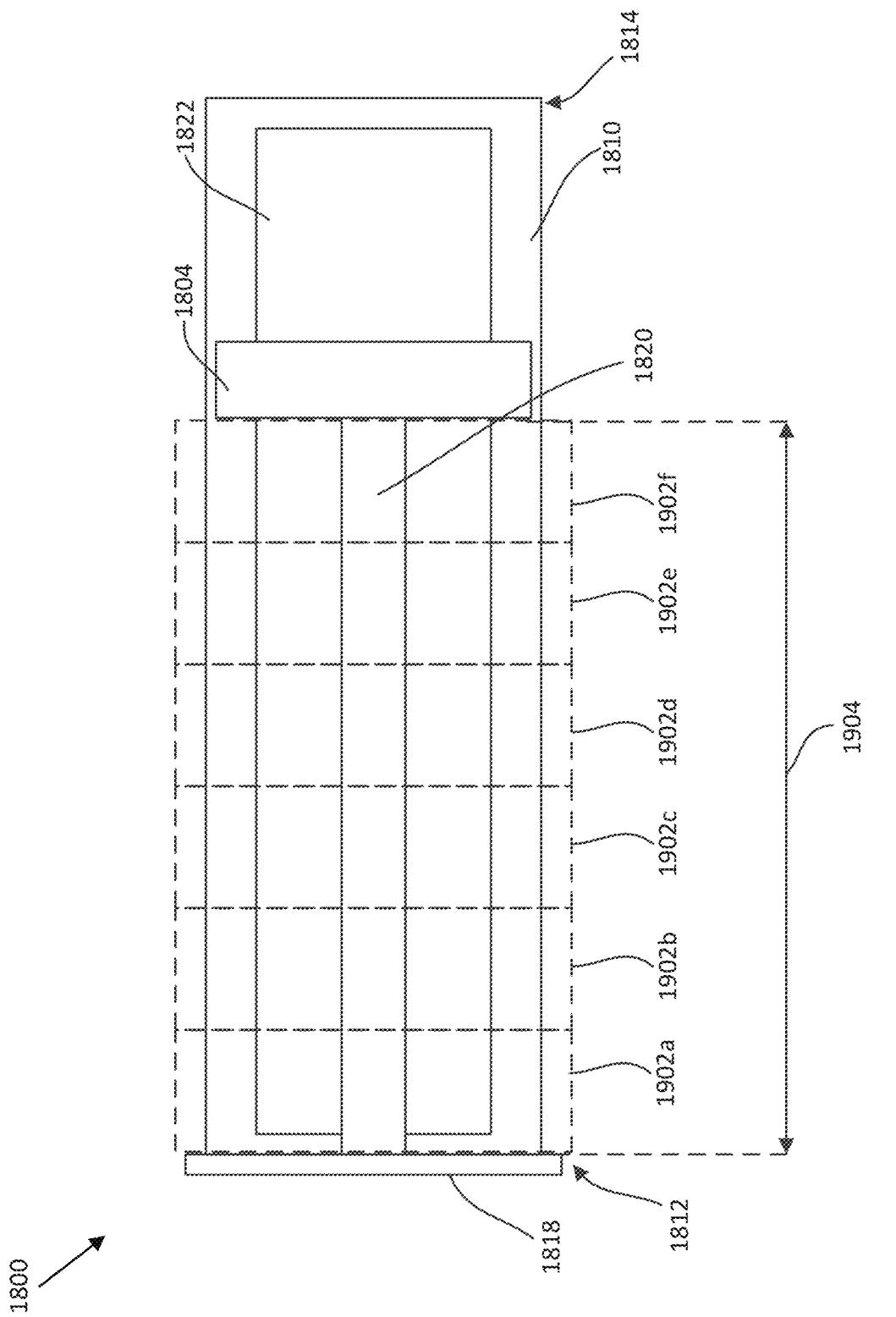

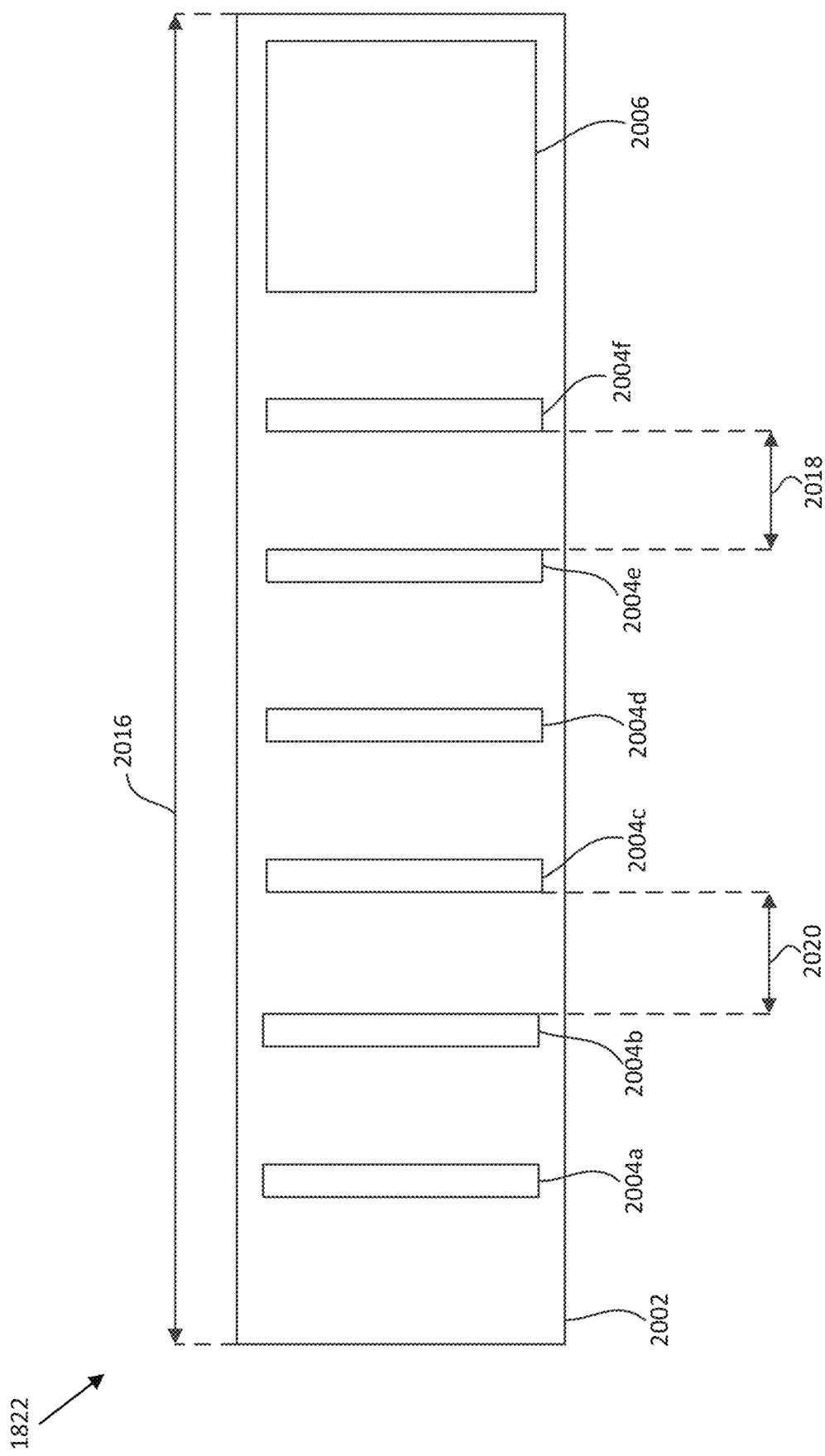

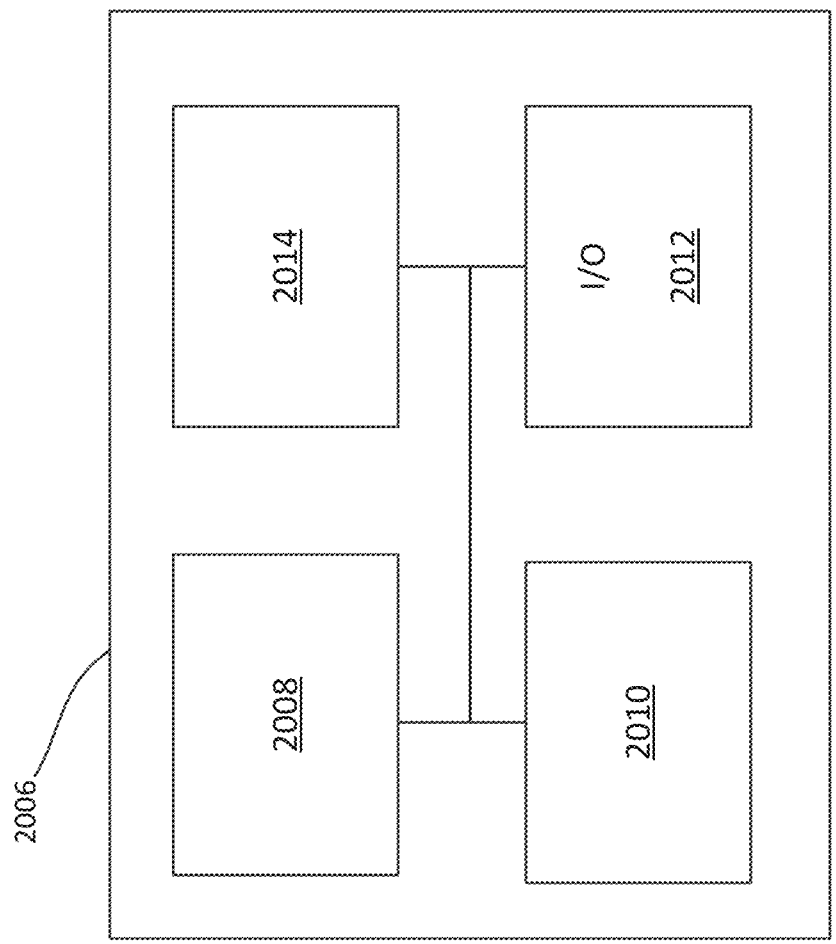

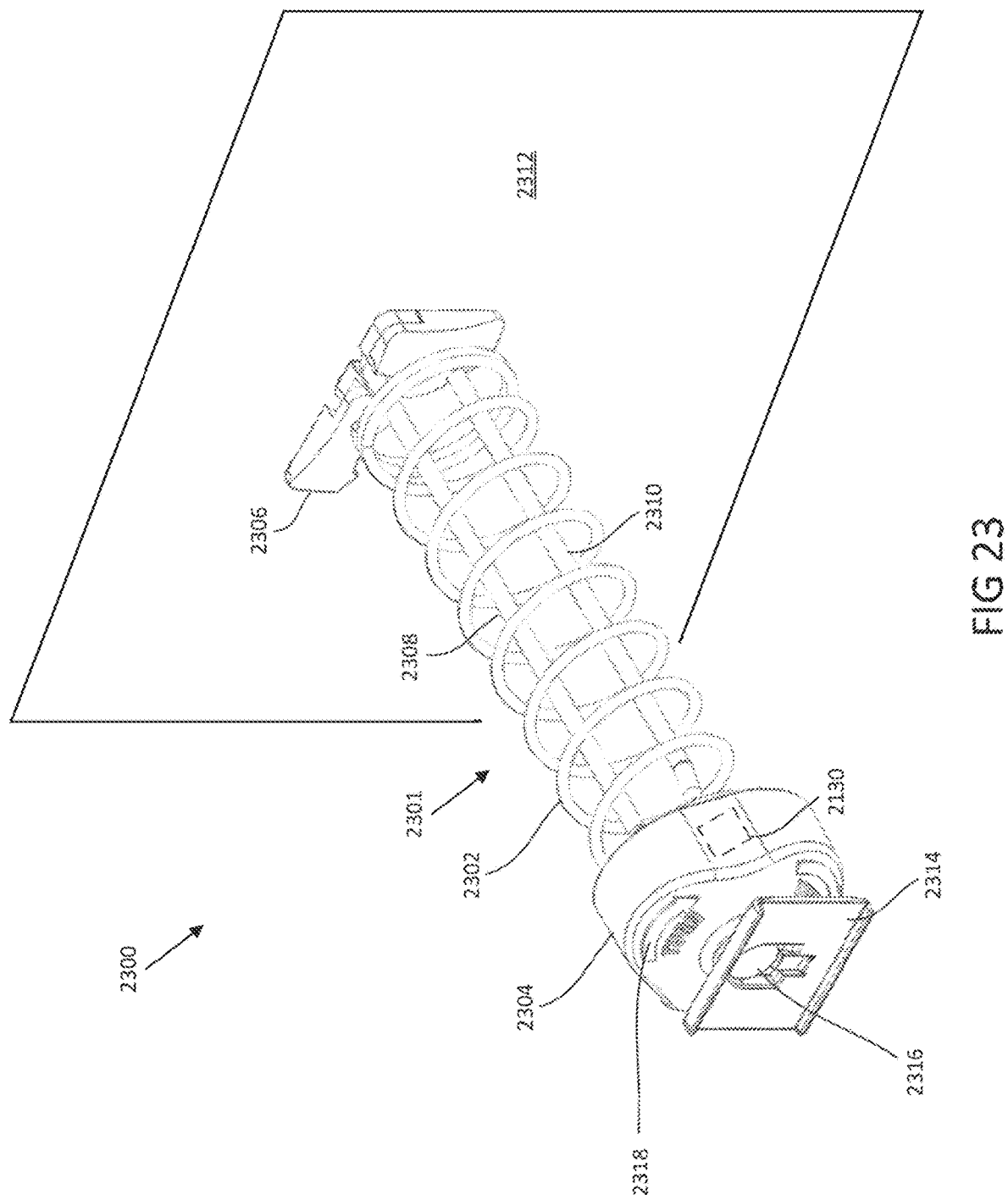

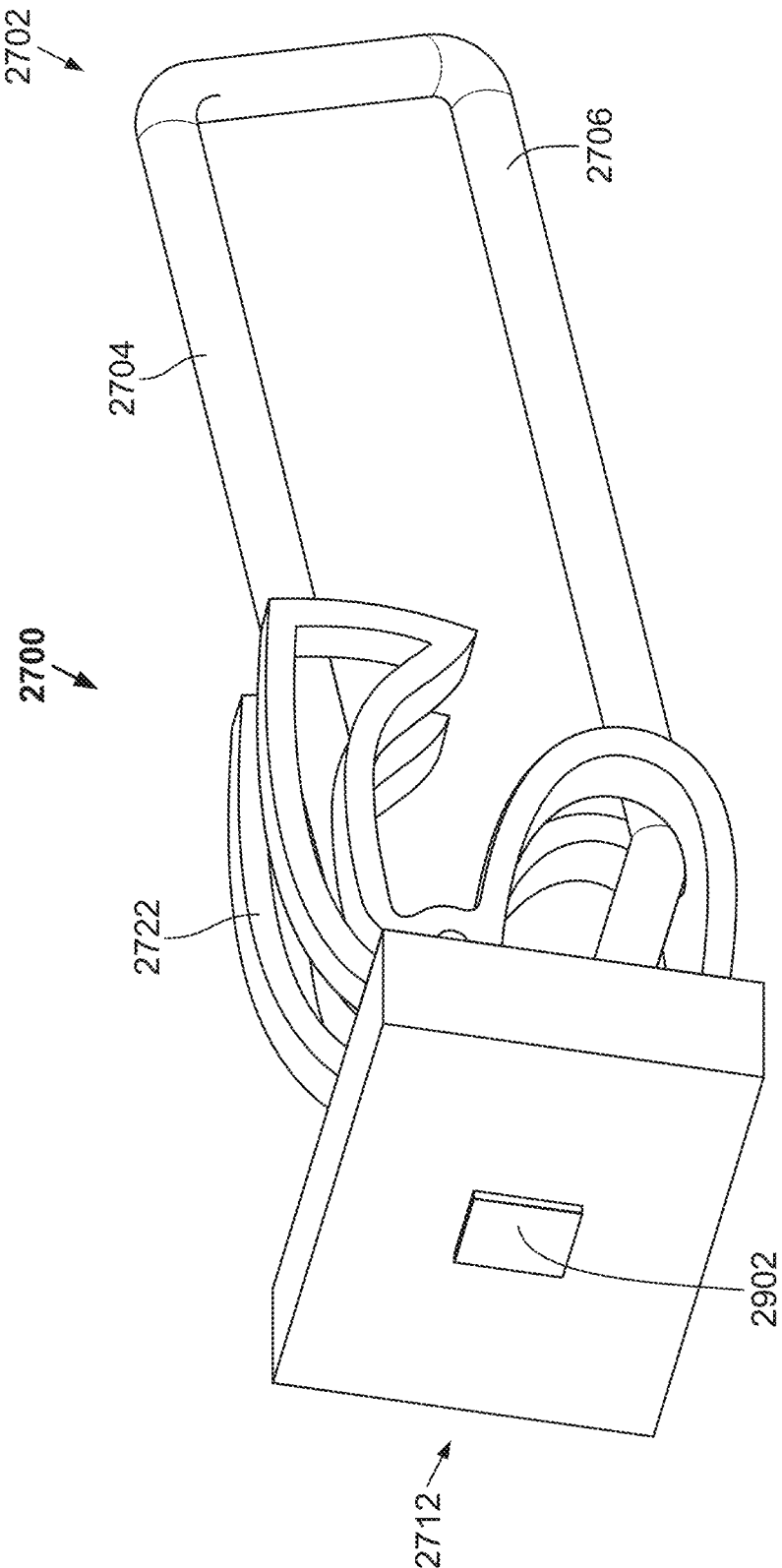

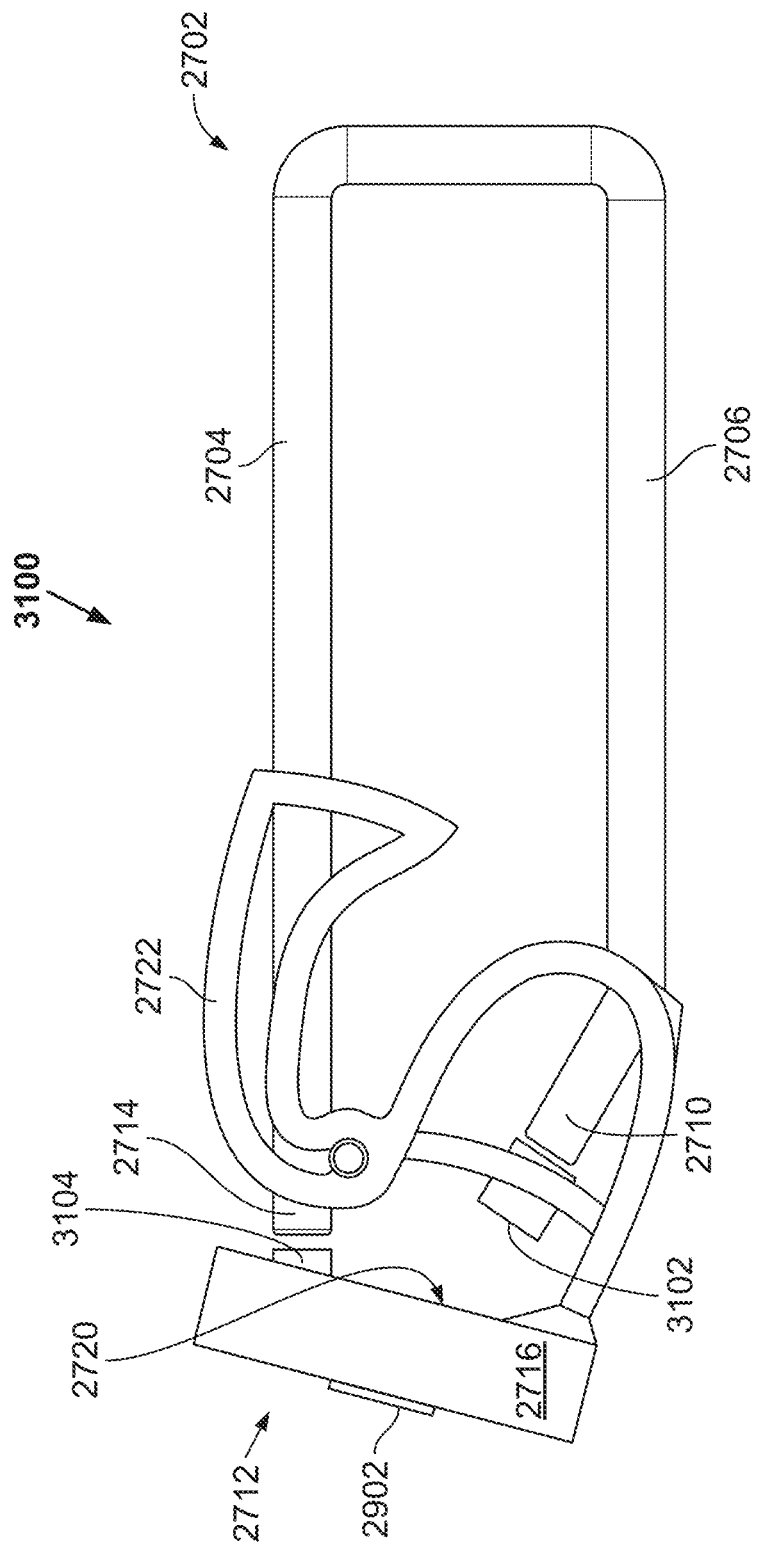

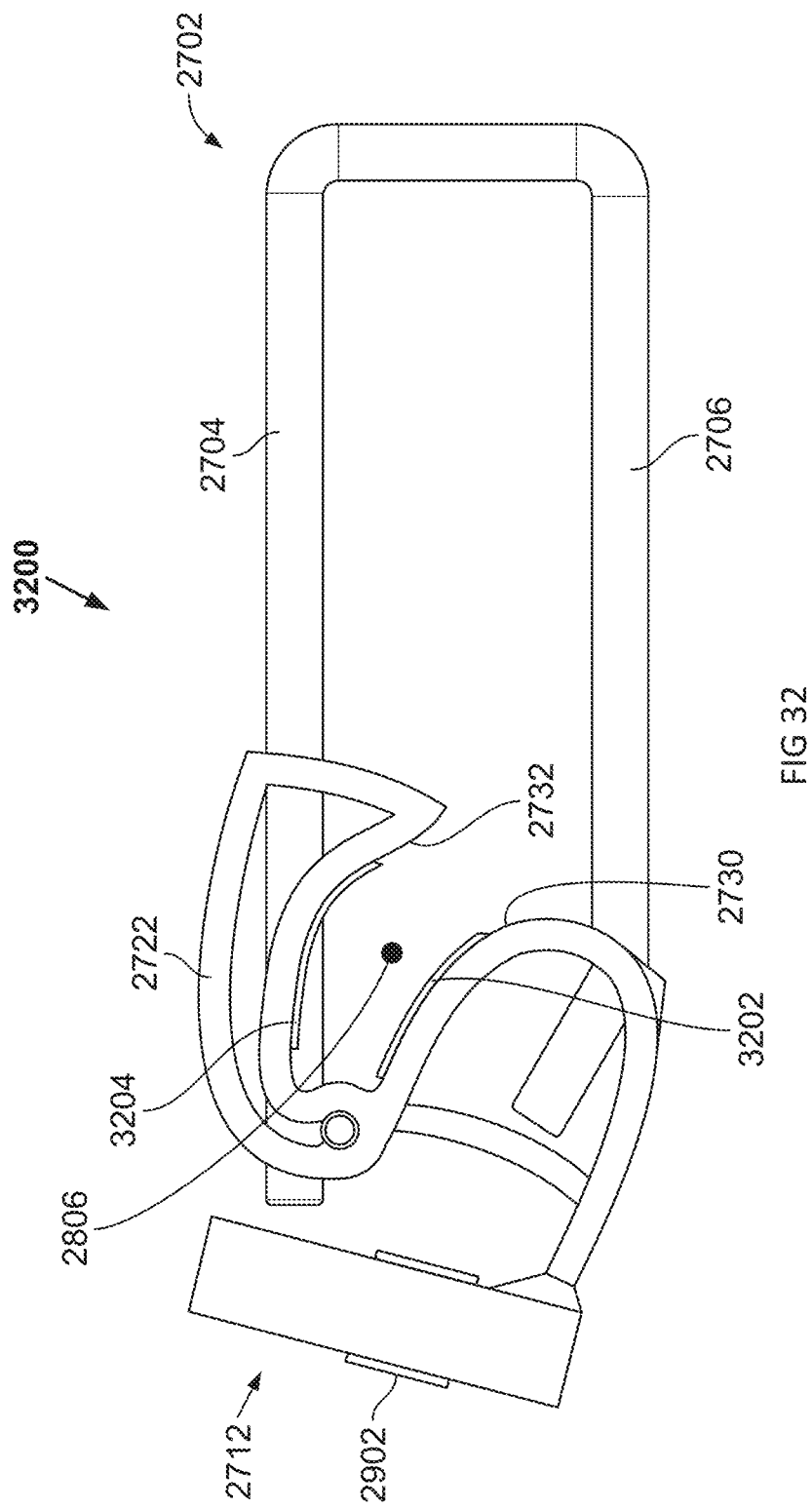

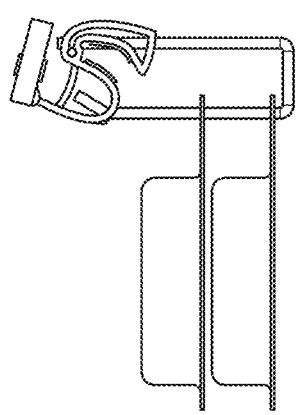
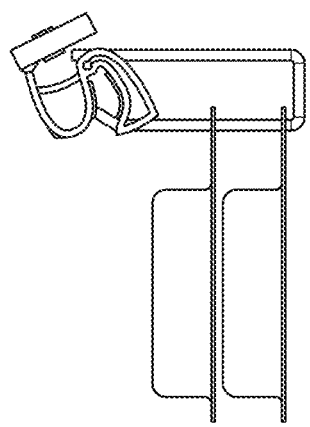
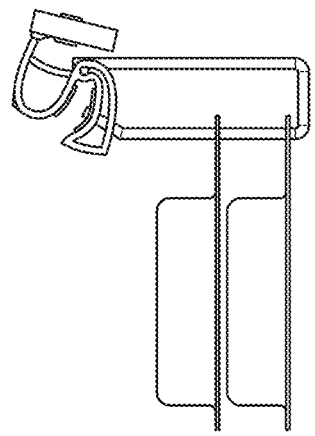
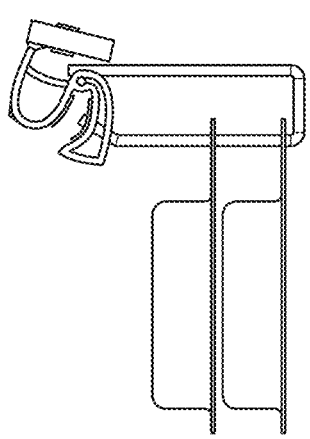
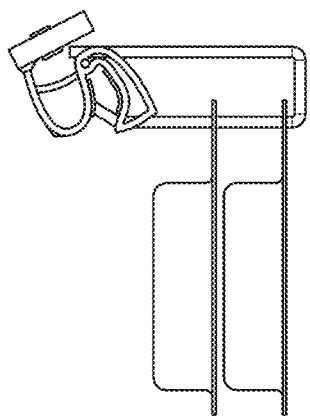
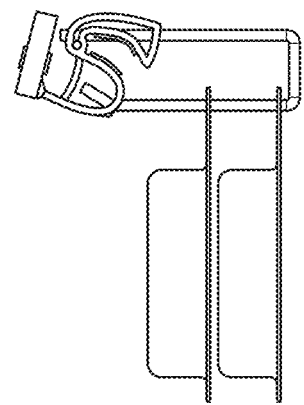
FIG 32B

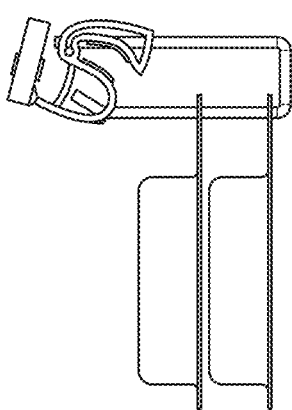
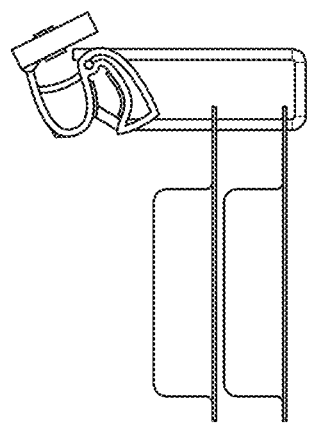
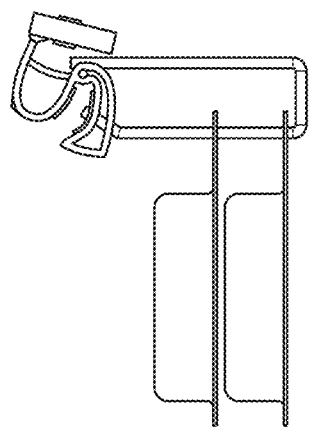
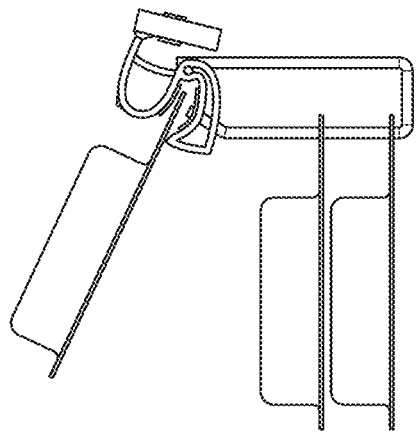
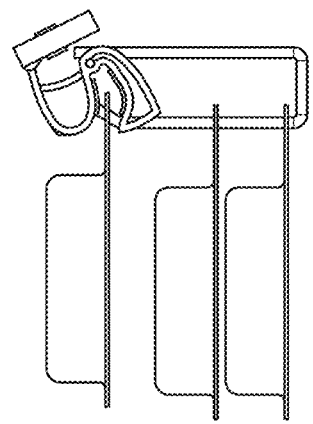
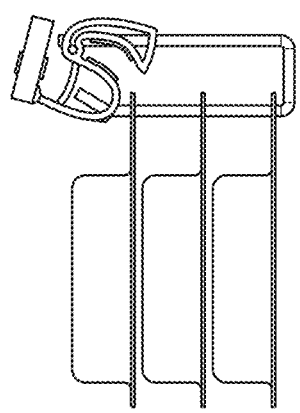
FIG 32C

SYSTEM FOR INVENTORY MANAGEMENT

CROSS REFERENCE TO RELATED APPLICATIONS

The instant application is a continuation of U.S. patent application Ser. No. 16/135,151, filed Sep. 19, 2018, which claims the benefit of and priority to U.S. Provisional Patent Application No. 62/560,498, filed Sep. 19, 2017, and U.S. Provisional Patent Application No. 62/622,560, filed Jan. 26, 2018, and is a continuation-in-part of U.S. patent application Ser. No. 14/939,220, filed Nov. 12, 2015 and issued as U.S. Pat. No. 10,339,495 on Jul. 2, 2019, which claims priority to U.S. Provisional Patent Application No. 62/078,809, filed Nov. 12, 2014, the disclosures of which are hereby incorporated by reference in their entirety.

FIELD

The present disclosure relates to shelving and product display and a system for aiding in determining the inventory on the shelf in a retail store.

DESCRIPTION OF RELATED ART

A major cost in the operation of retail stores relates to inventory management, which includes the tracking and storing of inventory. A significant portion of this cost relates to product inventory management in the selling area of the store. A considerable portion of inventory management cost is the periodic counting of product on the store shelves. This counting is necessary to determine the amount of product on the shelf and to help ensure the shelves are fully stocked.

Historically, the counting of inventory on store shelves was done manually, and the results were recorded on paper. More recently, however, inventory has been counted manually with the use of a small hand-held computer that can be configured to transmit the entered data to a central computer that compiles data and can be programmed to make decisions regarding the purchase of products for restocking the shelves. These recent advances have helped reduce the cost of inventory management; however, counting inventory still requires significant manual labor. It would be beneficial to reduce the amount of manual labor required to count the inventory.

Another significant cost relating to inventory management is product theft. Certain items are relatively small but represent a high value to potential thieves who can either resell the items or use them for other illegitimate purposes, as in the case of certain pharmaceutical products. The losses generated by such thefts have a negative impact on the profitability of retail stores.

Theft can be the result of both customers' and employees' actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of inventory. It would be beneficial to provide aid in monitoring for theft.

Currently, retail stores can track the amount of product sold based on a number of items scanned at the checkout counter. While this ability has proven useful, certain inherent disadvantages result from the use of such a system. One inherent disadvantage is that the scanner only counts the number of products that are legitimately purchased. Therefore, if product is removed from the shelf but not purchased, the store is unable to determine the fact that product has been misplaced or stolen without visual inspection or detection. It would be useful to compare changes in product level on the shelves with the amount of product sold.

A second inherent disadvantage relates to store-run product promotions. A typical promotion will have a product located at the end of an aisle or in some type of promotional location that increase customer awareness of the product. Usually the product is also placed on the shelf in its traditional location so that customers familiar with the product placement of the store can find the product without undue searching. Therefore, customers can obtain the product being promoted in multiple places, and it can be difficult to determine the effectiveness of a particular promotional display, i.e., the effect of a promotional discount offered for the product versus the normal purchasing of the product. It would be beneficial to more accurately determine the effectiveness of in-store promotions.

Another major cost of inventory management is associated with having to maintain more inventory in the store then is actually needed to meet customer demand. As current systems of inventory do not automatically indicate that a shelf is empty, retail stores tend to rely on output measured through the checkout or, alternatively, through visual inspection to determine if additional product needs to be placed on the shelf. In order to ensure the shelves are stocked with product, often more product than is typically needed for a given period of time will be placed on the shelf, sometimes in multiple facings on each shelf. The use of multiple facings tends to take up valuable shelf space that could otherwise be allocated towards additional product choices so as to maximize consumer satisfaction. It would be beneficial to reduce the amount of inventory of a particular product in the retail store.

Methods of minimizing the amount of required shelf space are known. For example, U.S. Pat. No. 6,041,720 to Hardy and U.S. Pat. No. 4,830,201 to Breslow, which are incorporated by reference in their entirety, teach a system for organizing and displaying items on a shelf through the use of a pusher assembly.

BRIEF SUMMARY

In one aspect, this disclosure includes a display management system having a mechanism that may be configured to move in response to a product being removed from the display management system. This movement may be used to generate electronic data that may be detected. Further, this electronic data may be used to detect a security event, such as an attempted theft.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

Several embodiments of the present invention are illustrated by way of example, but are not limited to the accompanying figures in which like reference numerals indicate similar elements and in which:

FIG. 1b illustrates another isometric view of an embodiment of the present invention including a pusher assembly and a sensor assembly

FIG. 15b illustrates a schematic of a beam, a fixed mirror, and a pusher assembly in accordance with the embodiment illustrated in FIG. 15a.

FIG. 16b illustrates a schematic of a beam, a fixed mirror, and a pusher assembly in accordance with the embodiment illustrated in FIG. 16a.

FIG. 17a illustrates an isometric view of yet another alternative embodiment of the present invention.

FIG. 17b illustrates a schematic of a beam, a fixed mirror, and a pusher assembly in accordance with the embodiment illustrated in FIG. 17a.

FIGS. 18A-18C depict an alternative implementation of a display management system, according to one or more aspects described herein.

FIGS. 19A and 19B schematically depict plan views of an alternative implementation of a display management system, according to one or more aspects described herein.

FIG. 20A schematically depicts a capacitive sensor, according to one or more aspects described herein.

FIG. 20B schematically depicts a control circuit, according to one or more aspects described herein.

FIG. 23 depicts an alternative implementation of a display management system, according to one or more aspects described herein.

FIG. 29 schematically depicts the display management system of FIG. 27, including a label holder rotation sensor device, according to one or more aspects described herein.

FIG. 31 schematically depicts another implementation of a display management system, according to one or more aspects described herein.

FIG. 32 schematically depicts another implementation of a display management system, according to one or more aspects described herein.

FIGS. 32A-32C schematically depict a product-removal event, a non-removal event, and a product-stocking event, according to one or more aspects described herein.

Figure 1A:
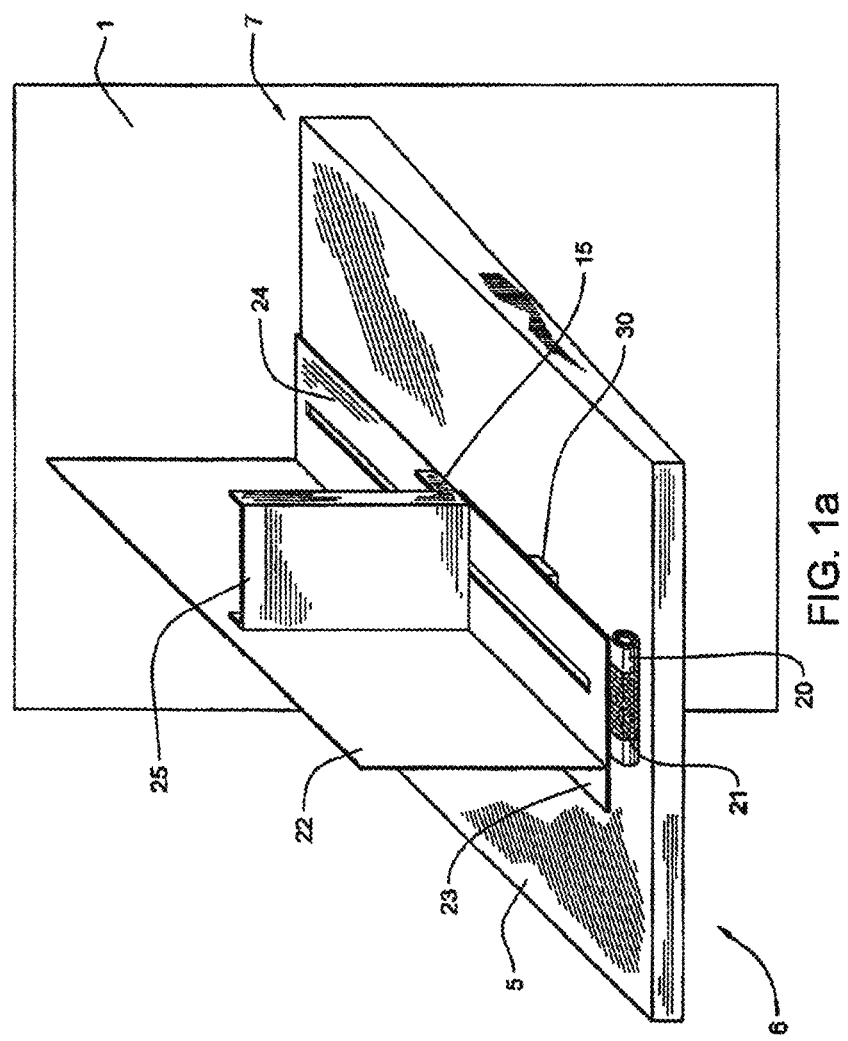
FIG. 1a illustrates an isometric view of an embodiment of the present invention including a pusher assembly and a sensor assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

The present disclosure may be used with the shelf and pusher assembly system described in either U.S. Pat. No. 6,041,720 to Hardy or U.S. Pat. No. 4,830,201 to Breslow. The present disclosure may also be used with other pusher assemblies and shelf configurations known in the art.

FIG. 1a illustrates an embodiment of the present disclosure. A shelf wall 1 is configured to support a shelf 5. The shelf 5 has a front side 6, the front side 6 typically facing the aisle where customers walk when shopping, and a rear side 7. Mounted on the shelf is a pusher assembly 15. As depicted, the pusher assembly 15 includes a biasing mechanism such as a sheet coil spring 20 containing an indicia strip 21. The pusher assembly 15 further includes an integral divider wall 22 and a floor section 23 on one side of the divider wall 22 and a floor section 24 on the other side of the divider wall 22. The sheet coil spring 20 is operatively connected to a pusher 25 and can be used to urge the pusher 25, and the associated product, toward the front side 6 of the shelf 5. The pusher assembly 15 may be modular and can include a divider wall or an additional floor section that fit or mate in place.

As depicted FIG. 1a, a sensor assembly 30 can be mounted to the underside of the floor 24 over which the pusher 25 travels or to the shelf 5 and is configured to read the indicia strip 21. The sensor assembly 30 can be located at any position along the floor 24 and preferably near the coil spring 20. The indicia strip 21 is configured to provide a pattern that includes a representation associated with the position of the pusher 25. Thus, when the pusher 25 is moved as far as possible towards the rear side 7 (i.e. the facing is full of product), the sensor assembly 30 can scan a representation on the indicia strip 21 that reflects the pusher 25 being in that position.

The indicia strip 21 is depicted in FIG. 1a as a strip mounted on the sheet coil spring 20. The indicia strip 21 can be printed on a paper that can be attached to the coil spring 20, and can be black on white, white on black, or some other colors in a known manner. Alternatively, the indicia strip 21 can be printed or acid etched or laser etched, depending on the sensor assembly 30 used to read the indicia strip 21, in a known manner. Moreover, the indicia strip 21 can be separate from the coil spring 20. In this embodiment, the indicia strip 21 can be mounted alongside or adjacent to the coil spring 20.

The representations in the pattern contained on the indicia strip 21 can be optically readable or can be read based on other methods, including but not limited to passive variable capacitance, inductance, resistance, or magnetic, or active signal detection.

FIG. 1b depicts an alternative embodiment of the invention with the sensor assembly 30 mounted on the front side of the pusher 25, the sensor assembly 30 configured to read the indicia strip 21. In an alternative embodiment, the sensor assembly 30 could be mounted behind the pusher 25. Depending on the location of the coil spring 20, the sensor assembly 30 can be mounted in different places. Preferably, the sensor assembly 30 will be mounted in such a manner so as to avoid direct contact with the product on the shelf so as to minimize damage to the sensor assembly 30.

In another alternative embodiment, the sensor assembly 30 may be mounted within or on the pusher 25 and configured to read the indicia strip 21. In this embodiment, the indicia strip 21 is not mounted to or part of the coil spring; rather, the indicia strip 21 may be positioned along the top of the floor 24 or along the underside of the floor 24 and is read by the sensor assembly 30. In one aspect of this embodiment, the indicia strip 21 is of the type that may have variable magnetic or capacitive characteristics. The sensor assembly 30 may incorporate an analog oscillator whose frequency is determined by the magnetism or capacitance of the indicia strip 21 at the particular position of the pusher 25. The oscillator can directly modulate the radio frequency signal and send that signal to a central access point, as discussed below. The central access point can then demodulate the signal and use the signal to determine the position of the pusher 25.

For a black/white printed indicia strip 21, an optical infrared or visible light LED retro-reflective sensor array can be used. In an embodiment, the indicia strip 21 pattern containing the various representations could be 6 bits wide. In an alternative embodiment, depending on the width of the shelf and the desired precision, the pattern on the indicia strip could be more than 6 bits wide.

In yet another alternative embodiment, the indicia strip 21 could be less than 6 bits wide. Reducing the number of bits on the indicia strip 21 reduces the precision regarding the position of the pusher 25 but has the advantage of potentially avoiding the need to determine the dimension of the product. An embodiment with a reduced number of bits will be discussed below. The indicia strip will preferably include at least two representations so that the two representations can be used to reflect at least two positions of the pusher.

Depending on the indicia strip 21 and the sensor assembly 30, the number of measurable positions of the pusher 25 can be varied. For example, a configuration of a 6 bit wide pattern on an indicia strip 21 with a sensor assembly 30 that can scan 6 bits could scan at least 64 representations associated with 64 positions of the pusher 25. The representations in the pattern on the indicia strip 21 can be in many symbologies but a Gray Code provides that only one bit will change in each increment of movement, reducing potential errors. The sensor assembly 30 and the indicia strip 21 can be configured depending on the distance of travel of the pusher 25 and the expected size of the product.

In an embodiment, the coil spring 20 has a width of about 1 inch and the indicia strip 21 covers approximately 80% of the width of the coil spring 20. One skilled in the art will understand that other widths of the coil spring 20, and other dimensions of the indicia strip 21 are possible with the invention.

In an embodiment, the number of products on the shelf could be measured by the number of measurable positions of pusher 25. In such an embodiment, the position of the pusher 25 could be used to determine the amount of product on the shelf without the need to manually count the product. In an alternative embodiment, the number of measurable positions could exceed the number of products that can be placed in a facing. In this alternative embodiment, it would be preferable to have the number of measurable positions be an integer multiple of the number of products for ease of calculating the amount of product on the shelf. Increasing the number of measurable positions can therefore improve the ability of the system to precisely calculate the amount of product in a facing. This can become more important when a product package is unusually thin and therefore the incremental movement of the pusher 25 from one code to the next becomes a large percentage of the thickness of each product package that it is pushing.

Thus, as different products have different dimensions, a configuration of the sensor assembly 30 and indicia strip 21 might be desired with an increased number of measurable positions. For example, a configuration where 256 positions of the pusher 25 are measured might be desirable. Such a configuration could be used to determine the actual number of product on the shelf for a wide variety of product dimensions.

In an alternative embodiment, the sensor assembly 30 and indicia strip 21 can be configured to provide a decreased number of measurable positions. In an embodiment, four positions of the pusher 25 are measurable. In such a configuration, the shelf would provide information regarding how full the shelf was but would not provide the actual quantity of items on the shelf (assuming that 4 products would not fill the facing). This configuration could be useful in providing an automatic notification that a shelf was running out of product and needed to be restocked without the need to determine the product dimensions.

Figure 2A:
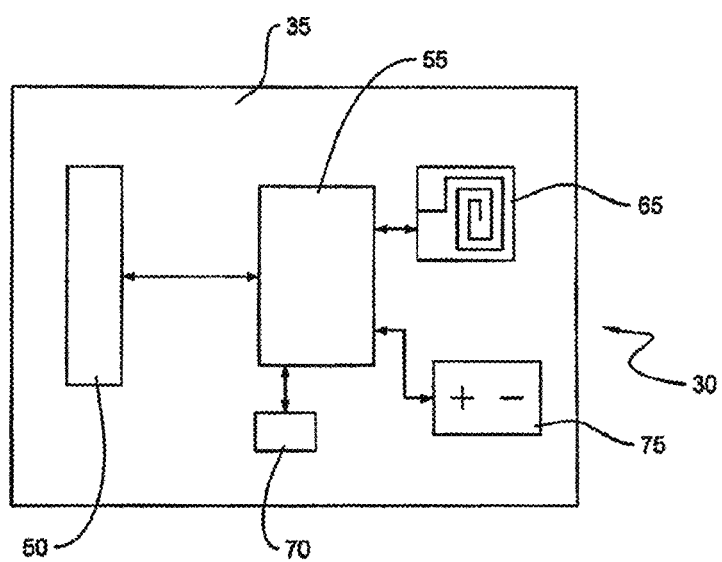
FIG. 2a illustrates a schematic view of an embodiment of the sensor assembly used with the present invention.

FIG. 2a depicts a schematic of an embodiment of the sensor assembly 30. A printed circuit board ("PCB") 35 is configured to support a sensor 50, the sensor 50 being compatible with the chosen type of indicia strip 21. A controller 55 is mounted to the PCB 35 and is configured to control the sensor 50 and transmit signals regarding the position of the pusher 25 via an antenna 65. The controller 55 can be configured to actuate the sensor 50 based on an input from the timing device 70. The timing device 70 can include, but is not limited to, a low power interval timer or a real time clock and is configured to provide information relating to the passage of time.

For a black/white printed indicia strip 21, the sensor 50 can include, but is not limited to, an optical infrared or visible light LED retro-reflective sensor. Preferably, for a 6 bit wide pattern, a linear array of 6 emitters/sensors will be used where one emitter/sensor is aligned with each bit position printed on the indicia strip 21. In an embodiment, the sensor 50 is positioned approximately 0.1 inches from the surface of the printed strip mounted on the indicia strip 21. As each emitter/sensor pair illuminates its bit position, a binary code can be assembled by the controller 55 that corresponds to the representation on the indicia strip 21, the representation associated with a position of the pusher 25.

Regardless of how the position of the pusher 25 is determined, the controller 55 generates a pusher code that represents the position of the pusher 25. The pusher code can be in digital or analog form and reflects the position of the pusher 25. In addition, the pusher code can be processed data or unprocessed data. Thus, the pusher code can be, but is not limited to, the scanned representation or a controller processed representation. Alternatively, the pusher code can be some other data that reflects the relative position of the pusher 25.

The controller 55 is powered by a power source 75. The power source 75 can be, but is not limited to, a long life battery, a wired power supply, or a solar panel. As can be appreciated, the type of power supply will have an impact on the functionality of the sensor assembly 30. If the power source 75 is a long life battery, a system configuration designed to utilize less energy will be preferable to avoid the need to change the battery on a frequent basis. If the power source 75 is a wired power source, the sensor 50 can be used more frequently without the need to replenish the power supply and the sensor assembly 30 can even be configured to provide real time information.

The controller 55 can be manufactured with a unique serial number. In this embodiment, each pusher 25 would be associated with a unique serial number or identity code. Alternatively, each indicia strip 21 can include a unique identity code along with the representation associated with the position of the pusher 25. Encoding the indicia strip 21 with a unique identity code can reduce the complexity of the controller 55 but typically will result in increased complexity of the sensor 50. Regardless, when the information is transmitted from the sensor assembly 30, the information may include an identity code and the pusher code representative of the pusher 25 position. In addition, information such as time of sending and the status of the circuitry or the status of the power source may also be transmitted.

Figure 2B:
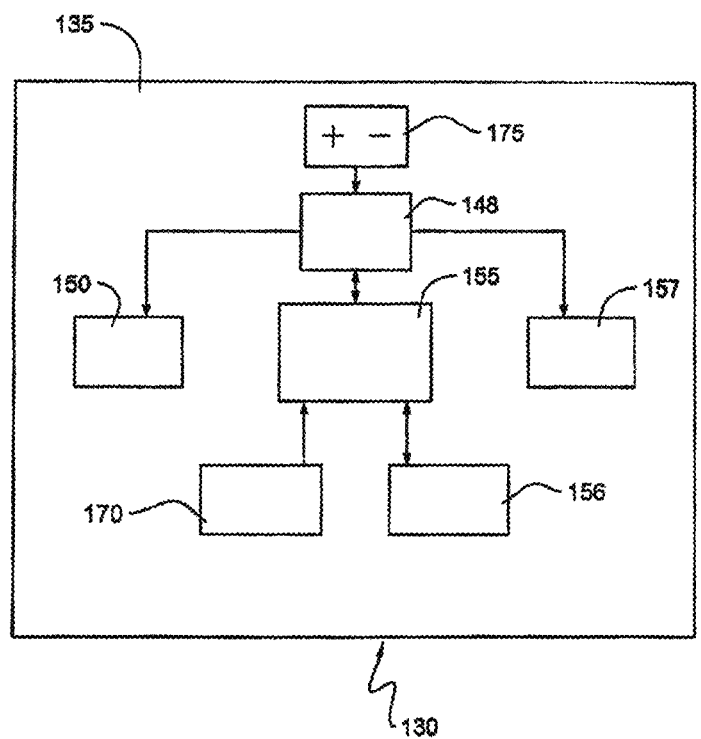
FIG. 2b illustrates a schematic view of an alternative embodiment of a sensor assembly used with the present invention.

FIG. 2b illustrates a schematic of an alternative embodiment of a sensor assembly 130. A PCB 135 has a power management circuit 148 configured to minimize use of power. The power management circuit 148 provides power to a sensor 150, a controller 155 and associated memory 156. The memory 156 can be volatile type memory, such as dynamic random access memory, but preferably the memory is non-volatile type memory, such as flash memory, so as to minimize power consumption. As depicted, the power management circuit 148 also provides power to a communication control 157. The power management circuit 148 can also provide power to a timing device 170. As depicted, the power management circuit 148 is powered by a power source 175.

In this embodiment, an input signal is provided to the controller 155. The input signal can be a signal generated by the timing device 170 or can be from some other source. The controller 155, in response, activates the sensor 150 by sending a signal to the power management circuit 148. The controller 155 receives data from the sensor 150 which is used to form the pusher code representative of the position of the pusher 25. The controller 155 compares the data scanned by the sensor 150 with the previous data scanned by the sensor 150, which is data residing in the memory 156. Depending on the configuration of the system, if the data scanned by the sensor 150 is the same as the previous scanned data, the controller 155 can be configured to wait until the end of the next interval of the timer. If the data scanned by the sensor 150 is different, the controller 155 can then activate the communication control 157 and provide the pusher code to the communication control 157 for transmission. The communication control 157 can then transmit the pusher code for further processing. The terms "transmit" and "transmission," unless otherwise specified, include sending of information over a wire or via a wireless system and can be direct or indirect (i.e. through a network). If the power source 175 is not a wired power supply, however, it is preferable to use a method of communication that consumes relatively little power.

Figure 2C:
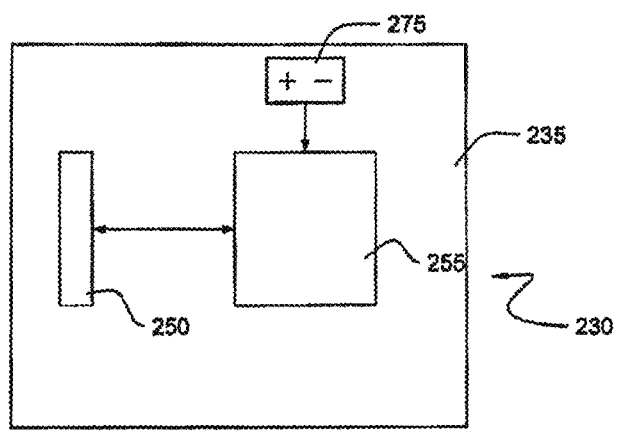
FIG. 2c illustrates a schematic view of another alternative embodiment of a sensor assembly used with the present invention.

FIG. 2c illustrates a schematic of an alternative embodiment of a sensor assembly 230. A PCB 235 is configured to support a sensor 250 and a controller 255. The controller 255 is powered by a power source 275 and is configured to control the sensor 250 and has integrated functionality, including but not limited to, time keeping, power management, and communication control. In an alternative embodiment, the controller 255 transmits the data scanned by the sensor 250 without any processing of the data. Thus, in this embodiment the pusher code is the data scanned by the sensor 250. In another alternative embodiment, the sensor and controller can be integrated together.

Figure 3:
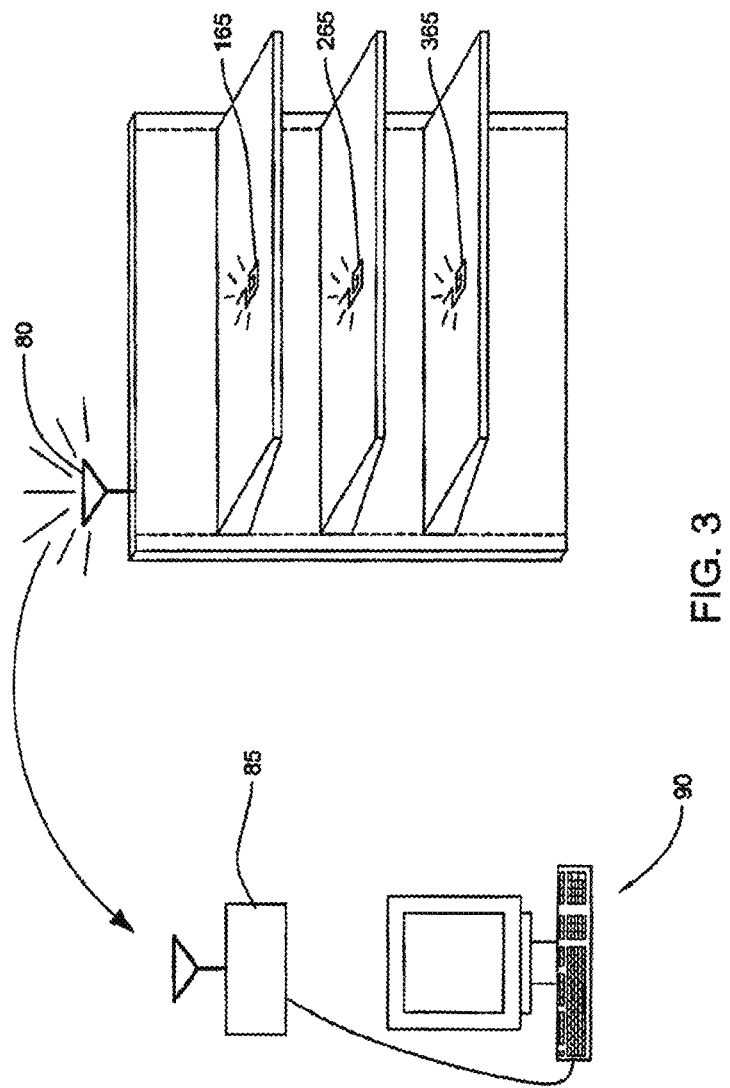
FIG. 3 illustrates a schematic view of an embodiment of the present invention, including an antenna, an access point and a store computer.

FIG. 3 illustrates a possible configuration for providing data regarding the position of the pusher 25 to a processing device, such as a store computer 90. As depicted, an access point 80 is configured to transmit information to a central access point 85. The central access point 85 is connected to the store computer 90 and provides the data received from the access point 80 to the store computer 90. The data sent from the access point 80 is received from antenna 165, antenna 265 and antenna 365. The antenna 165 is associated with a particular pusher 25 and sensor assembly 30, typically via the use of a unique serial number that can be associated with a controller. The antenna 265 and the antenna 365 are also associated with different pushers 25 and sensor assemblies 30, each with a unique serial number. Alternatively, one or more antennas could be associated with more than one pushers 25.

In general, the power required to transmit wireless signals increases as the transmission distance increases. Thus, especially with a battery powered controller, the preferred wireless communication configuration will transmit low powered signals over a short distance. As depicted in FIG. 3, the various antennas 165, 265 and 365 transmit a wireless signal to the access point 80, located nearby, thus a low powered transmission is suitable. The access point 80 then re-transmits the signal to the central access point 85 using higher power during the secondary transmission. In this manner, the power source for the various controllers connected to the antenna 165, 265 and 365 can more readily utilize a power source 75 consisting of a long life battery. While the transmission method between access point 80 and central access point 85 is depicted as wireless, the access point 80 and central access point 85 can also communicate over wires.

In an alternative embodiment, the controller 55 corresponding to each pusher 25 can be hard-wired to an access point 80 so that the controller 55 transmits the data to access point 80 over one or more wires. The access point 80 can then transmit the data to the store computer 90. In another alternative embodiment, the data is transmitted directly from the sensor assembly 30 to the store computer 90. In this embodiment, the transmission can be either wireless, such as an infrared, ultrasonic or electromagnetic wave transmission, or can be hard-wired. Depending on the method of transmission, it may be desirable to transmit the data from the sensor assembly 30 to the store computer 90 via a network protocol that can compensate for, or minimize, communication errors.

The use of a wired connection can provide a useful source of power and can reduce the possibility of communication collisions, especially if the signals are directly to the store computer 90. In addition, by providing additional power, the controller 55 can be configured to provide a real time update on the level of product on the shelf or in the store so that more accurate decisions regarding the need to order additional product can be made. This configuration also makes it possible to recognize and send alerts regarding potential theft situations based on the real-time movement of the pusher 25. The real time product information may make it possible to provide a more responsive inventory system so as to lower the amount of inventory in the store and therefore reduce the cost of inventory.

Wireless systems, on the other hand, provide increased flexibility in installation and can be readily installed in existing shelves without the need to install wires for either power or communication. In addition, the use of a wireless system allows for the gradual installation of an inventory system. For example, items of high value (and therefore suffering from an increased likelihood of being stolen) or items that tend to have significant variations in customer demand can be monitored first.

In an embodiment, the sensor assemblies 30 may be networked together via a series of wireless access points 80 where each access point 80 accepts transmissions from any sensor assembly 30 in the vicinity of the access point 80. Thus, in an embodiment, there exist a number of wireless access points 80 and the access points 80 are connected via a network, where the network transmits the data to the store computer 90. In an alternative embodiment, each wireless access point 80 transmits the data directly to the store computer 90.

Naturally, some combination of network and direct transmission is also possible and is considered within the scope of the present invention. For example, a battery powered sensor assembly 30 could communicate via a low powered wireless transmission to an access point 80, the access point 80 being powered by a wired power supply. The access point would transmit a wireless signal to a central access point 85 that was powered by a wired power supply. The central access point 85 could be connected via a wire to the store computer 90.

Referring back to FIG. 2a, if a timing device 70 comprises a low powered timer, the controller 55 can rest dormant until a signal from the timing device 70 indicates it is time to send an update regarding the position of the pusher 25. An example of a low powered timer includes a low powered, low cost interval timer. Low powered, low cost interval timers may not be highly accurate and therefore multiple pusher devices in a store will likely randomize their transmission times so as to reduce transmission collisions. The period of data transmission typically will be on the order of a few milliseconds, and therefore, it is unlikely that signals from different controllers will be sent at the same time. This likelihood can be further decreased if the controllers are not all started at the same time. If the transmissions only occur a few times per day (i.e. to provide periodic updates on the amount of product on the shelf), the likelihood of communication collisions is further reduced. In addition, the decreased frequency of transmission and the short transmission period helps reduce the amount of power consumed.

In an alternative embodiment, the sensor 50 continuously monitors the indicia strip 21. When a product is removed from the shelf, the pusher 25 will move and the sensor 50 can scan a new representation on the indicia strip 21 corresponding to the new position of the pusher 25. The controller 55 can then send a transmission including the new position of the pusher 25 to the store computer 90 (i.e. the controller 55 can send a new pusher code). In this alternative embodiment, the store computer 90 can monitor the amount of product on the shelf in real time.

As depicted in FIG. 3, the transmission of signals, from the antenna 165 to the store computer 90 for example, is a one-way transmission. In an alternative embodiment, the system may be set up to handle two-way transmission of signals between the sensor assembly 30 and the store computer 90. In a two-way wireless system, additional hardware such as a receiver is included in the sensor assembly 30. The two-way system allows for bi-directional transfer of information.

For example, the store computer 90 could query a particular controller 55 about the position of the associated pusher 25. The controller 55 could activate the sensor 50 in response to the query and determine a pusher code reflecting the position of the pusher 25. The controller 55 could then transmit the pusher code along with the identity code of the controller 55 to the store computer 90. Based on the pusher code, the store computer 90 could determine the inventory level of a product. To avoid activating the wrong controller 55, the store computer 90 could include the identifying code in the transmission. The store computer 90 may store, access, and perform functions with the identifying codes of all or a subset of the controllers or pusher systems in the store.

In an embodiment, all the controllers 55 associated with products purchased from the same vendor could be queried just before the order to the respective vendor was placed. The order to that vendor could then be updated with the latest product inventory information. In this manner, the order placed to the vendor could be made more accurate without the need for laborious counting of products on the shelf.

Some vendors are responsible for stocking the shelves in a retail store instead of the store personnel. In a situation where a vendor was responsible for stocking the shelves, an embodiment of the present invention could provide the vendor with updates in response to queries from the vendor's computer. In an embodiment, the vendor could track the amount of product available on the shelves as frequently as desired, even in real time.

For example, a vendor could send a query to a controller 55 via a wide area network ("WAN"). The controller 55 could determine the position of the pusher 25 and transmit a signal back to the vendor via the WAN. In an alternative embodiment, the vendor could communicate with the store computer 90 to obtain information regarding the inventory level of products on the shelf.

In an embodiment, the vendor could control the manufacturing process of the product in response to inventory levels on the shelves. As can be appreciated, the vendor would have an increasingly effective inventory system if multiple stores were networked to the vendor's computer so that the aggregate amount of product on all the store shelves could be determined. If the vendor was only connected to a single store, the information, while less indicative of the total inventory, could provide valuable details regarding patterns of behavior of the consumers.

Figure 4:
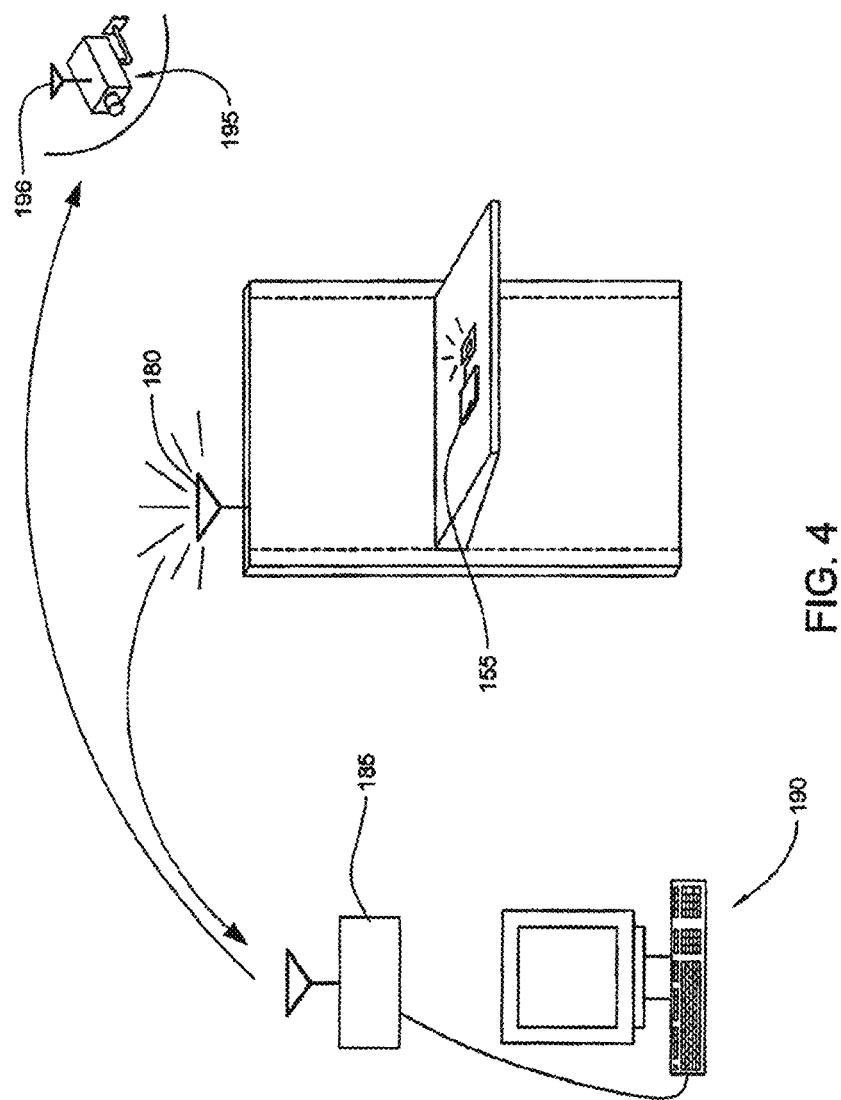
FIG. 4 illustrates a schematic view of an embodiment of the present invention, including an access point, a store computer and a security camera.

FIG. 4 illustrates an embodiment of the present invention that includes the use of a security camera 195. As depicted, an access point 180 receives a signal from a controller 155 indicating that pusher 25, not shown, has moved. The access point 180 transmits the signal to a central access point 185 that is connected to a store computer 190. The store computer 190 determines that the rate of change in product level of the product associated with the controller 155 is indicative of a potential theft. The store computer 190 then transmits a signal, either wired, or wirelessly, to an antenna 196, which is mounted to the security camera 195. The signal instructs the security camera 195 to monitor a position associated with the location of the controller 155. As can be appreciated, security personnel can sometimes provide a more nuanced response, thus it is advantageous to notify security personnel. Therefore, the store computer 190 can also notify security personnel to monitor the area by displaying a warning on the store computer screen or by transmitting a signal to a security computer or by activating an audible tone or flashing light in the vicinity of the potential theft or by other known methods of notification such as a signal to the pager or beeper carried by the security personnel.

Information from the security camera could be sent to a television or other visual display device that is located near the location where the potential theft is occurring. The visual display device could display an image of the potential thief such that the potential thief could appreciate the fact that the thief was being watched.

As can be appreciated, the controller 155 preferably monitors the position of pusher 25 on a frequent or even real time basis so as to provide a more timely response. If a power source 75 consisting of a long life battery is utilized, it may be beneficial to utilize a controller that can determine a potential theft situation without the need to transmit data to the store computer 190. In such an embodiment, the controller can be configured to transmit data to provide inventory level updates and also to provide security notifications.

As can be appreciated, the position of the potential theft relative to the security camera 195 would be beneficial to provide an instruction to the security camera 195 to focus on a particular position. This positional information could be generated by a number of methods, including providing the store computer 190 with the security camera coordinate system for the security camera 195. The position of the controller 155 relative to the security camera 195 could be determined during setup and during a potential theft situation; the position of the controller 155 could be used to direct the focus of the security camera 195. Alternatively, the security camera 195 could be configured to focus in several positions, such as three points along an aisle, and the store computer 190 could indicate which position was the most appropriate for the particular situation. The described methods are illustrative because of the numerous methods of controlling the security camera 195 that exist.

In an embodiment with a two-way transmission between the store computer 190 and the controller 155, the store computer 190 could signal to the controller 155 to activate a device capable of providing an audible warning tone.

In another embodiment, the controller 155 could determine that a potential theft had occurred and could provide a notification, including the sounding of an audible warning tone. In addition, the controller 155 could transmit a signal to the store computer 190. In this alternative embodiment, the sensor assembly 30 would preferably include a timing device 70 so as to allow the controller 155 to more readily determine whether the rate of movement of pusher 25 exceeds a preset level.

In another embodiment, a two-tiered response could be implemented. If the change in position of the pusher 25 was greater than normal, a signal could be transmitted to the security camera 195. In addition, an inaudible notification could be provided directly to security personnel. If the positional change of the pusher 25 more clearly indicated a potential theft, an audible alarm and flashing lights could also be activated. Thus, the response could be configured to more carefully match the situation.

Figure 5:
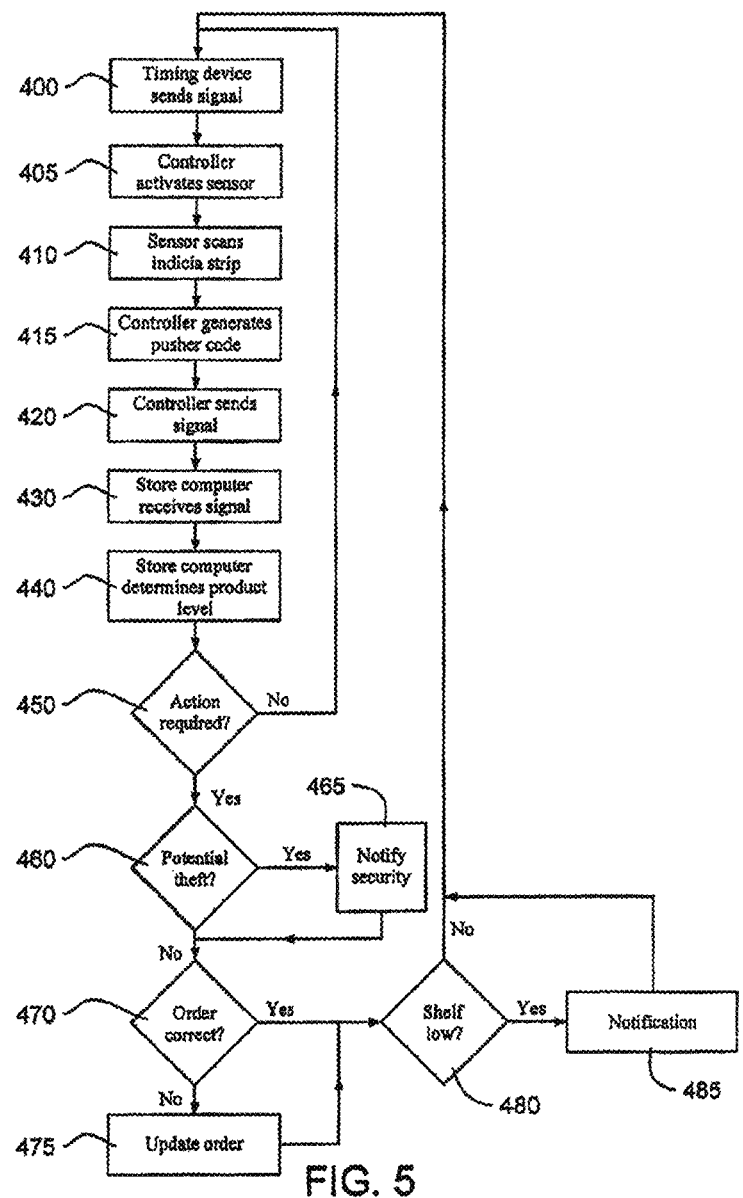
FIG. 5 illustrates a flow chart demonstrating a method of providing data from the indicia strip to a store computer.

FIG. 5 illustrates an embodiment of a method for determining the amount of a particular product available in a facing on a shelf. In this embodiment, the sensor assembly 30 uses a timing device 70 consisting of a low powered interval timer. The controller 55 is initially in a dormant state and only the timing device 70 is running. In step 400, the timing device 70 provides a signal to the controller 55 that the time interval is complete. In step 405 the controller 55, in response to the signal from the timing device 70, becomes activated and the controller 55 then activates the sensor 50.

In step 410, the sensor 50 scans the representation contained in the pattern on the indicia strip 21 so that the controller 55 can generate the pusher code representative of the position of the pusher 25. In step 415, the controller 55 generates the pusher code in response to the pattern scanned by the sensor 50. In step 420, the controller 55 transmits a signal that can include the unique serial number of the controller 55 and the pusher code, to the store computer 90.

Next, in step 430, the store computer 90 receives the data from the controller 55. In an embodiment, the transfer of data from the controller 55 to the store computer 90 is direct. In another embodiment, the controller 55 transmits data to the store computer 90 indirectly through an access point or a network.

Then, in step 440, the store computer 90 calculates the amount of product on the shelf based on the position of the pusher 25. The store computer 90 also updates the inventory list at this point. In an embodiment where multiple facings have the same product, the total amount of product on all of the facings that have that product can be calculated. In an embodiment, the calculation of product in a facing can be accomplished through the use of a database of products and the relevant dimensions of a product, and the position of the pusher. In another embodiment, the number of products placed in the facing can be provided during setup of the controller 55 for that product. The position of the pusher 25 and the number of products corresponding to that position of the pusher 25 can be used to calculate the quantity of remaining products based on a later position of the pusher 25 through the use of well known extrapolation techniques.

In another embodiment, the position of the pusher 25 can be one of four positions representing $X>\frac{3}{4}$, $\frac{3}{4} \geq X > \frac{1}{2}$, $\frac{1}{2} \geq X > \frac{1}{4}$, and $X \leq \frac{1}{4}$. This latter embodiment provides less precise information but also requires less computation effort to provide the approximate inventory level. In addition, this embodiment can be used to manage inventory without the need to determine and track the dimension of the product. In an embodiment, the amount product on the shelf can be roughly determined based the number of facings containing the product and whether the pusher 25 for each facing is in a position representative of a full, mostly full, low or almost empty facing.

In step 450, the store computer 90 determines whether any action is required. In an embodiment, a potential theft, a decrease in the inventory below a pre-set level or the emptying of a facing of product while ample product still remains on the shelf in other facings would indicate that some action was required. For example, the store computer 90 could determine that, based on historical usage and the average delivery time and the cost per delivery, the current level of inventory was low. In an alternative embodiment, the minimum inventory level could be preset and once the inventory level drops below a preset level, the store computer 90 could determine that the product level was low.

In step 460, the store computer 90 would determine if a potential theft was taking place. In an embodiment, the store computer 90 could compare the current level of inventory, based on the position of the pusher 25, to the previous level of inventory. If the rate of change in inventory level exceeded a preset level, the store computer 90 would determine that a potential theft was taking place. In step 465, the store computer 90 would notify security. The notification could include a page to security or a signal to a security camera 195 to focus in a particular direction.

Next, in step 470, the store computer 90 would determine if the existing order needed to be modified. The store computer 90 could compare the current product requirement to the current order. If the store computer 90 determined that an amount of product ordered was insufficient, the store computer 90 would proceed to step 475. In step 475, the store computer 90 would update the current inventory order so that the inventory order matched the current product requirements.

Next, in step 480, the store computer 90 would determine if a facing on a shelf was empty. If there was an empty facing, the store computer 90 would then notify the store management that there was an undesirable empty facing in step 485. The store management could then decide the appropriate action to take depending on the type of product and the availability of substitute goods. If the facing was not empty, the store computer 90 would wait until the next product update.

Figure 6:
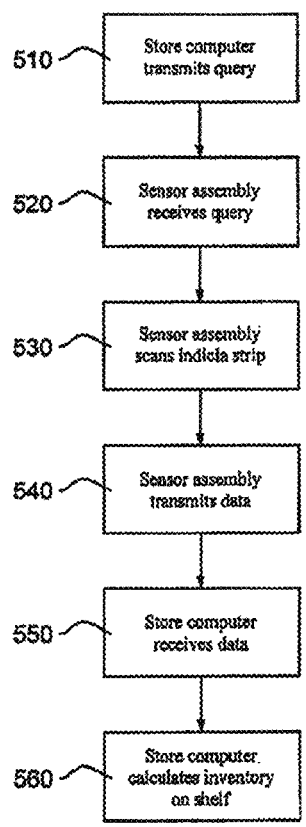
FIG. 6 illustrates a flow chart demonstrating a method of determining the amount of product on the shelf via a query from store computer.

FIG. 6 depicts an embodiment of a method for determining the amount of inventory on the shelf in a two-way system. In step 510, the store computer 90 sends a query to a sensor assembly 30. The sensor assembly 30 contains a controller 55 that is identified by a unique serial number or identifying code.

In step 520, the sensor assembly 30 receives the query from the store computer 90. In response to the query, the controller 55 activates the sensor 50 and prepares to receive data reflecting the position of the pusher 25. In step 530, the sensor 50 scans the indicia strip 21 and the controller 55 generates a pusher code representative of the position of the pusher 25.

In step 540, the sensor assembly 30 transmits the pusher code representative of the position of the pusher 25 along with the unique serial number of the controller 55 to the store computer 90.

Next, the store computer 90 receives this transmission in step 550. This transmission can be sent directly from the sensor assembly 30 to the store computer 90 or, preferably, it can be indirectly through a network. The transmission can be sent in a wireless manner, over wires, or some combination of a wireless and wired transmission.

Then, in step 560, the store computer 90 determines the level of inventory on the shelf. In an embodiment, the determination can be based on the product dimension and the position of the pusher 25. In an alternative embodiment, the determination can be based solely on the position of the pusher 25.

Figure 7:
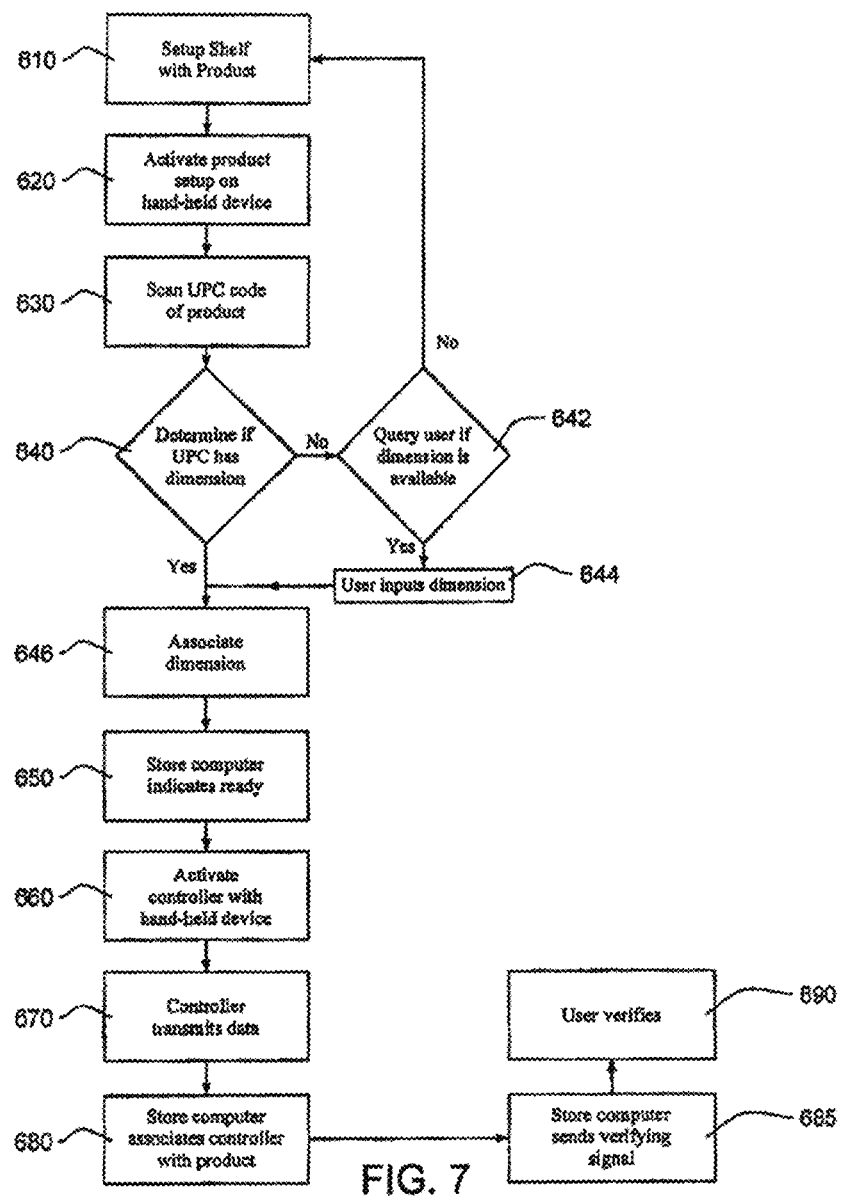
FIG. 7 illustrates a flow chart demonstrating a method of updating the association of particular product with a particular shelf location.

FIG. 7 depicts an embodiment of a method for setting up a controller for a particular product. In step 610, the product can be placed on the shelf in the appropriate facing. Alternatively, step 610 can be skipped and the set-up can start with step 620.

In step 620, a set-up button on a hand-held device is pressed. The hand-held device is configured to transmit a signal to a store computer 90 indicating that the user of the hand-held device is about to associate a product with a serial number or identifying code of a controller 55. Preferably, the transmission of signals between the hand-held device and the store computer 90 is done in a wireless manner. In an embodiment, the store computer 90 provides feedback to the user indicating that the store computer 90 is ready to proceed. In an alternative embodiment, no feedback is provided.

Next, in step 630, the UPC code of the product is scanned and transmitted to the store computer 90. Then, in step 640, the store computer 90 looks up the product dimension based on the UPC code. If the UPC code does not have a listed dimension, the store computer 90 checks if the user can input the needed dimension in step 642. If the user cannot, the setup is terminated and the user can try to setup a new product. If the user can determine the dimension, the user enters the dimension in step 644.

Next, in step 646, a dimension is associated with the UPC code. Then, in step 650 the store computer 90 sends a signal to the hand-held device to indicate that the user should proceed with the setup.

Next, in step 660 the user activates the controller 55 with the hand-held device. In an embodiment, an optical setup sensor is mounted on the pusher assembly and is connected to the controller 55. Preferably, the setup sensor is recessed in the pusher 25 but could be mounted in other locations such as on the top or the side of the pusher 25. The hand-held device will be configured to transmit a signal to the setup sensor. The act of transmitting the setup signal to the setup sensor will cause the controller 55 to awake from a dormant state.

Then in step 670, the controller 55, in response to the setup signal, will send data indicating that the controller 55 is being setup to the store computer 90. The data will include the unique serial number of the controller 55. The data may also include a generic setup code or a setup code corresponding to the hand-held scanner and can include a pusher code representative of the position of the pusher 25. In the event that multiple hand-held devices are being utilized at the same time, it may be beneficial to provide a setup code associated with a particular hand-held device.

Next, in step 680, the store computer 90 will receive the data from the controller 55. If the data includes the pusher code, the store computer 90 can calculate the amount of product in the facing at this time. In step 685, the store computer 90 sends a signal to the hand-held device indicating that the controller 55 has been setup and associated with the UPC code of a particular product. In addition, if the position of the pusher 25 was originally included, the store computer 90 can also provide a calculation of the current quantity of product in the facing that was just set up. In addition, the store computer 90 requests that the user verify that the setup information is correct.

Finally, in step 690, the user indicates the information is correct. Upon verification, the setup for the controller 55 is complete. To change the product associated with the controller 55, the process can be repeated.

Figure 8:
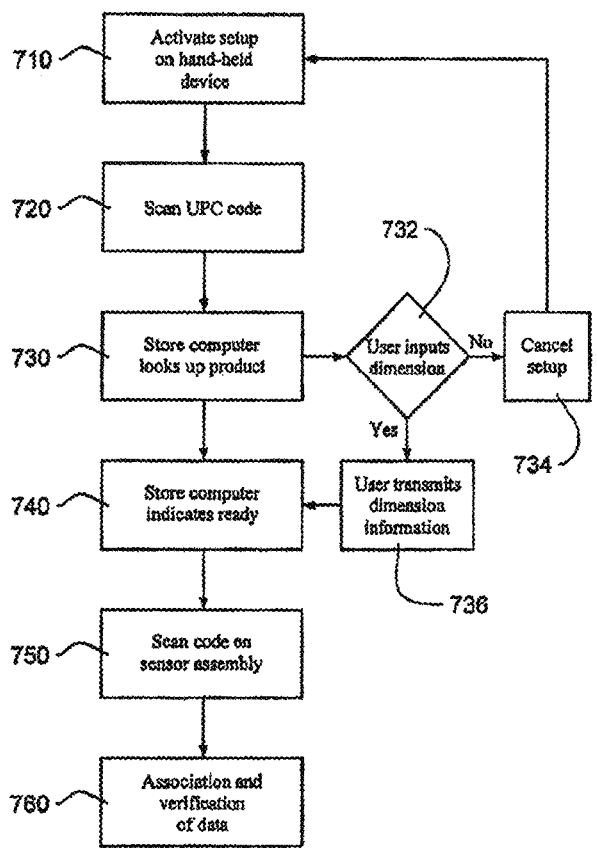
FIG. 8 illustrates a flow chart demonstrating an alternative method of updating the association of a particular product with a particular shelf location.

FIG. 8 illustrates an alternative method of associating a controller with a product. In step 710, a hand-held device is activated to indicate that the user is about to setup controller 55. The activation includes the transmission of a signal to a store computer 90.

In step 720, the hand-held device is used to scan the UPC code of the product and transmit the information to the store computer 90. Next, in step 730, the store computer 90 looks to see if a product dimension is listed for that scanned UPC code. In the event that no dimension is associated with the UPC code, the computer, in step 732, transmits a signal to the hand-held device requesting the user to input the appropriate product dimension.

If the user does not know the product dimension or cannot measure the dimension, the user can cancel the setup and start over with a new product in step 734.

If the user does know the dimension or is able to measure the dimension, the user then enters the dimension and transmits the information to the store computer 90 in step 736. After the product dimension is determined, in step 740, the store computer 90 sends a signal to the hand held device indicating that the user should proceed.

Next, in step 750, the user scans the serial number of the controller 55. Preferably, the serial number of the controller 55 is printed in a black/white code on a sticker mounted to the sensor assembly 30. After scanning the serial number, the hand held device transmits the serial number to the store computer 90.

Then, in step 760, the store computer 90 associates the UPC code of the product with the serial number of the controller 55. The store computer 90 then signals the hand held device that the setup for the device is complete. To avoid potential communication problems during setup, all communications between the hand-held device and the store computer 90 can include a code representing the hand-held device.

In an alternative embodiment, the method of associating a product with a controller 55 could be done without sending a signal to the store computer 90. In this embodiment, the data would be uploaded from the hand-held device once the user had associated the various controllers with the various products.

As can be appreciated, numerous methods of product association with a controller 55 are possible, thus the above methods are illustrative.

A system for determining the location of the pusher with an indicia strip and sensor has been described. Numerous additional methods exist for measuring the distance between the front or rear of a shelf and the pusher or the final product in a facing of products. Based on this distance, and understanding the dimension of the products in the facing, a simple calculation can be performed to determine the number of products in the facing. This calculation can be performed by a microprocessor, store computer, controller or some other processing device which has received the information regarding the distance between the shelf front and the last product in a facing. Moreover, the pusher assembly has been described to include a spring. However, some other biasing method, such as gravity or magnetism, would also work to move the pusher and the product forward.

Figure 9:
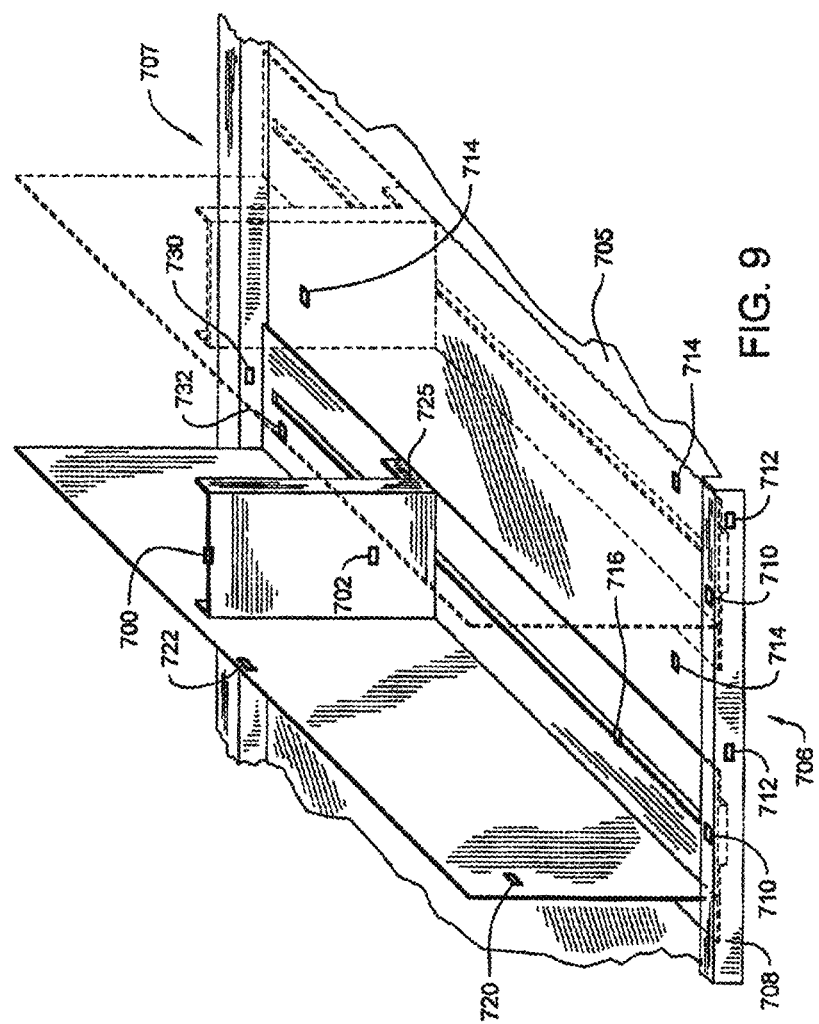
FIG. 9 illustrates an isometric view of an alternative embodiment of the present invention.

In an embodiment of the present invention, as illustrated in FIG. 9, the use of transmitted light or other signal, such as a radio frequency signal, that is passed between a position near the back of the facing of products and a stationary position can be used to measure the distance between the front of the shelf and the pusher. In one embodiment, a transmitter 700 or 702 is incorporated into a pusher 725. The transmitter generates a light or other signal that can be transmitted on command, periodically or continuously. A light emitting diode (LED), radio frequency or ultrasonic generator or other signal generation device can be used to generate the light or signal.

A corresponding receiver is incorporated into a location that is stationary in relation to the pusher 725. The receiver 712 can be incorporated into a front rail or another location at or near the front of the shelf, a receiver 730 can be incorporated into a rear rail or other location at or near the rear of the shelf, it also can be incorporated into the floor of the shelf, the track of the pusher, the roof of the shelf or the divider wall. The receiver detects the signal that is sent from the transmitter. For example, a LED may radiate light having a particular intensity. A phototransistor acting as a receiver detects the light signals being emitted from the LED. The sensitivity of the phototransistor and the intensity of the LED may be adjusted by the microprocessor in order to adjust the overall sensitivity of the optical components. In an embodiment, the adjustment can be done remotely. Thus, the transmitter can communicate in a wireless fashion with the receiver through RF, IR or other known means such as magnetic fields, electrical fields, sound waves and the like.

The transmitter and receiver may be in communication with a controller that tracks the time of sending and receiving. This data can be provided to a processing device such as a microprocessor or a store computer, thus in this embodiment the pusher code would include the time interval between sending and receiving. Information regarding the time at which the signal was sent and the time at which it was received may be utilized by a processing device to determine the time between the transmission and the receipt of the signal. Based on this length of time, the processing device can calculate the distance between the transmitter and the receiver. Knowing the dimensions of the shelf, the pusher system and the components thereof, this distance can then be translated into the distance between the front side 6 of the shelf and the face of the pusher 25 that is biased against the back of the facing of products. Such a translation is well known and within the knowledge of one of ordinary skill. If the relevant dimension of the products in the facing is known, the processing device can then calculate the number of products in the facing based on the known dimension of the products.

In an alternative embodiment, the transmitter and the receiver switch locations. The transmitter can be placed at or near the front or the rear of the shelf or other relatively stationary position and the receiver can be placed on or near the pusher. In an alternative embodiment, the transmitter and the receiver can be incorporated into the same device which merely bounces a signal off a stationary position. For example, a reflector can be placed on the pusher and a transmitter/receiver using a laser, or some other light source, can determine the distance between the reflector and the transmitter/receiver based on the time of travel. Examples of possible transmitter/receivers include, but are not limited to, optical displacement measurement sensors and reflective laser sensors. As can be appreciated, if a transmitter and a receiver are used to determine distance, it is preferable that the location of either the part that is stationary be located near the front side or the rear side of the shelf so as to make the distance calculation simpler and to avoid problems with symmetric distances on both sides of the stationary unit mounted to the shelf. For example, mounting a transmitter halfway between the front and rear of the shelf would make determining the location of the pusher more complicated because there would be two possible locations for a given distance.

In an embodiment, depicted in FIG. 9, a transmitter (700, 702) is incorporated into a pusher 725. The transmitter is a light emitting diode and is located at any location on the pusher 725 that allows the transmitter to function. The transmitter can be located at the top of the pusher 725 at 700 or at the base of the pusher 725 at 702 or at other locations on the pusher 725.

A receiver is located at a position that is fixed in relation to the movement of the pusher 725. The receiver may be a phototransistor and can be located on the front of the shelf 705, such as receiver 710 or on a front rail 708 connected to the front of the shelf, such as receiver 712. The receiver can further be located on the floor of the shelf at any number of positions as represented by 714, on the floor of the pusher track at 716 or at a location above the shelf 705 such as on another shelf (not shown) mounted above the shelf 705. The receiver can be located on the divider wall at 720 or 722 or other location on the divider wall. The receiver also can be located near the rear side 707 at 730 or at 732. Preferably, the receiver will be mounted near the either front side 706 or the rear side 707 so as to make distance calculation simpler.

The receiver and the transmitter can also switch locations. The pusher can incorporate a receiver, and a transmitter can be incorporated at any of the locations 710-732 as well as in any other location that is fixed in relation to the movement of the pusher. Preferably, however, the location of the transmitter will be near either the front side 706 or the rear side 707 so as to make calculation of distance simpler.

In an embodiment, the transmitter is located at 700 and the receiver is located at 710. When the pusher moves backward or forward on the shelf, the transmitter 700, mounted on the pusher 725, moves with the pusher 725. When the pusher 725 is located near the back of the shelf, a signal will take a certain amount of time to travel from the transmitter 700 to the receiver 710. When the pusher 725 is located closer to the front of the shelf, a signal will take less time to travel from the transmitter 700 to the receiver 710. Data regarding the transmission and receipt of the signal (i.e. the pusher code) is sent to a microprocessor or other processing device. The processing device determines the amount of time it takes the signal to travel from the transmitter to the receiver. Knowing the signal travel speed, the processing device determines the distance between the transmitter and the receiver.

With an understanding of the location of the transmitter in relation to the products and an understanding of the location of the receiver in relation to the front or back of the shelf, the processing device will be able to determine the distance between the pusher and the front of the shelf. Using the dimension of the products, the processing device can then determine the number of products in the facing. The light emitting diode or other transmitter can be set to function periodically, continuously or on command from a remote location.

Alternatively, the processing device may control both the LED and phototransistor. The processing device may record a time T1 in which the microprocessor issues a command to generate a pulse from the LED and a time T2 in which the light signal is detected by the phototransistor. Both of these times T1 and T2 may be stored in memory and used to determine the number of product in the facing, using the above described relationships.

In an alternative sensing environment, a capacitive proximity sensor may be utilized to measure the distance between the front of the shelf and the pusher or the final product in a facing of products. The capacitive proximity sensor detects the pusher which acts as a target for the capacitive proximity sensor. The capacitive proximity sensor generates an electrostatic field which is directed at the target. As the distance of the pusher changes with respect to the location of the capacitive proximity sensor, the capacitive proximity sensor reacts to the changes in capacitance caused by the movement of the pusher in relation to the sensor.

Additional sensing environments may also include the use of magnetic proximity sensor or an inductive proximity sensor. In both sensing environments, the proximity sensors may be utilized to measure the distance between the front of the shelf and the pusher or the final product in a facing of product.

An inductive proximity sensor is useful in detection of metal targets as the inductive proximity sensor uses an induced field to sense the target object. In an embodiment with an inductive proximity sensor, the proximity of a pusher in relation to the inductive proximity sensor can be detected as the distance of the pusher changes with respect to the location of the inductive proximity sensor. Similarly, a magnetic proximity sensor based on the Hall Effect principle may also be utilized to sense the location of the pusher.

In an embodiment, a proximity sensor could be mounted near the rear side 707, the proximity sensor configured to sense the distance to the pusher 25. A processing device, such as the store computer or microprocessor, could determine the distance between the pusher 725 and the front side 706 and use that distance to determine how much product was left on the shelf.

In an alternative embodiment, a Radio Frequency Identifying Transponder ("RFIT") having a unique identity code is mounted to the pusher 725. A sensor assembly including a transmitter/receiver can be mounted on the rear side 707 of the shelf 705. The transmitter/receiver, when activated, transmits an activation signal that activates the RFIT. The RFIT, upon activation, transmits a responsive signal that includes the unique identifying code. The transmitter/receiver receives the responsive signal from the RFIT. The sensor assembly is equipped with a timing device and measures the time between the initial transmission of the signal from the transmitter/receiver until the receipt of the responsive signal from the RFIT. In an embodiment, a controller can initiate the transmission of the signal and record the receipt of the responsive signal into memory. The controller is also equipped with a timing device to measure the delay. The delay in time can be used to calculate the distance between the transmitter/receiver and the RFIT. In an embodiment, the controller can calculate the distance and provide a pusher code that includes the distance. Alternatively, the pusher code will include data regarding the delay and the pusher code will be forwarded to a processing device for distance calculation. As discussed above, the distance between the pusher 25 and the transmitter/receiver can be used to calculate the amount of product remaining in the shelf.

An advantage of using an RFIT in combination with a transmitter/receiver is that it can be easily retro-fitted to existing systems. As the RFIT does not require internal power, this embodiment eliminates the need to provide a powered device on the pusher 725. The transmitter/receiver, however, is powered. Preferably, the transmitter/receiver transmits a focused or low powered signal so that only the RFIT associated with the transmitter/receiver is activated. Alternatively, the transmitter/receiver ignores responsive signals from RFIT's that do not include the proper unique identifying code.

In another alternative embodiment, a low powered, one-chip radar sensor may be used to determine the distance between the radar sensor and the pusher 725. Preferably the radar sensor may be mounted near the rear side 707 so as to make distance determinations less complex.

In an alternative embodiment of the present invention, a device for measuring the tension of the spring used for pushing the products can be used. The tension on the spring will, at least in part, be dependent upon the number of products in front of the pusher. As more products are placed in front of the pusher, the spring either further compresses or expands. In the case of a coil spring, as more products are placed in front of the pusher, the two ends of the spring move further apart and the spring further uncoils. As the spring uncoils, the amount of tension or pressure within the remaining coil of the spring increases. By measuring the tension of the spring, the length of the spring that is uncoiled can be determined.

The spring tension measuring device can incorporate a processing device or can transmit the information it measures to a microprocessor or other processing device. With a previous understanding of how the tension on the spring relates to the length of the spring, the processing device can determine the amount or length of spring that is uncoiled. For example, if the coil spring has a fixed spring constant, "k", then the formula $F=-kX$ can be used to calculate the length of spring that is uncoiled. This information can be used to determine the distance between the front of the shelf and the pusher. Understanding the dimensions of the products, the computing device can then determine the number of products in a facing.

A spring tension measuring device may include a force measuring unit that includes, but is not limited to, strain gauges, tensiometers, torque transducers or some other force measuring device to determine the tension exerted on the coil spring. The force measuring unit is preferably connected to a controller, where the controller is configured to convert the data from the force measuring unit into a force value. The controller could then transmit the force value to a processing device. In this embodiment, the pusher code would include a force value. Numerous other methods of measuring spring tension will be apparent to one of skill in the art and are within the scope of the invention.

In an alternative embodiment of the present invention, the number of products remaining in a particular facing is determined in part through the use of one or more transmitter(s) and receiver(s) placed on opposite lateral sides of the products. In one embodiment the transmitters or receivers may be placed on divider walls that separate facings of products. In one embodiment, a series of transmitters is incorporated into or onto the base of a divider wall. A series of receivers in incorporated into or onto the other side of the divider wall. In this manner, when products are on a shelf, those products that are being pushed are between the transmitters on one divider wall and the receivers on another divider wall.

Periodically, when prompted, or continuously, the transmitter sends a signal. If there is no product between the transmitter and the receiver, the receiver will receive the signal. If there is a product between the transmitter and the receiver, the product will block the signal, and the signal will not be received by the receiver.

A microprocessor receives the information regarding whether or not the various receivers received a signal. Based on this information, the microprocessor can determine the approximate distance between the front of the facing and the last product in the facing. With an understanding of the dimension of the products, the information regarding receipt and non-receipt of signals can be translated into an understanding of the approximate number of products in the particular facing. In an embodiment, one transmitter and one receiver is used to indicate that a particular shelf is running low on the associated product. In this embodiment, the location of the transmitter/receiver is preferably closer to the front side 706 then the rear side 707. Preferably a controller with a unique identifying code is associated with the transmitter and receiver so that the unique identifying code can be associated with the product.

The transmitter and the receiver can be incorporated into the same device which attempts to bounce a signal off a predetermined target affixed to a particular location. If the signal bounces as expected, it indicates that there is no product between the transmitter and the target location. If the signal does not bounce as expected, a product exists between the transmitter and the target location.

Figure 10:
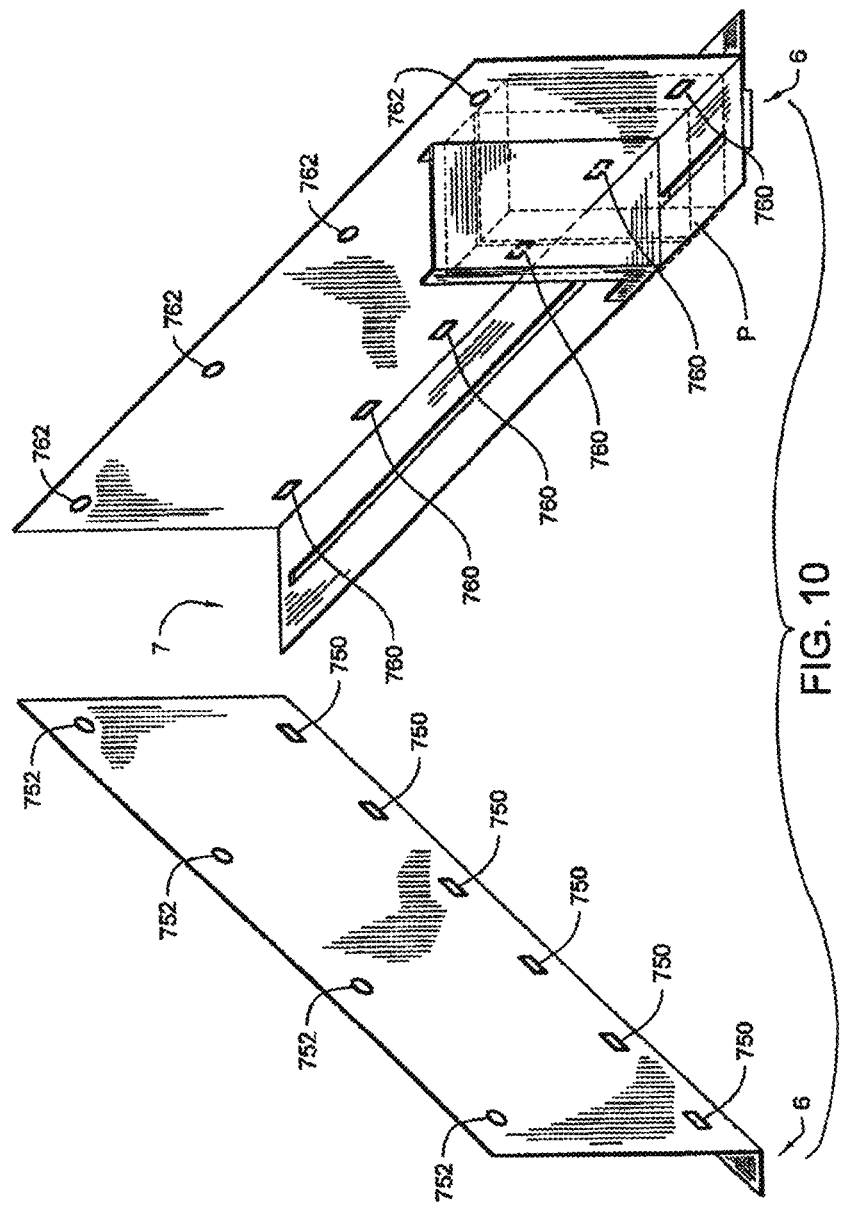
FIG. 10 illustrates a partially exploded view of an alternative embodiment of the present invention.

FIG. 10 depicts a partially exploded view of an alternative embodiment of a shelf and pusher assembly, the shelf having divider walls. As depicted in FIG. 10, several transmitters 750 are placed on the left side of the divider wall toward the bottom. The transmitters also can be placed higher on the divider wall as shown at 752. Corresponding receivers 760 are placed on the right side of the divider wall toward the bottom. These receivers also can be placed higher on the divider wall as shown at 762. The receivers and the transmitters are positioned such that an unobstructed signal can be sent from a transmitter and received by a corresponding receiver. When product, such as product P, is positioned in front of a pusher, it can obstruct the signal sent from the transmitter. As shown in FIG. 10, product P (shown in dashed lines) will prevent the signal from reaching the receiver 760 nearest the front side 6 of the shelf. The receivers that are positioned further back than product P will receive the signals sent to them. A microprocessor receives the information regarding whether each of the receivers 760 received signals. Based on this information, the microprocessor can determine the distance between the front of the shelf and the last product in a particular facing. With an understanding of the width of each product, the microprocessor can determine the number of products in a particular facing.

In one embodiment of the present invention, the pusher contacts a variety of sensing devices as it moves backward or forward on a shelf. Sensing devices are placed on a surface below, above, or on the sides of a pusher. These sensing devices include devices that are mechanical, electrical and electromechanical, optical and magnetic, and can include spring loaded latches, electrical contacts, light emitting diodes or metal wires or other sensors such as linear position sensors.

As the pusher moves backward or forward on a shelf, it interacts with the sensing devices. The pusher may interact with the devices through the mechanical contact of the pusher and the devices. The pusher may also be equipped with a separate sensing device that interacts with the stationary sensing devices as the pusher moves backward or forward.

Information regarding the interaction between the pusher and the sensing devices (i.e. the pusher code) is sent to a processing device. Based on the determination of the devices with which the pusher interacted, the processing device can determine the approximate position of the pusher in relation to the front of the shelf. With an understanding of product data, such as the dimension of the product, a processing device can then determine the approximate number of products that are in the particular facing related to the pusher and the sensing devices.

Figure 11:
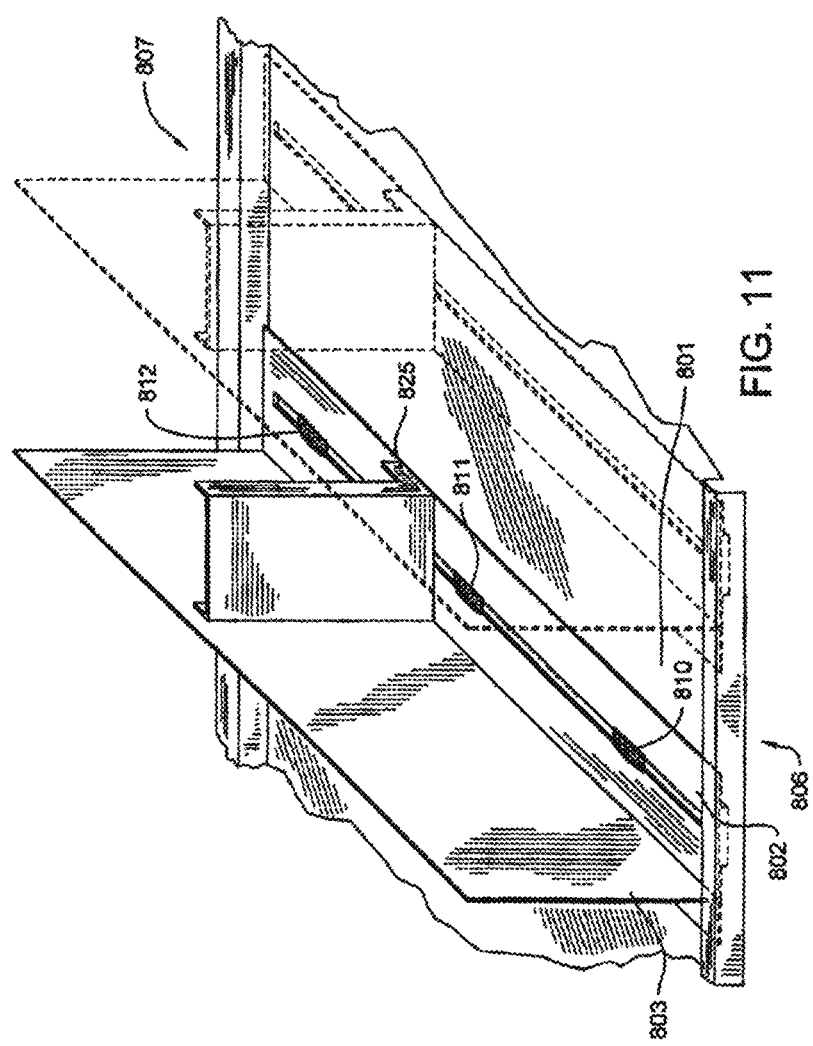
FIG. 11 illustrate an isometric view of an alternative embodiment of the present invention.

In an embodiment, as depicted in FIG. 11, sensing devices 810, 811 and 812 are incorporated into the base of the track on which the products rest. When products are resting directly over the switches, the sensing devices are closed. As products are removed and the pusher 825 travels forward, the sensing devices that are to the rear of the pusher 825 are released and open. A controller determines which sensing devices are open or closed. Based on this information, a processing device can determine the approximate distance between the pusher 825 and the front side 806 of the shelf. Knowing the dimension of the products, the processing device can determine the number of products in a particular facing.

Figure 12:
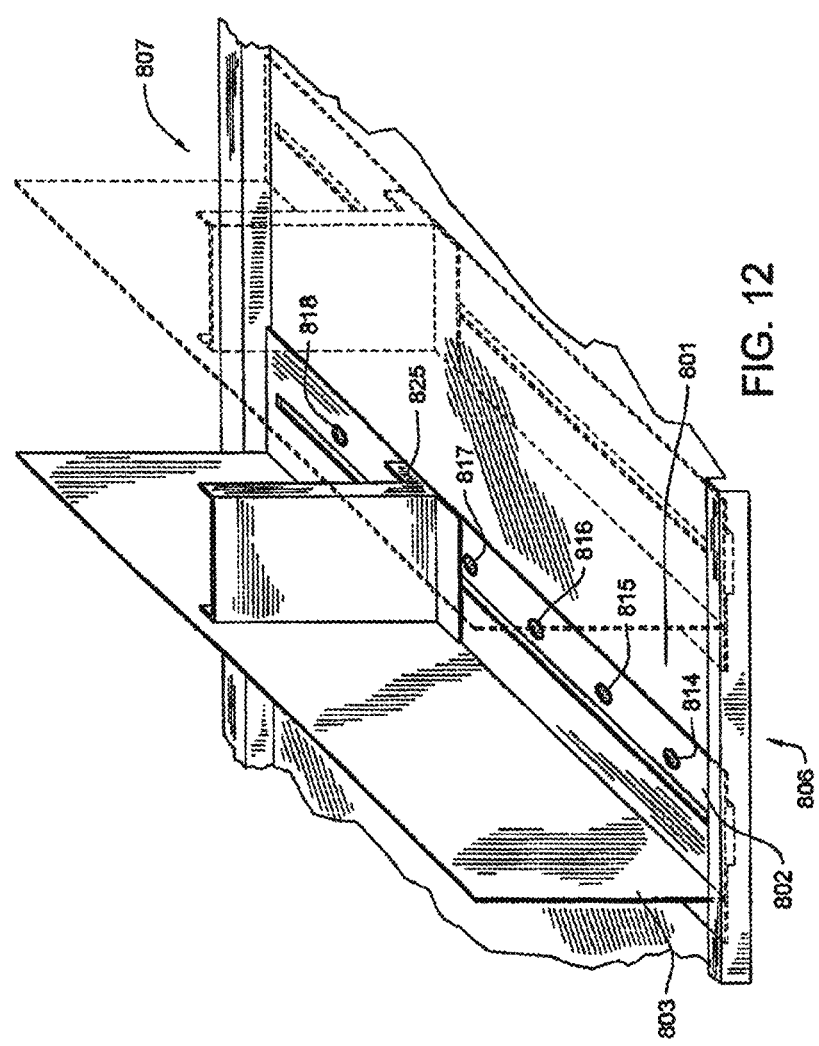
FIG. 12 illustrates an isometric view of another alternative embodiment of the present invention.

In an alternative embodiment, as depicted in FIG. 12, sensing devices 814, 815, 816, 817, and 818 are placed on the pusher track 802. A separate contact (not shown) is placed on the bottom of the pusher 825. The contact on the pusher 825 is configured such that when the contact on the pusher 825 is adjacent to a sensing device mounted on the pusher track 802, the sensing device on the pusher track 802 is activated. When the sensing device is activated, a signal is sent to a processing device, the signal providing information as to which sensing devices has been activated. Based on this information, the processing devise can determine the approximate distance of the pusher from the front of the shelf. Knowing additional data about the products, such as the product dimensions, the processing device can determine the number of products in a particular facing.

For example, while contact 816 is activated, the processing device can determine that the amount product is equal to the amount of product that can fit in the space between the contact 816 and the front side 806 of the shelf 801. In the event that the contact 816 is activated and then deactivated, the processing device can determine that the pusher 825 is between contacts 815 and 817. This, therefore, provides an approximate position of the pusher 825 and the approximate position can be used to determine the approximate quantity of product remaining on the shelf. In an embodiment, the contacts can be spaced closer together near the front side 806 of the shelf 801 so that more accurate measurements can be taken as the amount of product on the shelf decreases. Alternatively, enough contacts can be used to provide a relatively precise location of the pusher 825.

Figure 13:
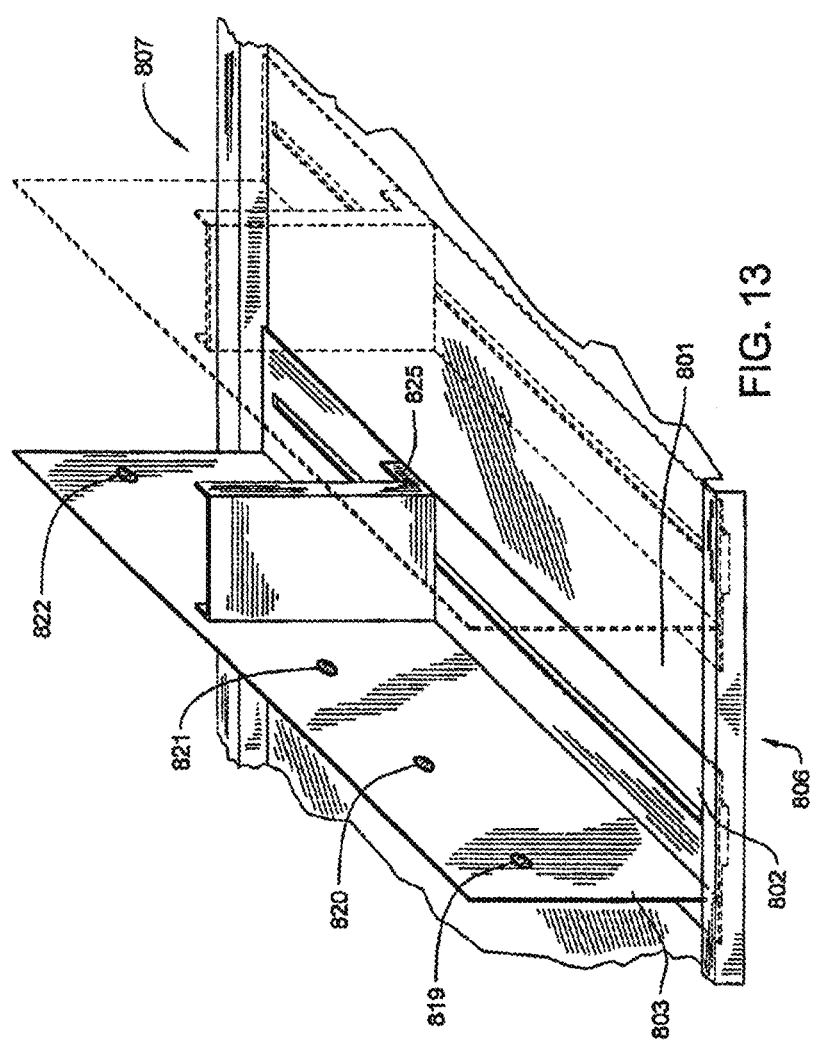
FIG. 13 illustrates an isometric view of yet another alternative embodiment of the present invention.

In an alternative embodiment, as depicted in FIG. 13, the contacts 819, 820, 821 and 822 can be mounted to the divider wall 803. As with contacts 814-818, the activation of one of the contacts 819-822 indicates the location or the approximate location of the pusher 825. Locating the contacts along the divider wall 803 can help prevent problems with accidental activation of the contacts by product on the shelf. As with the contacts mounted in the pusher track 802, the distance between contacts 819-822 can be non-uniform so that greater precision is provided as the shelf becomes less full.

Figure 14:
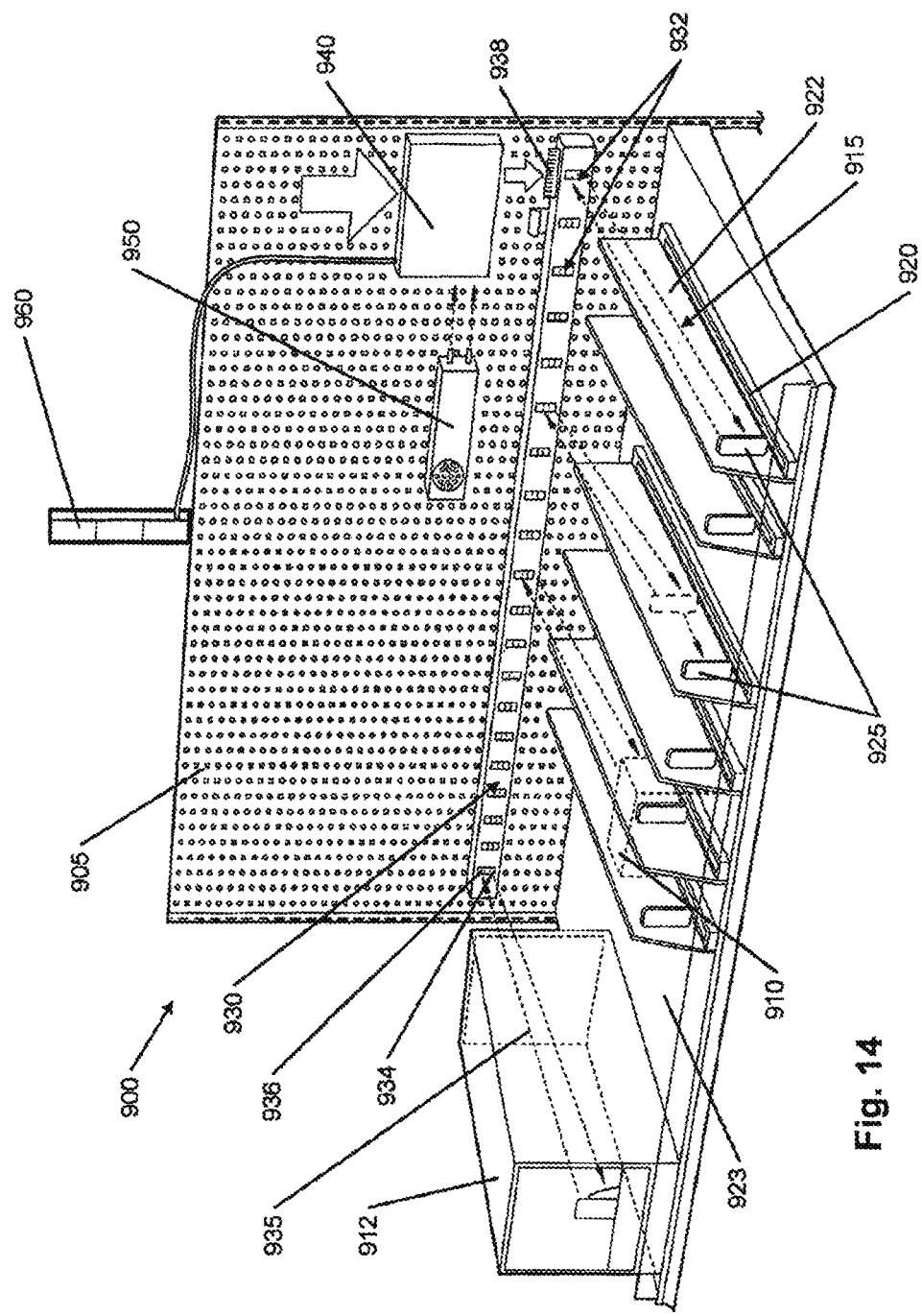
FIG. 14 illustrates an isometric view of yet another alternative embodiment of the present invention.

In an alternative embodiment similar to the embodiments described above, a shelf management system 900 for detecting and communicating the position of a pusher assembly on a shelf is depicted in FIG. 14. The shelf management system 900 may include a pusher assembly 915, a light assembly, and a control module 940. The pusher assembly 915, light assembly, and control module 940 may all be secured to a gondola wall 905 or similar structure that holds a product 910. The product 910 may be aligned or arranged along the pusher assembly 915. Additionally, the product 910 may be contained in separate product container box 912 as illustrated in FIG. 14.

As depicted, the pusher assembly 915 may include a biasing mechanism such as a coil spring. The pusher assembly 915 may include an integral divider wall 922 and a floor section 920 on one or both sides of the divider wall 922. The coil spring may be operatively connected or associated with a pusher 925 and can be used to urge the pusher 925, and the associated product 910, toward the front side of the shelf. The pusher assembly 915 may be modular and can include a divider wall or an additional floor section that fits or mates in place. Additionally, since the present invention has no connection to the pusher assembly 915, the present invention may work with any product shelving system.

The light assembly may include a light channel 930 and a light transceiver 932. The light transceiver 932 may be one of many light transceivers located on the light channel 930. The light transceiver 932 may be located behind the product 910 to be measured on a shelf. The light transceiver 932 may consist of a light transmitter 934 and a light sensor 936. The light transmitter 934 is configured to send a light signal 935 towards the pusher 925, while the light sensor 936 is configured to receive the light signal 935 from the pusher 925. In an alternative embodiment, the light transmitter 934 and the light sensor 936 may be the same component as part of the light transceiver 932. The spacing of the light transmitters 934 and the light sensors 936 on the light channel 930 may ensure that at least one light transmitter 934 and one light sensor 936 is focused on or sees every pusher 925. Additionally, the light channel 930 may include an electronic connection 938.

Without departing from this invention, the light assembly may utilize one of many different types of light, with one type of light being utilized is in the "infrared spectrum." For example, the light assembly could include an infrared (IR) transceiver, wherein the IR transceiver may consist of an IR transmitter and an IR sensor.

As illustrated in FIG. 14, the shelf management system 900 may also include a control module 940. The control module 940 may align with the electronic connection 938 on the light channel 930 and lock into place. The control module 940 may include a microcomputer. Additionally, the control module 930 may have internal wireless capability without departing from the invention.

As illustrated in FIG. 14, the product 910 may be pushed forward by the spring-urged pusher 925 or pusher paddle in the shelf management system 900. As the product 910 is pushed forward, a light signal 935 is transmitted from the light transmitter 934 found on the light channel 930. The light signal 935 may then reflect off the back of the pusher paddle 925 or the product 910 and then back to the light sensors 936. This information may then be relayed to the control module 940, thereby measuring the distance to the pusher 925 or the product 910. The light transceiver 932 may be controlled by the control module 940 and microcomputer connected to the light transceiver 932. The process of sending the light signal 935 to and from the pusher paddle 925 or the product 910 may be taken on a continuous or near continuous basis, such as a fraction of a second, or may be taken on a periodic basis such as a second, or 5 seconds.

In an aspect of the invention, the microcomputer in the control module 940 may compare the most current position of the pusher 925 with a previous position of the pusher. The difference in positions of the pusher 925 may result in the microcomputer determining a condition of the shelf management system 900. First, the microcomputer may determine that no activity has occurred since the last reading. Second, the microcomputer may determine that a normal shopping instance has occurred, and if so how many product packages are still being urged by the pusher 925. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 925.

As illustrated in FIG. 14, without departing from the present invention, the shelf management system may include a local audio box 950. Any of the conditions described above may be communicated by the microcomputer to the local audio box 950 remotely via wired or wireless communication devices to a remote computer, a store public announcement system, a cell phone, a pager, or a remote annunciator. Additionally, without departing from the present invention, the shelf management system may include a light annunciator 960. Any of the conditions described above may be communicated by the microcomputer to the light annunciator 960 remotely via wired or wireless means to a remote computer, a store public announcement system, a cell phone, a pager, or a remote annunciator. An internal wireless capability of the control module 940 may wirelessly transmit signals to/from a remote location to indicate the condition of the shelf management system.

Additionally, for the shelf system 900 illustrated in FIG. 14, the number of products aligned on the shelf could be measured. In such an embodiment, the position of the pusher 925 could be used to determine the amount of product 910 on the shelf without the need to manually count the product. For example, the light transceiver 932 transmits the light signal 935 to the pusher 925 or the product 910. The light signal 935 may then be reflected back to the light transceiver 932 to determine the location of the pusher 925 by measuring and calculating the time to receive the light signal 935 at the light transceiver 932. When one product is removed, for example by a purchaser, the time to receive the light signal 935 back at the light transceiver 932 increases a particular amount. Based on the dimensions of the product 910, specifically the thickness of the product, the control module can calculate how many products have been removed from the shelf by an algorithm of how fast the light signal is traveling back to the light transceiver 932. The control module also can calculate the number of products that remain on the shelf in front of the pusher using in part information regarding the shelf dimensions, including the shelf depth. Additionally, the system can be used in an inventory management mode to help the retailer determine the number of products for inventory purposes and restocking in low-stock or no-stock situations. Without departing from this invention, a user may input the thickness of the product 910 as a setting into the control module 940 during the set-up or loading of the product 910 on the shelf. Additionally, without departing from this invention, the thickness of the product 910 may be determined by the control module 940 after taking a number of different readings from the system, such as a smart or learning system for determining the thickness of the product 910.

The thickness of the product also may be determined by the system when products are initially stocked in the system. The light transceiver 932 transmits the light signal 935 to the pusher 925 when no product is on the shelf. The light signal 935 may then be reflected back to the light transceiver 932 to determine the location of the pusher 925 by measuring and calculating the time to receive the light signal 935 at the light transceiver 932. When one product is added to the shelf, for example by an employee, the time to receive the light signal 935 back at the light transceiver 932 decreases a particular amount. Based on this decrease in the amount of time, the control module can calculate the thickness of the product.

In an alternative embodiment similar to the embodiments described above, FIGS. 15a and 15b illustrate another shelf management system 1000 for detecting and communicating the position of a pusher assembly on a shelf similar to the shelf management system 900 described above and illustrated in FIG. 14. The shelf management system 1000 may include a pusher assembly 1015, a laser assembly, and a control module 1040. The pusher assembly 1015, laser assembly, and control module 1040 may all be secured to a gondola wall 1005 or similar structure that holds a product 1010. The product 1010 may be aligned or arranged along the pusher assembly 1015. Additionally, the product 1010 may be contained in separate product container box 1012 as illustrated in FIG. 15a.

The pusher assembly 1015 may include a biasing mechanism such as a sheet coil spring. The pusher assembly 1015 may include an integral divider wall 1022 and a floor section 1020 on one or both sides of the divider wall 1022. The sheet coil spring may be operatively connected to a pusher 1025 and can be used to urge the pusher 1025, and the associated product 1010, toward the front side of the shelf. The pusher assembly 1015 may be modular and can include a divider wall or an additional floor section that fits or mates in place.

The laser assembly may include a rear reflector strip 1030 and a single light transceiver or laser scanner 1032. The laser scanner 1032 may emit or transmit a laser light or output beam 1035. The laser scanner 1032 may include a moving mirror or rotating mirror (not shown) located within or associated with the laser scanner 1032. Without departing from this invention, in place of or in addition to the moving mirror, the laser scanner 1032 may include an integrated circuit mirror technology, such as microelectromechanical systems (MEMS) mirrors used in the Digital Light Projector (DLP) field, wherein an array of tiny microscopic mirrors are used to direct and alter the output beam 1035. The moving mirror may rotate within the laser scanner to alter the output beam 1035 being emitted from the laser scanner 1032. The transmission and angles of the output beam 1035 may also be altered by other various ways. The moving mirror may be controlled by a microcomputer within the control module 1040. The moving mirror may direct the output beam 1035 from the laser scanner 1032 at various angles, thereby creating a swept beam 1037. The swept beam 1037 may be directed along the rear reflector strip. An example of a portion of the swept beam 1037 is illustrated in FIG. 15b. The process of transmitting the swept beam 1037 from the laser scanner 1032 to and from the pusher paddle 1025 or the product 1010 may be taken on a continuous or near continuous basis, such as a fraction of a second, a second, or 5 seconds.

Figure 15A:
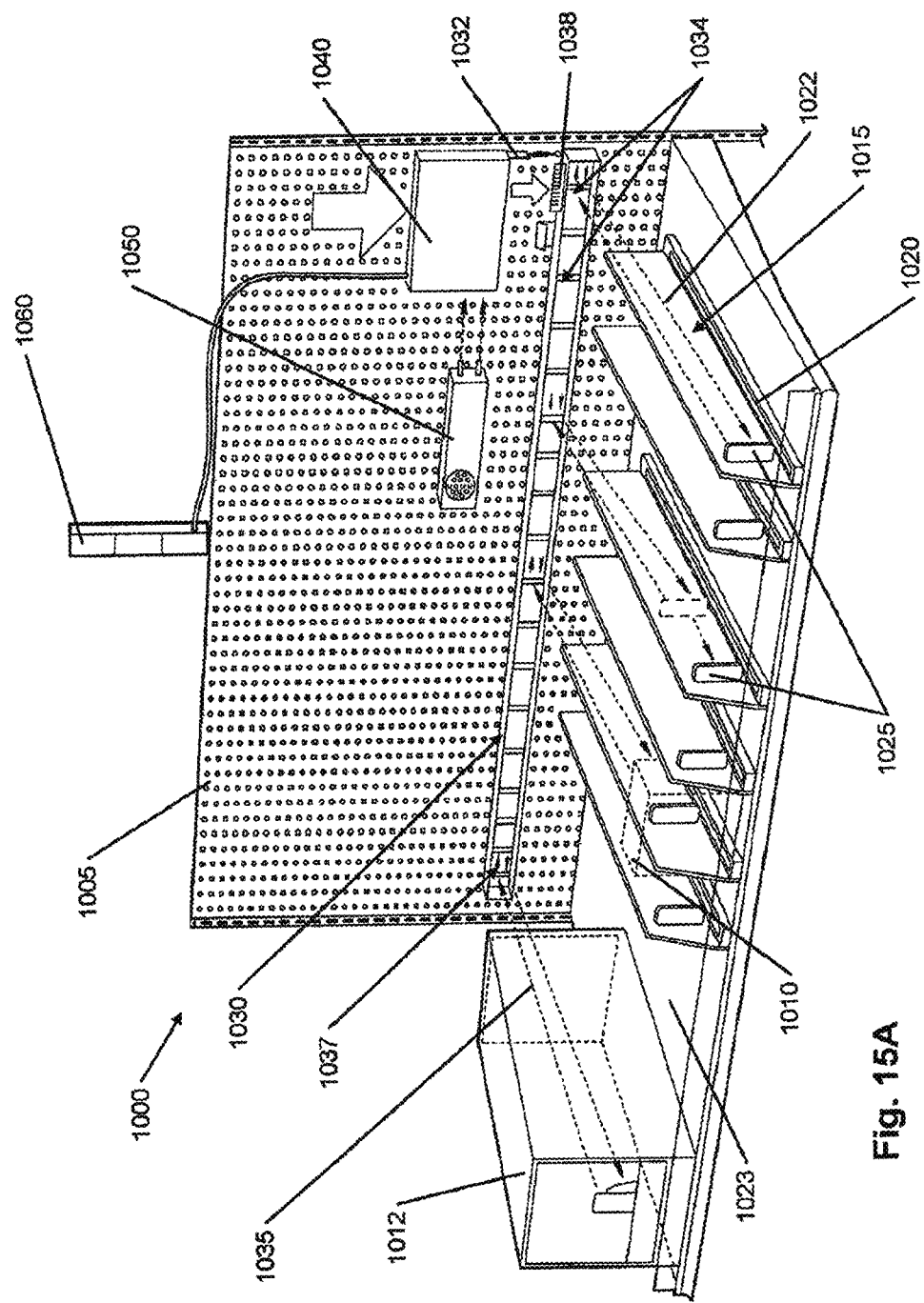
FIG. 15a illustrates an isometric view of yet another alternative embodiment of the present invention.
Figure 15B:
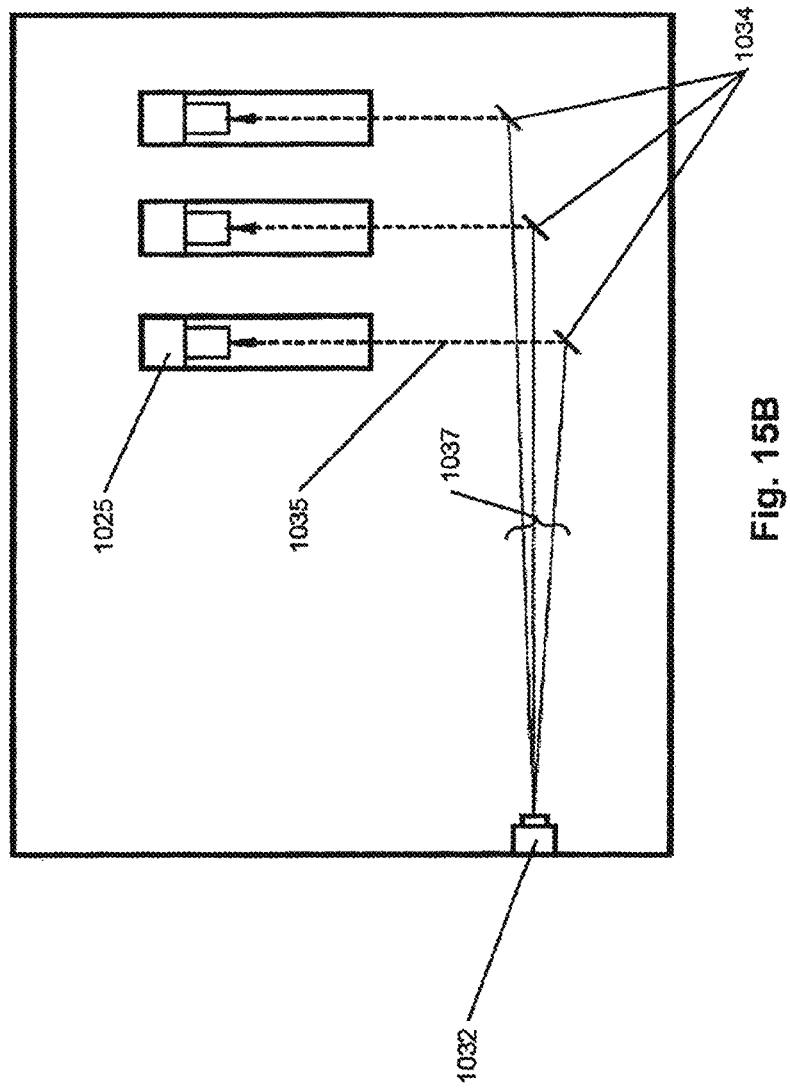

As further illustrated in FIGS. 15a and 15b, the rear reflector strip 1030 may include piece-wise linear or smooth fixed mirrors 1034. The fixed mirrors 1034 may be positioned along the rear reflector strip 1030. The fixed mirrors 1034 may be along, parallel or near-parallel to the path of the swept beam 1037 such that each individual fixed mirror 1034 intercepts the output beam 1035 along its swept path (as shown in FIG. 15b). The fixed mirrors 1034 may also be located along the rear reflector strip 1034 and located behind and essentially perpendicular to the direction of travel of the pushers 1025 in the shelf management system 1000. Additionally, the rear reflector strip 1030 may include an electronic connection 1038.

As illustrated in FIG. 15a, the shelf management system 1000 may also include a control module 1040. The control module 1040 may align with the electronic connection 1038 on the rear reflector strip 1030 and lock into place. The control module 1040 may include a microcomputer. Additionally, the control module 1040 may have internal wireless capability without departing from the invention.

As illustrated in FIGS. 15a and 15b, the product 1010 may be pushed forward by the spring-urged pusher 1025 or pusher paddle in the shelf management system 1000. As the product 1010 is pushed forward, the laser scanner 1032 directs the swept beam 1037 along the rear reflector strip 1030 at one of the fixed mirrors 1034. The fixed mirror 1034 may then redirect the output beam 1035 at a preferred angle (such as a right angle) to the altered path of the output beam 1035 such that the fixed mirror 1034 essentially directs the output beam 1035 to the back of the pusher 1025. The output beam 1035 may then reflect off the back of the pusher 1025 wherein the output beam 1035 then returns back to the laser scanner 1032 for analysis. This information may then be relayed to the control module 1040. The laser scanner 1032 may be configured to measure the distance to the pusher 1025. The laser scanner 1032 may be controlled by the control module 1040 and the microcomputer.

The microcomputer in the control module 1040 may compare the most current position of the pusher 1025 with a previous position. The difference in positions of the pusher 1025 may result in the microcomputer determining a condition of the shelf management system 1000. First, the microcomputer may determine that no activity has occurred since the last reading. Second, the microcomputer may determine that a normal shopping instance has occurred, and if so how many product packages are still being urged by the pusher 1025. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 1025.

As illustrated in FIGS. 15a and 15b, without departing from the present invention, the shelf management system 1000 may include a local audio annunciator 1050. Any of the conditions described above may be communicated by the microcomputer via wired or wireless means to various communication modules, such as: a local or remote audio annunciator 1050, a local or remote light annunciator 1060, a remote computer, a store public announcement system, a cell phone, a pager, or an other remote annunciator. An internal wireless capability of the control module 1040 may wirelessly transmit signals to/from a remote location to indicate the condition of the shelf management system.

Figure 16A:
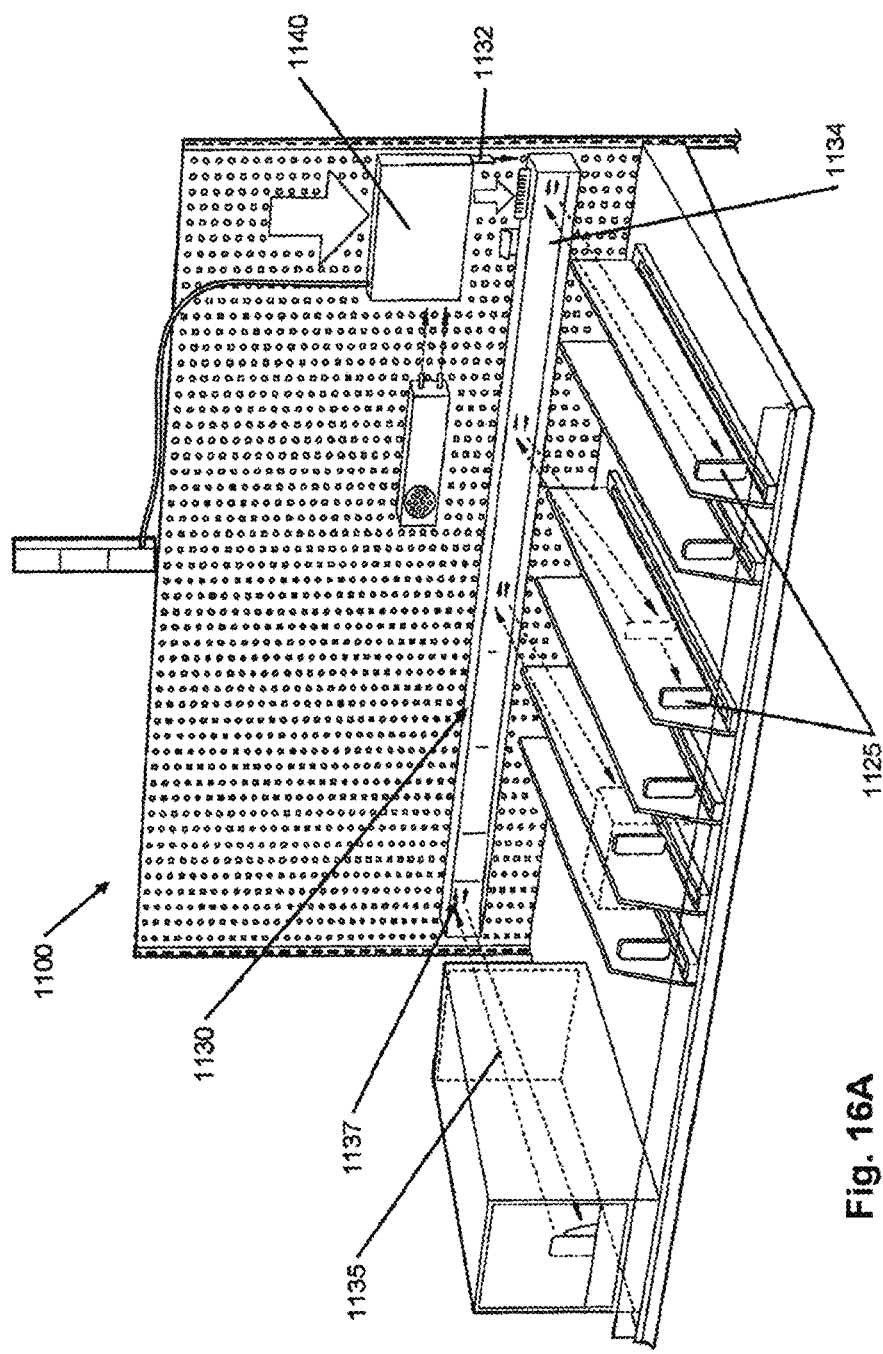
FIG. 16a illustrates an isometric view of yet another alternative embodiment of the present invention.
Figure 16B:
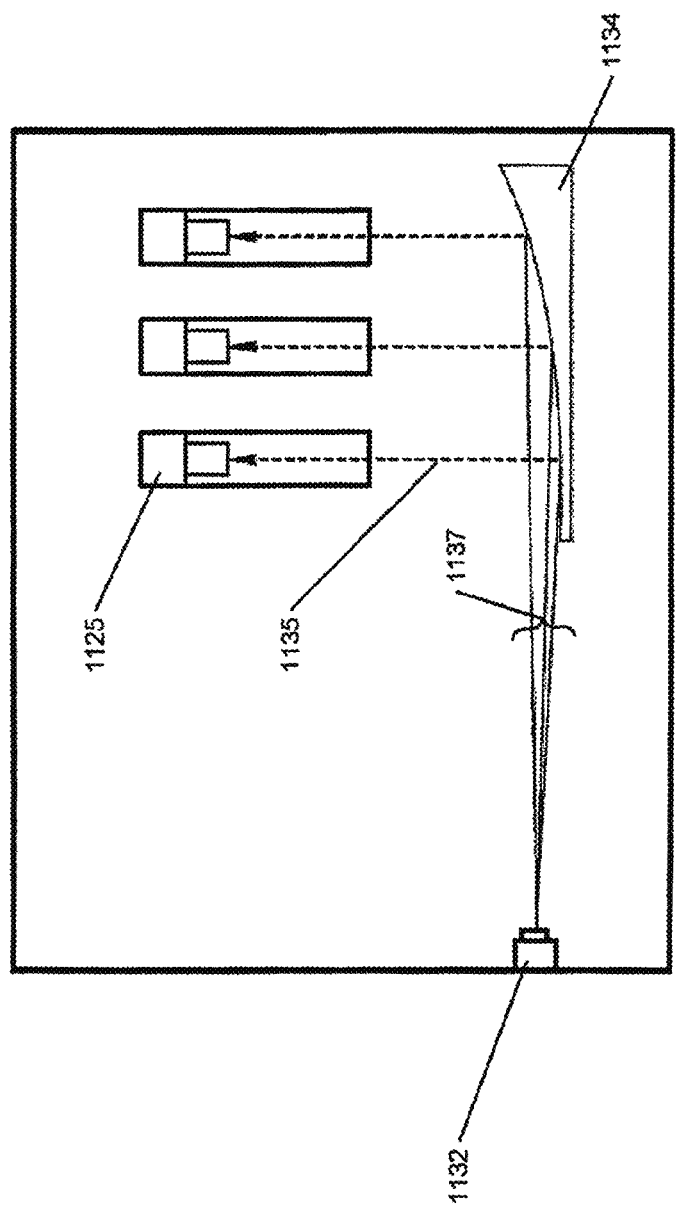

In another embodiment similar to the embodiments described above, as illustrated in in FIGS. 16a and 16b, a shelf management system 1100 may include one fixed mirror 1134 located along the length of the rear reflector strip 1130. In this embodiment, and as illustrated in FIGS. 16a and 16b, the shape of the fixed mirror 1134 may be curved and may be approximately a parabola shape. Since the laser scanner 1132, the moving mirror, and ultimately the swept beam 1137, are controlled by the microcomputer or control module 1140, the microcomputer is capable of determining the position of each pusher 1125 on the shelf by knowing and using the position of the moving mirror at any point in time during the sweeping motion and analyzing the output beam 1135. Additionally, the process of transmitting the swept beam 1137 from the laser scanner 1132 to and from the pusher paddle 1125 may be taken on a continuous or near continuous basis, such as a fraction of a second, or on a periodic bases such as a second, or every 5 seconds.

Additionally, the microcomputer may execute an algorithm which determines that multiple readings represent only one wide pusher 1125. This might be the case if readings are taken every 1 inch along the length of an example 48 inch-long shelf. A product position 1110 in front of a pusher 1125 on the shelf may be six inches wide. Therefore, in this example, five or six readings may be taken across the back of the pusher 1125 and product as the mirror sweeps and directs the swept beam 1137. If one of the six-inch wide products is removed from the pusher 1125, the microcomputer detects that at least five or six sensing positions essentially simultaneously changed an equal amount. The microcomputer may then be able to determine that all five or six readings represent one product width. This can be a learned aspect of the shelf management system 1100 which can change as different products are merchandised on the shelf over time.

Figure 17B:
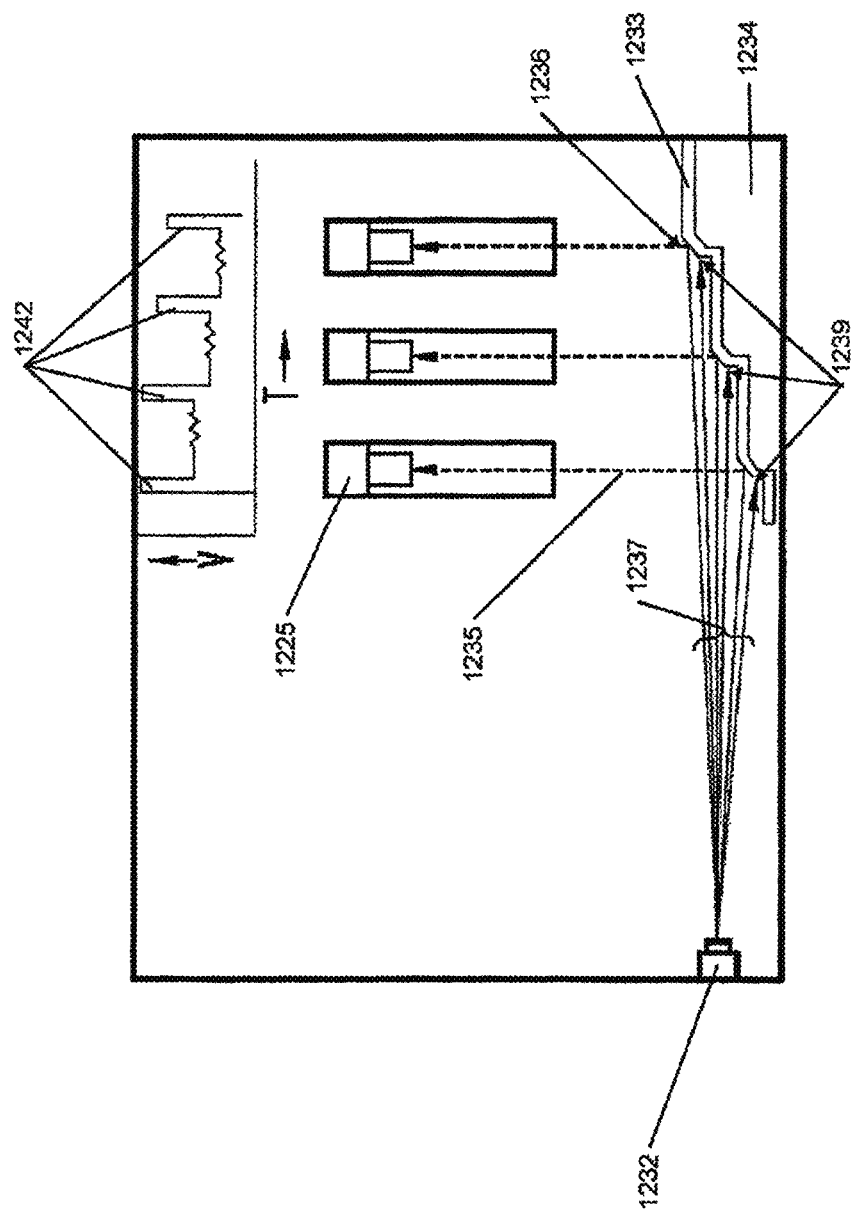

In another embodiment similar to the embodiments described above, as illustrated in FIGS. 17a and 17b, a parabolic piece-wise linear mirror 1234 with a piece-wise linear approximation of a parabola may be utilized. As illustrated in FIGS. 17a and 17b, a shelf management system 1200 may include a piece-wise parabolic mirror 1234 that may be positioned along the rear reflector strip 1230. This piece-wise parabolic mirror 1234 may include multiple linear sections 1233 with multiple leading edges 1236. The linear sections 1233 may be wide enough to be easily manufacturable. Additionally, the linear sections 1233 may be narrow enough so that a shelf filled with the narrowest pushers 1225 will have at least one linear mirror section 1233 reflecting the output beam 1235 to/from it. As illustrated in FIGS. 17a and 17b, the leading edge 1236 of each linear mirror section 1233 may include a small flat section 1239 and an angled leading edge 1236. The small flat section 1239 may retro-reflect the swept beam 1237 directly back to the laser scanner 1232, without first allowing it to reflect from the back of a pusher 1225. The process of transmitting the swept beam 1137 from the laser scanner 1132 to and from the pusher paddle 1125 may be taken on a continuous or near continuous basis, such as a fraction of a second, or a periodic basis such as a second, or 5 seconds.

For example, as specifically illustrated in FIG. 17b, as the beam 1237 sweeps, the laser scanner 1232 will see a series of short bright bursts directed back to the laser scanner 1232, followed by a reflection from the angled leading edge 1236. The reflection from the angled leading edge 1236 indicates the position of a pusher 1225. As the moving mirror sweeps the beam beyond the edge of the first linear section, the mirror will again encounter a small flat section 1239 preceding the second angled leading edge 1236. These small flat sections 1239 may represent cue points on the piece-wise parabolic mirror 1234. These cue points 1239 may be interpreted by the microcomputer as 'cue' signals 1242. Additionally, these small flat sections 1239 may divide the shelf up into designated sections that can be analyzed by the microcomputer for movement. Based on the distance and location of the small flat sections 1239, the laser scanner 1232 may alert the control module 1240 that an angled leading edge 1236 is about to be encountered and a reading should be taken. In this way, the control module 1240 does not need to have a fine level of measurement of the moving mirror position. Additionally, the length of the piece-wise parabolic mirror 1234 can be any length. The control module 1240 may determine the number of pusher positions to read based on the number of cueing signals 1244 it receives between the 'home' and 'end' positions of the swept beam 1237.

Additionally, for the shelf system illustrated in FIGS. 15a-17b, the number of products aligned on the shelf could be measured. In such an embodiment, the position of the pusher could be used to determine the amount of product on the shelf without the need to manually count the product. For example, the laser scanner sends the output beam to the pusher or the product. The output beam may then be reflected back to the laser scanner to determine the location of the pusher by measuring and calculating the time to receive the output beam at the laser scanner. When one product is removed, for example by a purchaser, the time to receive the output beam back at the laser scanner may increase a set amount. Based on the dimensions of the product, specifically the thickness of the product, the control module can calculate how many products have been removed from the shelf by an algorithm of how fast the output beam is traveling back to the laser scanner. Without departing from this invention, the thickness of the product may be a setting or input that can be input into the control module during the set-up of the product on the shelf. Additionally, without departing from this invention, the thickness of the product may be determined by the control module after taking a number of different readings from the system, such as a smart or learning system for determining the thickness of the product.

The advantage of the invention illustrated in FIGS. 14-17b is evident in several ways. First, the present invention has no connection to the spring-urged pusher system and hence can work with almost any system currently in use. Second, the present invention has no physical moving connection to the pusher system or the product which precludes the system from wearing out or getting dirty and reducing its effectiveness over time or with the number of products sold. Third, the present invention can operate from batteries for an extended period of time. RFID inventory systems require relatively high power radio-frequency transmitters to scan the product on the shelf and cannot operate from batteries. Fourth, the cost of the system may be amortized over the number of products sold from the shelf over a number of years. This cost of the system is as opposed to having to justify the cost of an individual RFID tag on each product package as well as amortizing an expensive reader system and infrastructure in each product's price. Lastly, the present invention can be programmed to ignore the replacement of product back onto the shelf as is the case when the shelf is being restocked.

The sensors of the various sensing configurations discussed in the above embodiments may output a signal representing the sensed parameter in either analog or digital format. The analog output may in the form of a voltage or current signal. As one skilled in the art will realize, an analog-to-digital converter may be utilized to transform the analog signal to a digital signal for use by a controller or processing device.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The clauses are to be construed to include alternative embodiments to the extent permitted by the prior art.

Figure 18A:
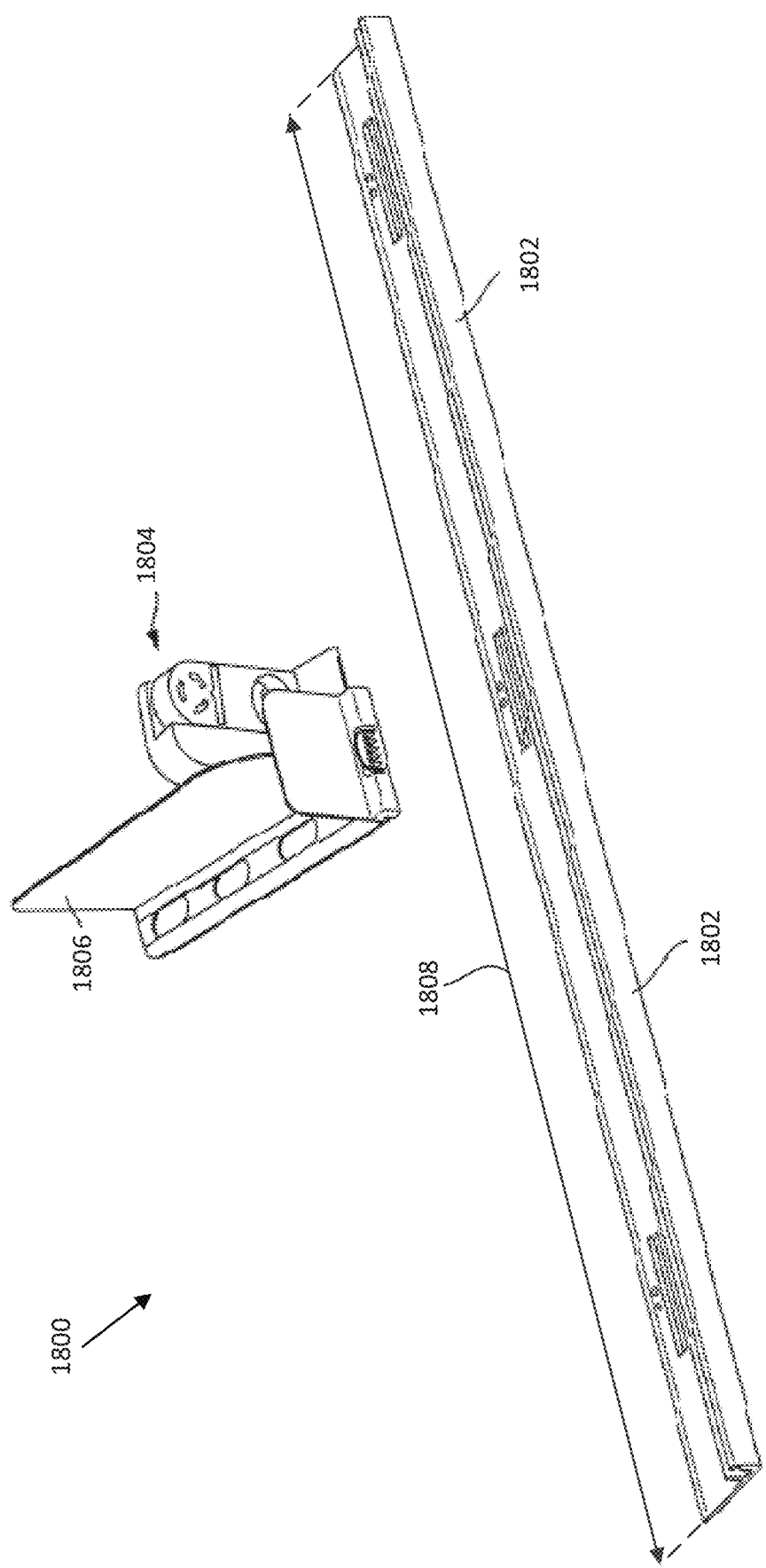
Figure 18B:
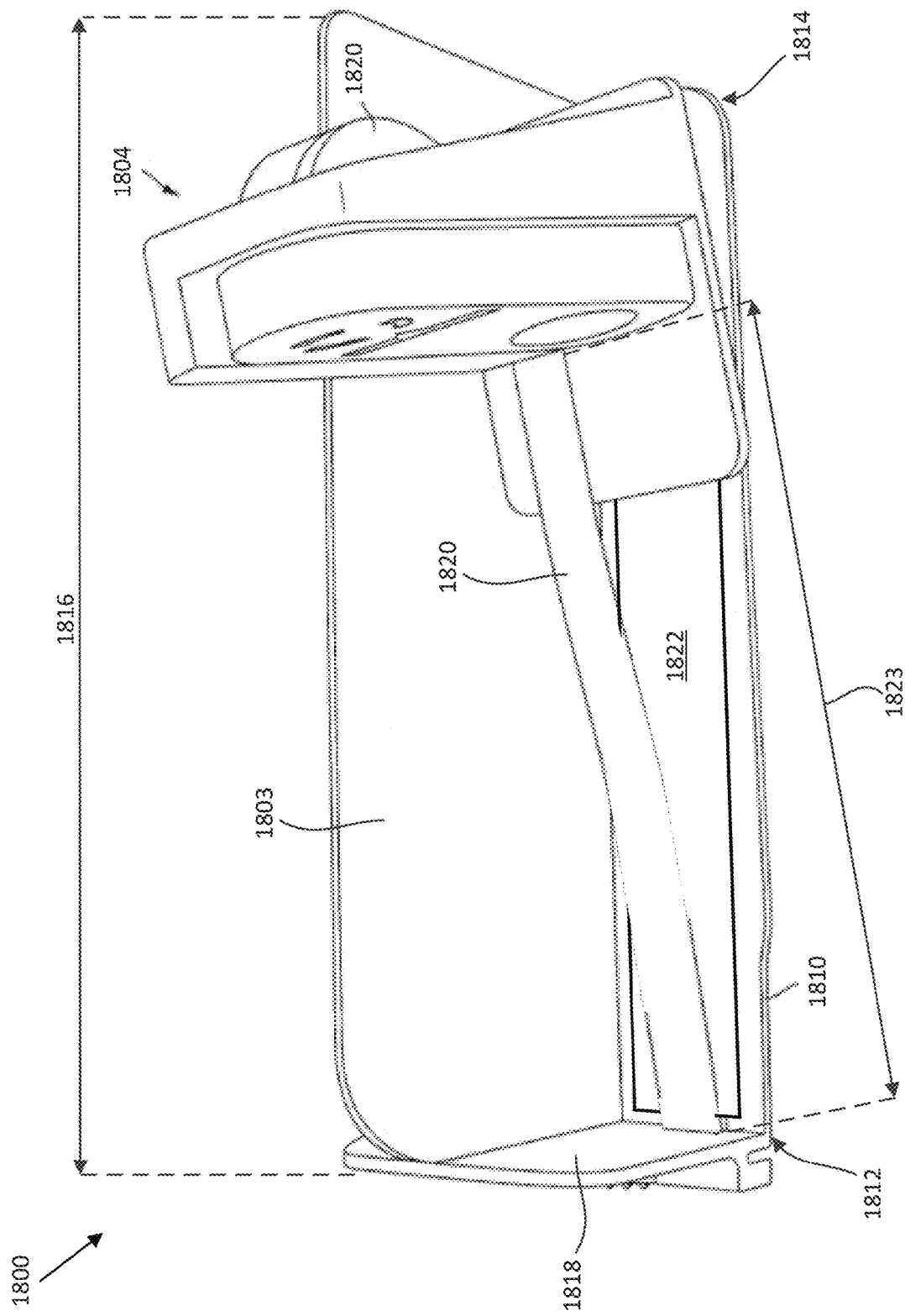

FIGS. 18A-18C depict an alternative implementation of a display management system 1800. In particular, the display management system 1800 comprises a front rail 1802, configured to be removably-coupled to a display surface (not shown). In one example, a display surface may comprise a shelf structure, and the like. As such, in one example, the front rail 1802 may be configured to be removably-coupled at a front edge of a display surface (not shown). However, those of ordinary skill in the art will recognize that the front rail 1802 may be removably-coupled to a display surface at a position other than an edge of the display surface, such as at a central portion of a surface, and the like. In one implementation, the front rail 1802 has a front rail length 1808. Front rail 1802 may be configured such that the front rail length 1808 is parallel to a front edge of a display surface (not shown). Accordingly, the front rail length 1808 may be embodied with any dimensions, without departing from the scope of the disclosures described herein. As such, the front rail length 1808 may be configured to fit one or more physical dimensions of a given display surface (not shown).

The display management system 1800 may comprise a pusher 1804. In one implementation, pusher 1804 may be generally referred to as a movable mechanism of a display management system, such as display management system 1800. As depicted in FIG. 18B, the pusher 1804 may be configured to urge one or more display products (not shown) along a floor structure 1810 towards a first end 1812 of the floor structure from a second end 1814 of the floor structure. Additionally or alternatively, the display management system 1800 may comprise one or more dividers 1806. As such, a divider 1806, and a divider wall 1803, may be configured to separate a first group of display products (not shown) associated with a first pusher 1804 from a second group of display products (not shown) associated with a second pusher on a display surface (not shown). In one example, the divider 1806, including the divider wall 1803, the floor structure 1810, and/or the barrier 1818, may have a divider length 1816. As such, in one implementation, the divider 1806 may be configured to be removably-coupled to the front rail 1802 such that the front rail length 1808 is substantially perpendicular to the divider length 1816. However, those of ordinary skill in the art will recognize that the display management system 1800 may be implemented such that the front rail length 1808 may be configured to be positioned at any angle relative to the divider length 1816, and such that an angle between the front rail length 1808 and the divider length 1816 may not be substantially 90°, and without departing from the scope of the disclosures described herein.

In one implementation, and as depicted in FIGS. 18B and 18C, the pusher 1804 may be urged towards the first end of the floor structure 1812 by a coiled spring 1820. As such, a barrier 1818 may be configured to retain one or more display products (not pictured in FIG. 18A-18C) within the display management system 1800 as the pusher 1804, urged by the coiled spring 1820, exerts a force on the one or more display products to slide them towards the barrier 1818. Further, the pusher 1804 may be configured to slide along the floor structure 1810 without being guided by one or more rail structures. One or more elements of the display management system 1800, including the front rail 1802, the pusher 1804, the divider 1806, the divider wall 1803, the floor structure 1810, the coiled spring 1820, and the barrier 1818, may provide functionality similar to the front rail 580, the pusher 520, the divider 550, the divider wall 552, the floor 554, the coiled spring 534, and the barrier 556, respectively, as described in FIG. 58, FIG. 62, and FIG. 72 of U.S. patent application Ser. No. 14/444,357, filed 28 Jul. 2014, the entire contents of which are incorporated herein by reference for any and all non-limiting purposes.

In one implementation, and as depicted in FIGS. 18B and 18C, the display management system 1800 may comprise a capacitive sensor 1822. As such, the capacitive sensor 1822 may be configured to output a signal that may be processed to determine a position of one or more elements of the display management system 1800. In one example, the capacitive sensor 1822 may be configured to output a signal that may be processed to determine a position of the pusher 1804. As such, the capacitive sensor 1822 may be utilized to determine a number of display products retained within the display management system 1800.

The capacitive sensor 1822 may be utilized to determine a position of the pusher 1804 within the display management system 1800, independently of specific geometrical features of the display management system 1800. As such, the systems and methods described herein related to the capacitive sensor 1822 may be practiced with alternative display management systems described throughout this paper, as well as U.S. patent application Ser. No. 14/444,357, which has been incorporated herein by reference. In one implementation, the capacitive sensor 1822 may be configured to be positioned along the divider length 1816 on the floor structure 1810, and such that an uncoiled length 1823 of the coiled spring 1820 makes contact with a portion of the capacitive sensor 1822 extending along the divider length 1816. Accordingly, the capacitive sensor 1822 is described in further detail in relation to FIG. 20.

Figure 19B:
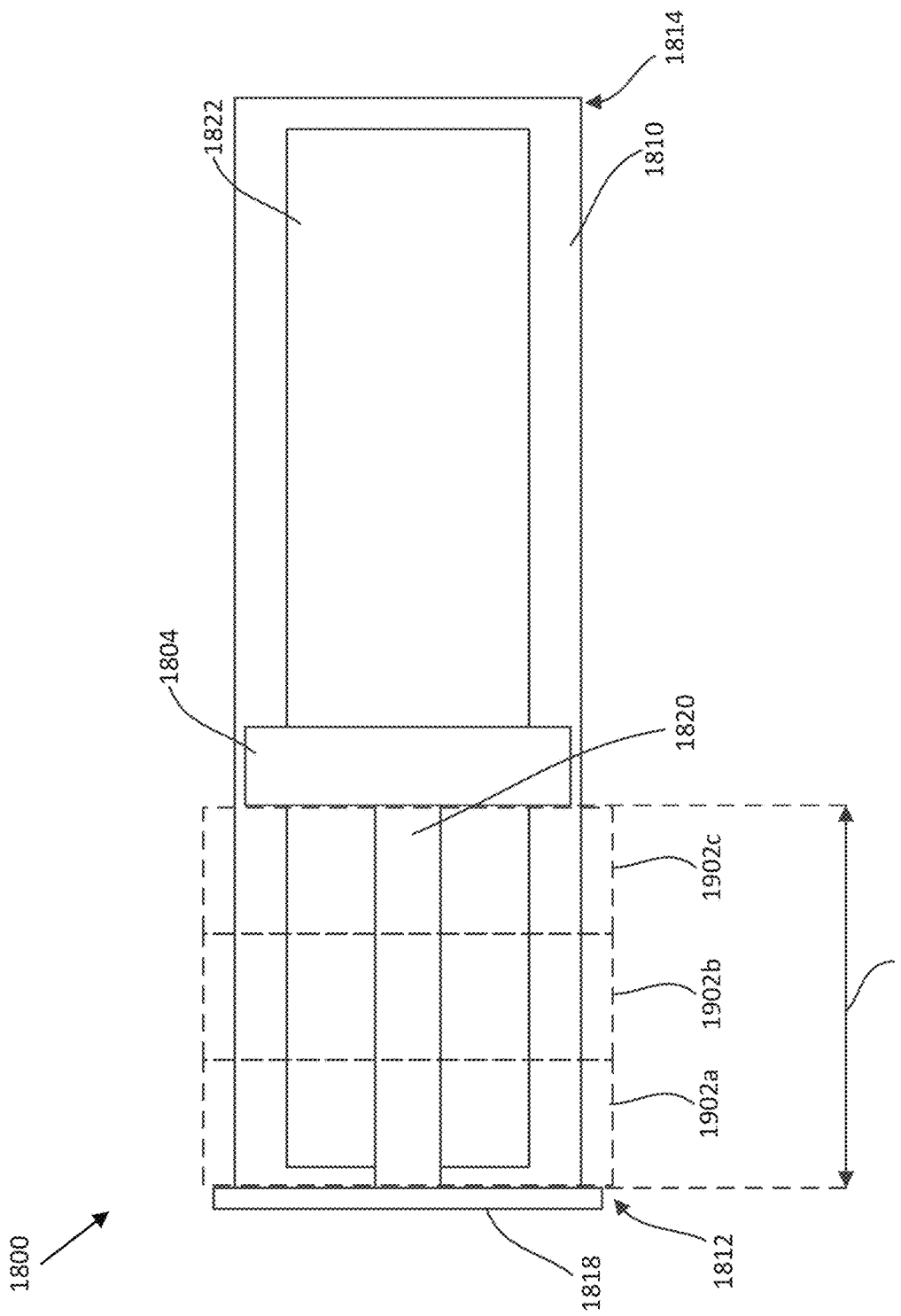

FIGS. 19A and 19B schematically depict plan views of the display management system 1800. Accordingly, FIG. 19A schematically depicts the display management system 1800 in a first configuration having a first plurality of display products 1902a-1902f sandwiched between the barrier 1818 and the pusher 1804. As such, in this depicted first configuration of the display management system 1800, the coiled spring 1820 has a first uncoiled length 1904. Turning to FIG. 19B, the display management system 1800 is depicted in a second configuration having a reduced number of display products 1902a-1902c contained within the system 1800. Consequently, the coiled spring 1820 has a reduced, or a second, uncoiled length 1906.

In one example, a conductive material (in one example, a metal or alloy) from which the coiled spring 1820 in constructed makes contact with the capacitive sensor 1822. In one implementation, the extent to which the coiled spring 1820 makes contact with the capacitive sensor 1822 is proportional to an uncoiled length, such as, in one example, uncoiled length 1904 or 1906. In turn, an output signal from the capacitive sensor 1822 may vary based upon a length of the coiled spring 1820 in contact with the capacitive sensor 1822. In another example, a position of the pusher 1804 may be detected based on a point of contact of a portion of the coiled spring 1820 with the capacitive sensor 1822. Accordingly, an output signal from the capacitive sensor 1822 may vary based upon a position of the pusher 1804, and correspondingly, a number of display products (1902a-1902f) retained within the display management system 1800.

FIG. 20A schematically depicts a detailed view of a capacitive sensor 1822. In one implementation, the capacitive sensor 1822 comprises a circuit board 2002, the circuit board 2002 having a longitudinal length 2016. As schematically depicted in FIGS. 18A-18C, the capacitive sensor 1822 may be coupled to a floor structure 1812 of a divider 1806, and such that the longitudinal length 2016 of the capacitive sensor 1822 is substantially parallel to the divider length 1816. The capacitive sensor 1822 may be configured to be retrofitted into a display management system 1800, such that all electronic components associated with capacitive sensor 1822 may be self-contained on the circuit board 2002. In one example, the capacitive sensor 1822 may comprise a plurality of capacitive sensor elements 2004a-2004f As such, those of ordinary skill in the art will recognize that the capacitive sensor elements 2004a-2004f depicted in FIG. 20A merely represent one example implementation of the capacitive sensor 1822, and various alternative implementations of capacitive sensor 1822 may be realized, having a different number of capacitive sensor elements to those capacitive sensor elements 2004a-2004f depicted in FIG. 20A.

In one example, the capacitive sensor 1822 may be configured to output a signal proportional to a capacitance value, and such that the capacitance value may be based upon an uncoiled length (e.g. uncoiled lengths 1904 and 1906) of the coiled spring 1820. In one example, the control circuit 2006 comprises electronic elements configured to calculate one or more capacitance values associated with the capacitive sensor elements 2004a-2004f In another implementation, the control circuit 2006 may be referred to as a transmitter circuit, and configured to transmit one or more data points received from the capacitive sensor elements 2004a-2004f to a remote processor, such as the display management system controller device 2400 from FIG. 24. In another example, one or more calculated capacitance values may vary based upon a length of a conductor in contact with the circuit board 2002. As such, the one or more calculated capacitance values may vary based upon an uncoiled length of the coiled spring 1820, such as those uncoiled lengths 1904 and 1906 depicted as examples in FIGS. 19A and 19B. In yet another example, a capacitance value may vary based on a point of contact of a portion of the coiled spring 1820 with the circuit board 2002. In one specific example, the control circuit 2006 may be configured to calculate a value of capacitance between one or more successive pairs of capacitive sensor elements, selected from the capacitive sensor elements 2004a-2004f. Accordingly, a value of capacitance calculated between a pair of capacitive sensor elements, selected from the capacitive sensor elements 2004a-2004f may change if one or more of the pair of capacitive sensor elements comes into contact with a portion of an uncoiled length of the coiled spring 1820. As such, a change in capacitance between successive pairs of the capacitive sensor elements 2004a-2004f may be utilized to indicate a position of the pusher 1804. As such, one or more of the capacitive sensor elements 2004a-2004f may comprise an exposed electrically-conducting structure configured to contact a portion of the electrically-conducting uncoiled length of coiled spring 1820. In another example, the capacitive sensor elements 2004a-2004f may comprise one or more insulating materials, but still allow for a capacitance between successive pairs of the capacitive sensor elements 2004a-2004f to be detected.

In one implementation, the circuit board 2002 may comprise a substantially insulating material configured to electrically insulate the capacitive sensor elements 2004a-2004f from one another. Further, the capacitive sensor elements 2004a-2004f may be connected to the control circuit 2006 by electrical conductors (not depicted in FIG. 20A). In one example, a pair of capacitive sensor elements, selected from the capacitive sensor elements 2004a-2004f, may be separated by a separation distance 2018. Accordingly, in one implementation, the separation distance 2018 may be uniform between each pair of capacitive sensor elements, selected from the capacitive sensor elements 2004a-2004f, or may be non-uniform, such that a first separation distance 2018 may be different from a second separation distance 2020. Further, those of ordinary skill in the art will recognize that separation distances 2018 and 2020 may be embodied with any dimensions, without departing from the scope of the disclosures described herein. For example, the separation distances 2018 and 2020 may range from a millimeter or less to several hundred millimeters or more, and the like.

In one example, a separation distance, such as separation distance 2018 and/or 2020, between a pair of capacitive sensor elements, selected from capacitive sensor elements 2004a-2004f, may determine a resolution of the capacitive sensor 1822. As such, a resolution of the capacitive sensor 1822 may be proportional to a precision with which the capacitive sensor 1822 can determine a location of a pusher, such as pusher 1804. In particular, as a number of capacitive sensor elements, such as capacitive sensor elements 2004a-2004f, is increased, the precision with which the capacitive sensor 1822 can determine the location of a pusher on the floor structure 1810 may also increase.

In one implementation, the capacitive sensor 1822 may be utilized to calculate an absolute location of the pusher 1804 on the floor structure 1810. As such, the location of the pusher 1804 may not be calibrated based upon a zeroed position on the floor structure 1810. Accordingly, a location of pusher 1804 may not be determined relative to another location on the capacitive sensor 1822, and the like.

In yet another implementation, the control circuit 2006 may be utilized to calculate a position of the pusher 1804 on the capacitive sensor 1822 using interpolation methodology. In particular, the control circuit 2006 may receive signals (otherwise referred to as sensor data) from multiple capacitive sensor elements, from the capacitive sensor elements 2004a-2004f, and by processing the received signals, determine that the location of the pusher 1804 lies between a pair of the capacitive sensor elements, selected from capacitive sensor elements 2004a-2004f Specifically, the control circuit 2006 may be utilized to interpolate a closeness of a pusher 1804 to a first capacitive sensor element versus a second, adjacent, capacitive sensor element. In this way, those of ordinary skill in the art will recognize that the capacitive sensor 1822 may be implemented, in one example, using a single pair of capacitive sensor elements 2004 spaced apart between the first end 1812 and the second end 1814 of the floor structure 1810.

FIG. 20B schematically depicts a more detailed view of the control circuit 2006. In particular, and in one example, the control circuit 2006 comprises a power supply 2008, a memory 2010, an interface 2012, and a processor 2014. In one implementation, the memory 2010, interface 2012, and processor 2014 may be embodied as a single microcontroller circuit, or may be implemented as discrete electronic elements. In one example, the power supply 2008 may represent a source of electrical energy provided by one or more electrochemical cells, otherwise referred to simply as a cell or as a battery. In one specific example, power supply 2008 may be implemented as a single "button cell" or "coin cell." In another example, power supply 2008 may be a rechargeable or a non-rechargeable battery. In another example, power supply 2008 may represent electronic hardware configured to receive, and potentially to condition (rectify AC to DC, and/or step-up/step-down a voltage, smoothen, among others) a wired electrical supply. In yet another example, power supply 2008 may represent electronic hardware configured to receive, and potentially to condition, a power supply received from an external source wirelessly, such as by electromagnetic induction (electrodynamic induction, electrostatic induction, and the like). In another implementation, power supply 2008 may comprise one or more photovoltaic (solar cells). Further, those of ordinary skill in the art will recognize that power supply 2008 may represent any technology, or combination of technologies, configured to provide electrical power to the control circuit 2006, without departing from the scope of the disclosures described herein. Similarly, power supply 2008 may be configured to store any amount of energy (J), and/or to provide an electrical potential (voltage (V)), or an electrical current (A) of any value, without departing from the scope of the disclosures described herein.

Memory 2010 may be a form of persistent memory, or a form of volatile memory, or a combination thereof. As such, memory 2010 may comprise a form of random access memory (RAM) that is cleared by a power cycle or other reboot operation of the control circuit 2006. In other embodiments, memory 2010 may be non-volatile, such that it does not require power from power supply 2008 to maintain information. As such, memory 2010 may comprise a form of read only memory (ROM), or flash memory. Generally, memory 2010 may be referred to as a form of a non-transitory, computer-readable medium and utilized to store instructions that may be executed by processor 2014.

Interface 2012 may comprise hardware and/or firmware configured to facilitate communication between the control circuit 2006 and one or more external devices. For example, interface 2012 may be utilized to facilitate communication between processor 2014 and an external computer device across a network. In this way, interface 2012 may be configured to communicate via one or more of a wired connection, such as utilizing an Ethernet connection, or a wireless connection, such as utilizing a Bluetooth connection, a Wi-Fi connection, or the industrial, scientific, and medical (ISM) radio bands. Interface 2012 may be configured to facilitate communication between the control circuit 2006 and any wired or wireless link or network, and using any communication protocol.

In one implementation, processor 2014 comprises a microprocessor having one or more processing cores. As such, processor 2014 may be configured to execute instructions stored within memory 2010. Further, one or more processes executed by processor 2014 may be utilized to drive one or more electrical circuits associated with the circuit board 2002 and the plurality of capacitive sensor elements 2004a-2004f. Additionally, processor 2014 may be configured to receive and process, via interface 2012, one or more sensor readings from the plurality of capacitive sensor elements 2004a-2004f. In one specific example, a capacitive sensor element, from the plurality of capacitive sensor elements 2004a-2004f may be configured to output an analog signal (voltage, current, and the like) or a digital signal (for example, a binary signal, among others).

In one example, one or more signals communicated from the plurality of capacitive sensor elements 2004a-2004f may be received by processor 2014. In turn, the processor 2014 may execute one or more processes on the received signals before communicating, via the interface 2012, the received signals to a remote processor, such as that processor 2404 associated with the display management system controller device 2400 described in FIG. 24. These one or more processes may include determining that a received signal is above a threshold value, compressing the received signals for communication, or filtering the received signals, among others. Accordingly, in this example, the processor 2404 of the display management system controller device 2400 may calculate one or more capacitance values as previously described in relation to FIG. 20A, and further calculate a position of a pusher 1804 on a display management system 1800. In another example, one or more signals communicated from the plurality of capacitive sensor elements 2004a-2004f may be processed by processor 2014 to calculate the one or more capacitance values as previously described in relation to FIG. 20A. In turn, the calculated capacitance values may be utilized to calculate the location of the pusher 1804 on the display management system 1800. In yet another example, a combination of processor 2014 and processor 2404 may be utilized to determine a location of a pusher 1804, and the like.

In one implementation, control circuit 2006 may be configured to communicate directly with a mobile device. As such, in one specific example, control circuit 2006 may be configured to establish a Bluetooth connection with a smart phone or tablet of a shopper in a store in order to receive one or more pieces of biographic information associated with the shopper. In this way, upon activation of pusher 1804 as one or more display products, such as display products 1902a-1902f, are removed from the display management system 1800, the control circuit 2006 may be configured to query a mobile device of a user removing the one or more display products to receive one or more pieces of biographic information associated with the user. The biography information may include, among others, a name, a gender, a preferred spoken language, an age, or an approximate age range. In another implementation, upon activation of the pusher 1804 as one or more display products are removed from the display management system, the control circuit 2006 may be configured to communicate with the display management system controller device 2400. In turn, the display management system controller device 2400 may attempt to establish a connection (via Bluetooth, and the like) to a mobile device associated with a user removing said one or more display products.

In one example, the capacitive sensor 1822 may be configured to operate within a low power mode until the pusher 1804 is moved as a result of one or more display products, such as display products 1902a-1902f, or removed from the display management system 1800. In particular, this low power mode may include processor 2014 operating in a low power configuration that continuously monitors the sensor outputs from the capacitive sensor elements 2004a-2004f. Accordingly, in this example, the processor 2014 may execute one or more processes to enter a high power configuration upon receiving one or more sensor signals indicative of movement of the pusher 1804. Specifically, the high power configuration may include executing one or more processes to deliver additional electrical power to memory 2010, interface 2012, and/or processor 2014 in order to execute additional processes on the received sensor data and/or communicate the received sensor data to a remote processor. In this way, the capacitive sensor 1822 may be configured to consume a reduced amount of electrical energy while the pusher 1804 remains stationary. As such, this low power configuration may be utilized to prolong a battery life associated with power supply 2008. In another example, the capacitive sensor 1822 may be configured to operate within a low power configuration while the pusher 1804 remains stationary, and such that the low power configuration delivers electrical energy to one or more of the plurality of capacitive sensor elements 2004a-2004f. Accordingly, in response to motion of the pusher 1804, one or more of the capacitive sensor elements 2004a-2004f may be configured to communicate a wake signal to the control circuit 2006 in order to enter a high power configuration. As such, the wake signal may be received by the control circuit 2006, and in response, additional power may be delivered to one or more of the memory 2010, interface 2012, and/or processor 2014. In this way, maintaining the capacitive sensor 1822, and in particular, the control circuit 2006, within a low power configuration for a period of time during which the pusher 1804 is stationary may allow for decreased overall energy consumption, and in one example, increased battery life of the capacitive sensor 1822.

Figure 21A:
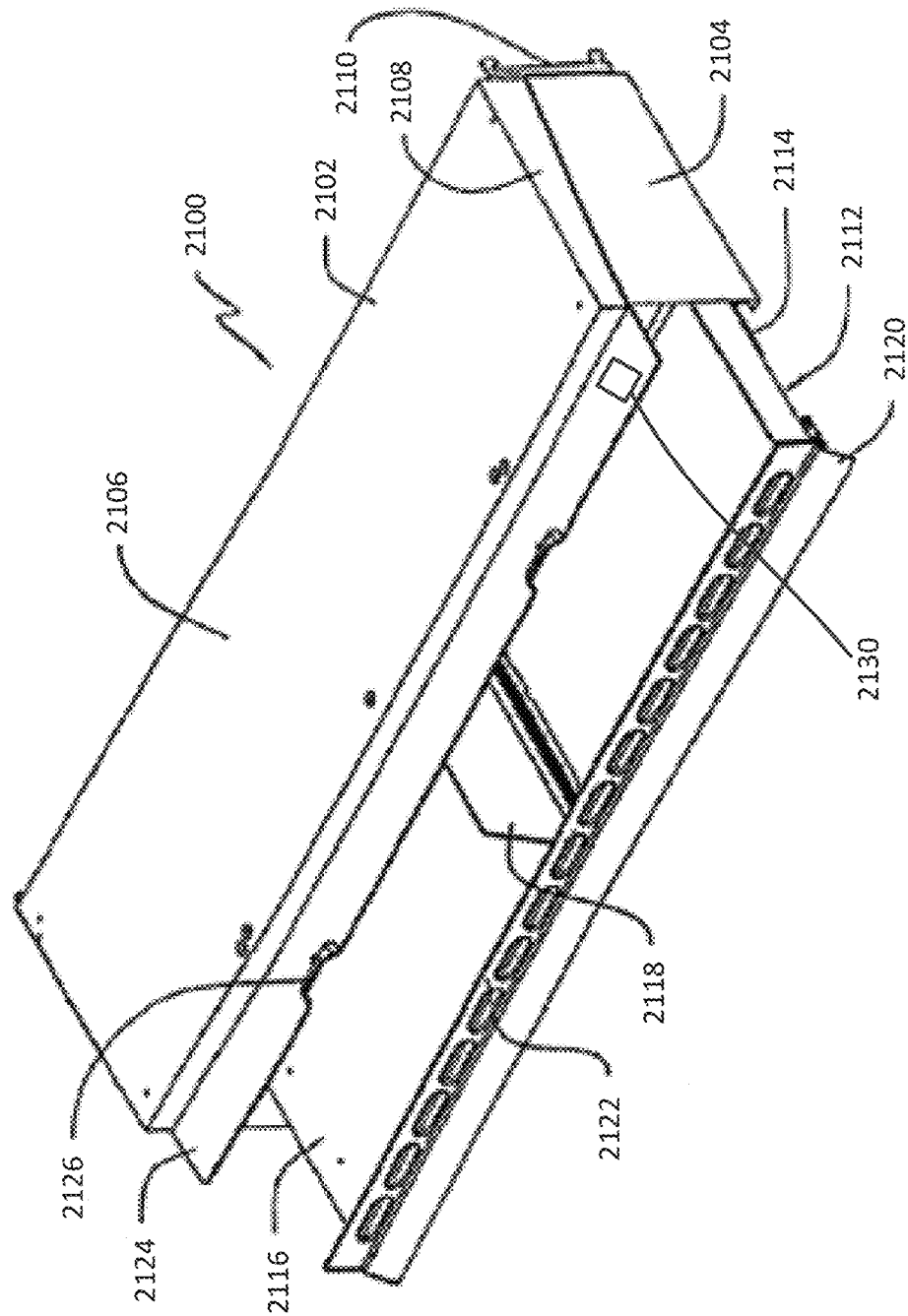
FIGS. 21A and 21B depict an alternative implementation of a display management system, according to one or more aspects described herein.
Figure 21B:
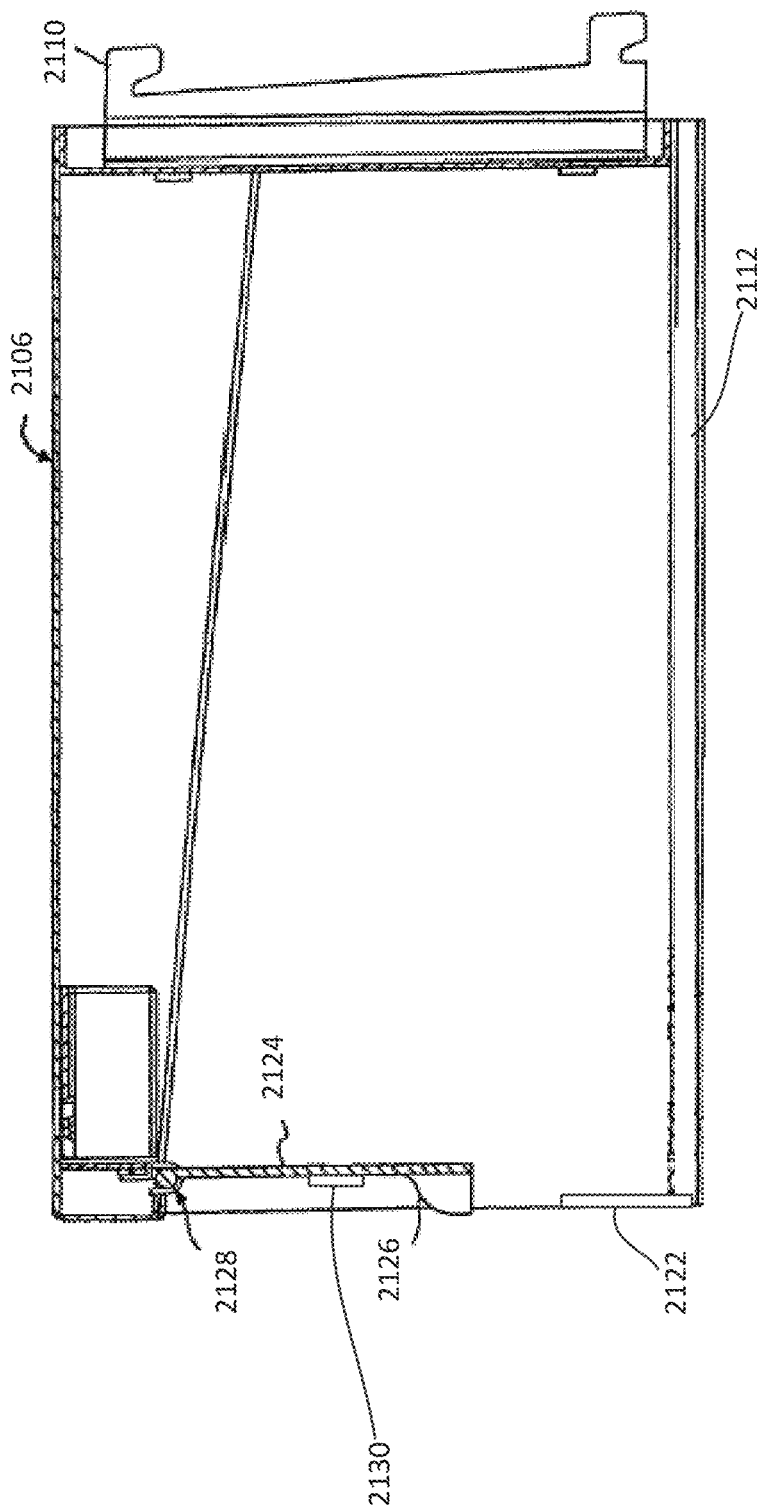

FIGS. 21A and 21B depict an alternative implementation of a display management system 2100. In particular, FIG. 21A depicts an isometric view of a display management system 2100 configured as a box-shelf. In particular, the box-shelf display management system 2100 comprises a top 2102 and two sides 2104 that can be connected together to form part of a housing 2106. A recessed portion 2108 is provided so that in the event that the box-shelf display management system 2100 is mounted under a shelf (not shown), the recessed portion 2108 will aid in ensuring that there is no interference with the brackets that support the shelf or other structure that may extend downward (not shown). One or more shelf supports 2110 are mounted to the box-shelf display management system 2100 to facilitate the box-shelf display management system 2100 to be mounted to a vertical support (not shown) in a traditional manner.

A slidable shelf 2112 is mounted to one or more tracks 2114, which may be supported at least in part by the sides 2104. As depicted, the slidable shelf 2112 may include a support surface 2116 that supports a divider 2118. In one example, the support surface 2116 may support one or more display management systems, such as systems 1800 described previously. In one implementation, the support surface 2116 includes a rail 2120 mounted to the front of the shelf 2112. The rail, in turn, supports a retainer 2122. As depicted, a door 2124 with one or more handles 2126 may be mounted to the top 2102 via a hinge system 2128. In another implementation, the door 2124 may be referred to as a flip window 2124, and such that the flip window 2124 may be partially or wholly transparent to visible light. In this way, flip window 2124 may facilitate viewing of one or more display products within the box-shelf display management system 2100. In one specific example, the box-shelf display management system 2100 may be similar to the box-shelf 3405 described in U.S. application Ser. No. 14/046,385 filed 4 Oct. 2013, now U.S. Pat. No. 9,167,913, the entire contents of which are incorporated herein by reference for any and all non-limiting purposes. It is further contemplated that the display management system 3400, described in relation to FIG. 34, may be used in combination with any of the systems described in U.S. Pat. No. 9,167,913, or with a system that includes door 2124 or window 2124, or combinations thereof.

In one implementation, the box-shelf display management system 2100 may be configured to retain one or more display products, such as display products 1902a-1902f schematically depicted in FIG. 19A. Accordingly, in one configuration, the box-shelf display management system 2100 positions the slidable shelf 2112 within the housing 2106. As such, in order to remove one or more display products (not shown in FIG. 21A) from the box-shelf display management system 2100, a user may rotate the flip window 2124 from a substantially vertical position (depicted in FIG. 21B to a substantially horizontal position depicted in FIG. 21A).

In one implementation, the box-shelf display management system 2100 may be configured with a sensor 2130. In particular, sensor 2130 may be an accelerometer. Further, the accelerometer sensor 2130 may be sensitive to accelerations (due to gravity or otherwise) along a single axis (one-axis accelerometer), along two mutually-perpendicular axes (a 2-axis accelerometer), or along three mutually-perpendicular axes (a 3-axis accelerometer). Those of ordinary skill in the art will recognize various specific implementations of one-axis, two-axis and three-axis accelerometer electronic circuits that may be utilized with the box-shelf display management system 2100, or other display management systems, such as systems 1800 and 2300, without departing from the disclosures described herein. Further, those of ordinary skill in the art will recognize that an accelerometer sensor 2130 may be utilized to determine an orientation of a structure to which it is affixed. As such, accelerometer sensor 2130 from FIG. 21A may be utilized to determine an orientation of the flip window 2124. Advantageously, the accelerometer sensor 2130 may offer improved accuracy in determining an orientation of the flip window 2124 when compared to one or more alternative sensor technologies positioned as hinge 2128, wherein a range of motion of hinge 2128 may be comparatively more limited.

In one implementation, an accelerometer sensor, such as accelerometer sensor 2130, may be utilized to determine an orientation of the flip window 2124. As such, those of ordinary skill in the art will recognize that the accelerometer sensor 2130 may be located on the flip window 2124 at any location configured to move in conjunction with the movement of the flip window 2124, without departing from the scope of the disclosures described herein. Additionally, those of ordinary skill in the art will recognize that the accelerometer sensor 2130 may be generally utilized to determine an orientation of a flip window, similar to flip window 2124, as part of any display management system. As such, display management system 2100, having flip window 2124, is merely one example of a display management system with which an accelerometer sensor 2130 may be utilized. Accordingly, those of ordinary skill in the art will readily recognize various additional or alternative implementations of a display management structure similar to the housing 2106 having a movable feature similar to the flip window 2124 that is configured to be moved in order to remove one or more products from the display management structure. In turn, the accelerometer sensor 2130 may be coupled to a movable feature of the various additional or alternative implementations of display management structures that may be envisioned by those of ordinary skill in the art.

Figure 22B:
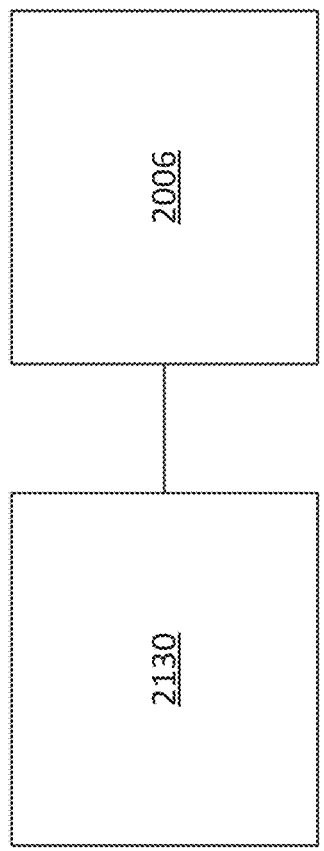
FIG. 22B schematically depicts an integrated accelerometer device in communication with a control circuit, according to one or more aspects described herein.
Figure 22A:
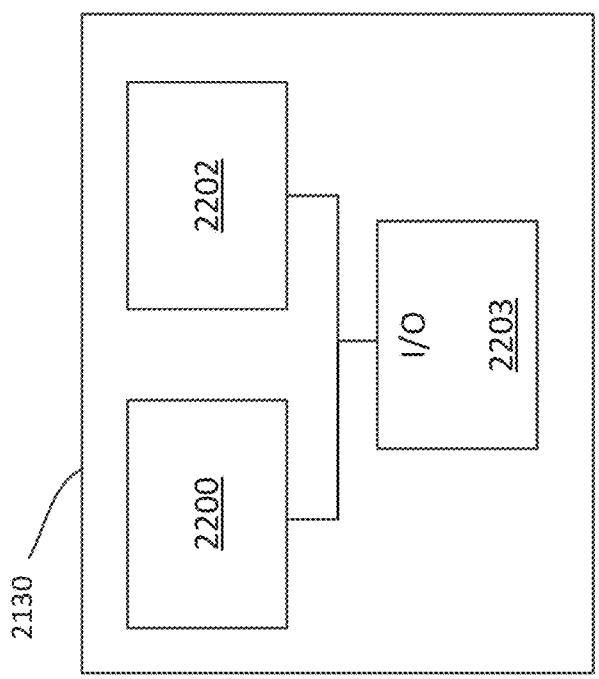
FIG. 22A schematically depicts an integrated accelerometer device, according to one or more aspects described herein.

In one example, accelerometer sensor 2130 may be implemented as part of an integrated accelerometer device, as schematically depicted in FIG. 22A. As such, the integrated accelerometer device 2130 may comprise an accelerometer circuit board 2200, a power supply 2202, and an interface 2203. Accordingly, and as previously described, those of ordinary skill the art will recognize various specific accelerometer circuits that may be implemented as the accelerometer circuit board 2200, without departing from the scope of the disclosures described herein. In one example, power supply 2202 may be configured to provide electrical energy to the accelerometer circuit board 2200 and the interface 2203. As such, the power supply 2202 may be similar to power supply 2008, and may be embodied as a wired electrical supply, one or more batteries, hardware configured to accommodate wireless transmission of electrical energy, or combinations thereof. In another example, interface 2203 may be similar to interface 2012, and such that interface 2203 may be configured to communicate one or more acceleration signals from the accelerometer sensor 2130 via a wired or wireless network.

In one implementation, the integrated accelerometer device 2130 may be configured to output one or more sensor signals (otherwise referred to as motion data) indicative of an orientation of the flip window 2124. In one example, the one or more sensor signals may comprise an analog or a digital signal indicative of an acceleration along one or more of the axes to which the integrated accelerometer device 2130 is sensitive. Accordingly, in one example, the sensor signal output from the integrated accelerometer device 2130 may be as a result of an acceleration due to gravity resolved along one, two, or three mutually perpendicular axes (x-, y-, and/or z-axis) to which the integrated accelerometer device 2330 is sensitive. In one example, the integrated accelerometer device 2130 is configured to communicate a sensor signal (otherwise referred to as motion data) via the interface 2203 to a control circuit, such as control circuit 2006 depicted in FIG. 22B. As such, in one implementation, communication between the control circuit 2006 and the integrated accelerometer device 2130 may be via a hardware (wired) connection. However, communication between the control circuit 2006 and the integrated accelerometer device 2130 may be, additionally or alternatively, via a wireless connection. As such, an output signal from the integrated accelerometer device 2130 may be processed and utilized in a similar manner to a sensor output from the capacitive sensor 1822 previously described. In another implementation, a sensor output from the integrated accelerometer device 2130 may be communicated directly to a display management system controller device 2400, described in further detail in relation to FIG. 24.

In one example, accelerometer sensor (otherwise referred to as an integrated accelerometer device) 2130 may be configured to operate in a low power configuration while a movable structure to which the accelerometer sensor 2130 is coupled remains stationary. As such, the accelerometer sensor 2130 may be configured to operate in this low power configuration while an output from the accelerometer circuit board 2200 is unchanging (indicative of, in one example, the flip window 2124 remaining at a fixed orientation). Accordingly, upon detection of motion of the flip window 2124, one or more of the accelerometer circuit board 2200, the control circuit 2006, and/or the display management system controller device 2400 may be configured to implement a high power configuration. As such, this high power configuration may be configured to execute one or more processes in response to movement of the flip window 2124, wherein movement of the flip window 2124 may be indicative of one or more display products, such as display products 1902a-1902f, being removed from a display management system, such as system 2100, 1800, and/or 2300.

FIG. 23 depicts an alternative implementation of a display management system 2300. In particular, FIG. 23 depicts a spiral peg hook security device 2301. As such, the spiral peg hook security device 2301 may comprise a front structure 2314, rigidly-coupled to a back structure 2306 by a support rail 2308. Further, the back structure 2306 may comprise one or more coupling elements (not shown) configured to removably-couple the spiral peg hook security device 2301 to a surface 2312. In one example, surface 2312 may be similar to the gondola wall 905 described in relation to FIG. 14. However, those of ordinary skill the art will recognize that surface 2312 may comprise any support structure configured to receive one or more coupling elements (not shown) of the spiral peg hook security device 2301. In one implementation, the spiral peg hook security device 2301 comprises a knob 2304, rotatably-coupled to the front structure 2314, and configured to rotate about the center axis of bearing 2316. Additionally, the front structure 2314 may be configured to receive one or more labels associated with one or more display products supported by the spiral peg hook security device 2301.

In one example, upon application of a manual rotational force to the knob 2304 in a first direction (e.g. that direction indicated by arrow 2318), spiral rail 2302 may be configured to rotate about the center axis of bearing 2316. In turn, based upon the rotation of the spiral rail 2302, one or more display products supported by (hanging from) support rail 2310 may be urged by the spiral rail 2302 towards the front structure 2314. Conversely, upon application of a manual rotational force to the knob 2304 in a second direction (e.g. a direction opposite to by arrow 2318), spiral rail 2302 may be configured to urge one or more display products hanging from support rail 2310 towards the back structure 2306.

In one example, the spiral peg hook security device 2301 may be configured to display one or more products within a store. As such, in one embodiment, the spiral peg hook security device 2301 may be utilized to prevent multiple products that are supported by support rail 2310 from being quickly removed from the spiral peg hook security device 2301. In this way, the spiral peg hook security device 2301 may be utilized to deter theft of one or more products hanging from support rail 2310, due to the extended time needed to rotate knob 2304 and spiral rail 2302 in order to remove the one or more products from the device 2301.

In one implementation, an accelerometer sensor 2130 may be utilized with the display management system 2300 in order to detect motion of the knob 2304 and/or spiral rail 2302. As previously described, the spiral rail 2302 may be rotated in order to insert and/or remove one or more display products from the display management system 2300. In this way, the accelerometer sensor 2130 may be coupled to a structure that is configured to rotate upon application of a manual force to knob 2304. In one specific example, the accelerometer sensor 2130 may be coupled within a structure of the knob 2304, as schematically depicted in FIG. 23. However, those of ordinary skill in the art will recognize additional or alternative placement options for the accelerometer sensor 2130 that may be utilized without departing from the scope of the disclosures described herein. In one example, a change in a sensor output from the accelerometer sensor 2130 as the spiral rail 2302 is being rotated may be utilized by one or more of the accelerometer circuit board 2200, the control circuit 2006, and/or the display management system controller device 2400, to track the rotation of the spiral rail 2302, and thus, determine a number of display products inserted onto/removed from the display management system 2300.

Similar to the display management system 2100, display management system 2300 may utilize the accelerometer sensor 2130 to detect motion, and in response, execute one or more processes. In one example, a motion of the spiral rail 2302 may execute one or more processes to transition the accelerometer sensor 2130 from a low power configuration into a high power configuration, as described previously.

Figure 24:
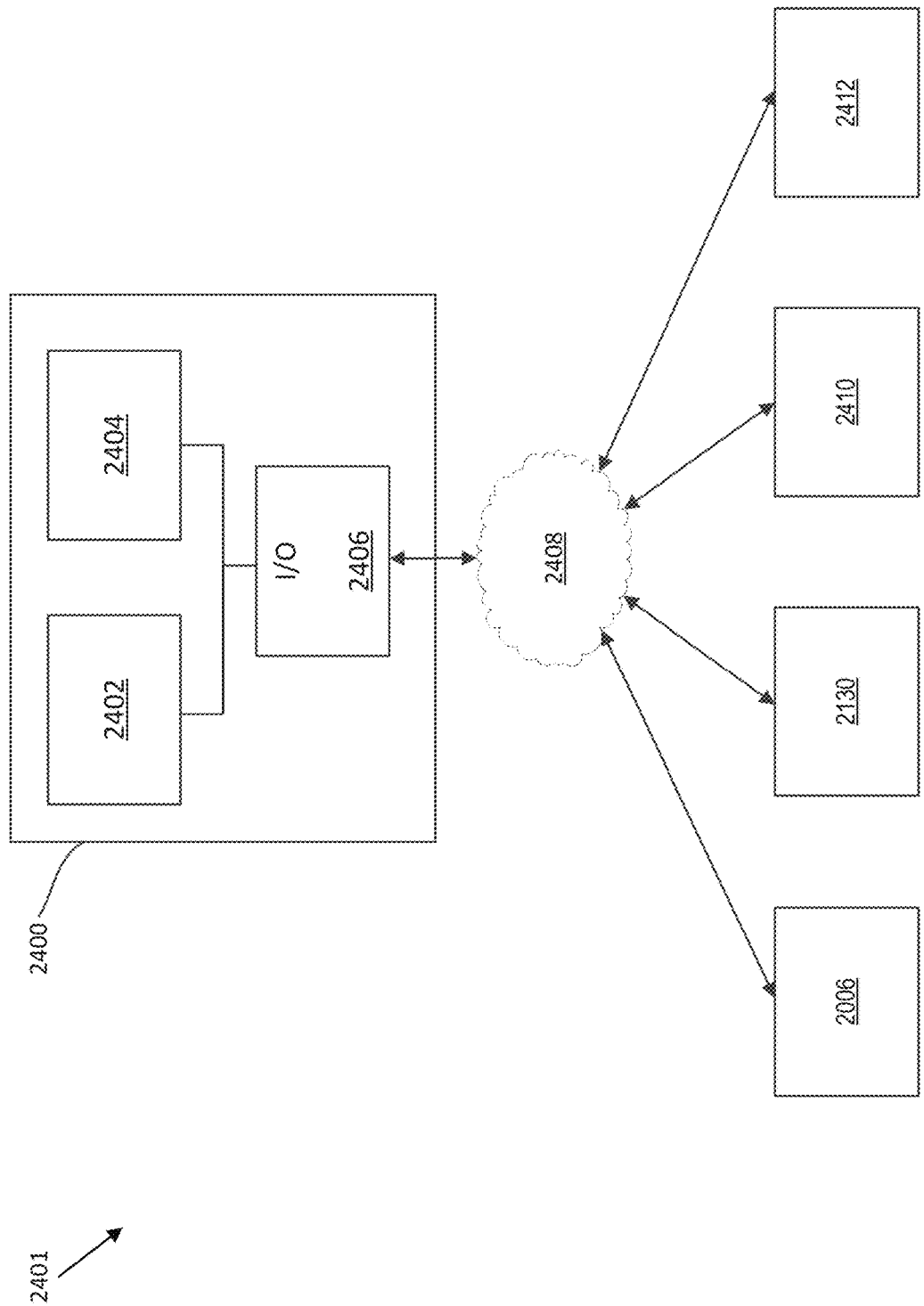
FIG. 24 schematically depicts a sensor network configured to implement one or more inventory management, security, and/or recognition functions in combination with one or more display management systems, according to one or more aspects described herein.

FIG. 24 schematically depicts a sensor network 2401 configured to implement one or more inventory management, security, and/or recognition functions in combination with one or more display management systems, such as systems 1800, 2100, and 2300, among others. In particular, the sensor network 2401 comprises a display management system controller device 2400. Accordingly, the display management system controller device 2400 may comprise a memory 2402. As such, memory 2402 may be a form of persistent or volatile memory, or combinations thereof. In this way, memory 2402 may comprise a form of random access memory (RAM) that is cleared by a power cycle or other reboot operation of the device 2400. In other embodiments, memory 2402 may be non-volatile, such that it does not require power to maintain information. As such, memory 2402 may comprise a form of read only memory (ROM), or flash memory, among others. Generally, memory 2402 may be referred to as a form of a non-transitory, computer-readable medium and utilized to store instructions that may be executed by processor 2404. Additionally, device 2400 may comprise an interface 2406, wherein interface 2406 is configured with hardware and supporting firmware that allow device 2400 to connect to network 2408. Further, device 2400 may comprise a processor 2404, wherein processor 2404 may comprise a microprocessor having one or more processing cores. As such, processor 2404 may be configured to execute instructions stored within memory 2402.

Generally, the display management system controller device 2400 may be configured to execute one or more processes in response to receiving sensor information from one or more of a capacitive sensor 1822 (via control circuit 2006), or from an accelerometer sensor 2130 (directly, or via control circuit 2006). In one example, communication between one or more of the control circuit 2006, the accelerometer sensor 2130, and the display management system controller device 2400 may be unidirectional, or may be bi-directional. In one implementation, the display management system controller device 2400 may be referred to as a remote processor, and may be positioned remotely from one or more display management systems (1800, 2100 and/or 2300) to which one or more sensors (1822, 2130) are attached for detection of motion indicative of one or more display products being removed. As such, a distance between the display management system controller device 2400 and one or more sensors with which it may be in communication may be any given distance, without departing from the scope of the disclosures described herein. For example, the display management system controller device 2400 may be positioned within a same geographic location (in one example, a same store) as the one or more sensor devices with which the display management system controller device 2400 is in communication. In another example, the display management system controller device 2400 may be positioned at a different geographic location to one or more display management systems (e.g. 1800, 2100, and/or 2300) with which the device 2400 in communication via network 2408.

In one implementation, the display management system controller device 2400 may be configured to calculate a position of a pusher 1804, a flip window 2124, and/or a spiral rail 2302. Accordingly, the display management system controller device 2400 may be configured to calculate a number of display products removed from one or more display management systems (e.g. 1800, 2100, and/or 2300) based upon detected motion of one or more pushers 1804, flip windows 2124, and/or spiral rails 2302.

In one specific example, the display management system controller device 2400 may be configured to determine a number of display products removed from the display management system 1800 based upon comparison of a first position of a pusher 1804 with a second position of said pusher 1804. In particular, processor 2404 may calculate a distance moved by pusher 1804, and execute one or more processes to consult a lookup table (stored, for example, in memory 2402) for a depth dimension associated with a plurality of products held within the display management system 1800. As such, processor 2404 may determine a product type held within display management system 1800 based upon information input by a user, or information sensed by one or more sensors 2410 (e.g. by scanning a barcode on the one or more products, or detecting a RFID signal associated with the one or more products within the display management system 1800, among others). In this way, upon receiving, from a lookup table within memory 2402, a depth dimension of a product held within the display management system 1800, and having calculated a distance moved by the pusher 1804, the processor 2404 may determine a number of products removed from the display management system 1800. Similarly, the processor 2404 may be utilized to determine a number of products inserted into a display management system 1800 (e.g. during a restocking process, and the like).

In another example, the display management system controller device 2400 may infer a depth dimension of a product type stored within a display management system 1800. In particular, without having information available within a lookup table stored in memory 2402, processor 2404 may determine a depth dimension of a product based upon one or more discrete motions of the pusher 1804. Specifically, after repeated instances of products being removed from the display management system 1800, processor 2404 may execute one or more processes to recognize a consistent distance moved by pusher 1804, and from this recognized distance, infer a depth dimension of a product to be utilized in determining a number of products removed from the display management system 1800 in response to future movements of pusher 1804.

Accordingly, the display management system controller device 2400 may be configured to execute one or more processes based upon information received from one or more control circuits, such as control circuit 2006, or accelerometer sensors, such as accelerometer sensor 2130. In addition, the display management system controller device 2400 may be configured to communicate with device 2410. In one example, device 2410 may comprise a camera, a speaker, a microphone, a proximity sensor, a motion sensor, an ambient light sensor, or an electronic display, among many others. In one specific example, the display management system controller device 2400 may be configured to display, on an electronic display device 2410, a message associated with one or more products stored within a display management system (e.g. system 1800, 2100, or 2300).

The display management system controller device 2400 may be configured to communicate with one or more mobile devices, such as mobile device 2412. As such, communication between the display management system controller device 2400 and one or more of a control circuit 2006, an accelerometer sensor 2130, device 2410, and/or mobile device 2412 may be via a network 2408. In turn, network 2408 may be a wired or wireless network that may utilize any communication protocol. As such, network 2408 may be the Internet, a wide area network (WAN), a local area network (LAN), or a Bluetooth connection, among many others. In one specific example, network 2408 may utilize one or more bands of the industrial, scientific and medical (ISM) radio bands.

In one implementation, the display management system controller device 2400 may execute one or more processes to receive and store one or more pieces of biographic information associated with a user, such as a user removing one or more display products from one or more display management systems (e.g. 1800, 2100, and/or 2300) in communication with the device 2400. In one example, the display management system controller device 2400 may receive one or more pieces of biographic information associated with the user, and received from a mobile device 2412 carried by the user. Specifically, the mobile device 2412 may comprise a smart phone or tablet carried by a user, and configured to communicate with the display management system controller device 2400 via one or more of a Bluetooth connection, an NFC connection, or a Wi-Fi connection, among others.

In one implementation, the display management system controller device 2400 may execute one or more processes to receive data from an additional sensor 2410, in response to receiving motion data from one or more sensors (e.g. one or more sensors 1822 and/or 2130) associated with one or more display management systems (e.g. 1800, 2100, and/or 2300). In one specific example, the display management system controller device 2400 may communicate with a camera device 2410, and execute one or more facial recognition processes to determine, in one example, an identity of a customer from a database of customers who are members of a store loyalty program. In another example, the display management system controller device 2400 may communicate with the camera device 2410, and execute one or more facial recognition processes to determine one or more points of information associated with a user removing the one or more products from the display management systems from which motion data is received. This information may include a gender and/or an approximate age range of the user removing the one or more products from the display management systems from which motion data is received. In this way, the display management system controller device 2400 may be utilized to collect shopper behavior information that may be utilized to plan product displays within a store, to determine a popularity of a given product for a given age range, and/or gender, and the like.

In yet another implementation, the display management system controller device 2400 may execute one or more processes to recognize one or more patterns from the data received from sensors associated with motion of one or more display management systems (e.g. systems 1800, 2100, and/or 2300). As such, processor 2404 may receive motion data from a plurality of sensors (e.g. one or more sensors 1822 and/or 2130), and based upon the received motion data, determine whether the sensor data represents a recognized pattern (stored in memory 2402) resulting from products being removed from the one or more display management systems (e.g. systems 1800, 2100, and/or 2300).

In one specific example, the display management system controller device 2400 may receive motion data from a single display management system (e.g. system 1800, 2100, or 2300) and determine that the received motion data represents removal of a plurality of a same product from the display management system. Further, the display management system controller device 2400 may calculate a rate at which products are being removed from this display management system. In one example, if a rate at which the products are being removed from this display management system is above a threshold level, the display management system controller device 2400 may determine that the removal of products may represent an attempted theft. In response, the display management system controller device 2400 may execute one or more processes to communicate a warning message to security personnel. In one example, this warning message may be communicated as an electronic message delivered via network 2408. Additionally or alternatively, the display management system controller device 2400 may, in response to determining that motion data represents a pattern associated with an attempted theft, communicate with a camera device 2410 to capture one or more images of a user of the display management system from which the motion data has been received. In this way, one or more images of a suspected thief may be recorded. Further, the display management system controller device 2400 may, in response to determining that received motion data may represents an attempted theft, execute one or more processes to sound an audible message and/or siren.

In another example, the display management system controller device 2400 may receive sensor data, otherwise referred to as motion data, from a plurality of sensors (e.g. one or more sensors 1822 and/or 2130, among others) associated with a plurality of display management systems (e.g. 1800, 2100, and/or 2300). Accordingly, the display management system controller device 2400 may execute one or more processes to recognize one or more patterns from the data received from the sensors. In this way, the display management system controller device 2400 may determine, in response to a rate at which products are being removed from the display management systems in close proximity to one another within a store being above a threshold rate level, that the received sensor data may represent an attempted theft. In response, the display management system controller device 2400 may communicate with a camera 2410, or communicate a message to security personnel, among others.

In one implementation, the display management system controller device 2400 may receive sensor data from an accelerometer sensor 2130 coupled to a flip window 2124. As such, data received from the accelerometer sensor 2130 may represent an orientation of the flip window 2124. In one embodiment, the display management system controller device 2400 may be configured to recalibrate a rest position (otherwise referred to as a zeroed position) associated with the accelerometer sensor 2130. In particular, the processor 2404 may execute one or more processes to recognize that the flip window 2124 is positioned at a specific angle when the flip window 2124 is not being moved. As such, this specific angle may not be equal to a 0° angle from a vertical orientation. In response, the processor 2404 may determine that the specific angle represents a rest position from which motion of the accelerometer sensor 2130 is to be calculated.

In one implementation, the display management system controller device 2400 may be configured to postpone one or more processes associated with recognition of an attempted theft. As such, processor 2404 may execute one or more processes to allow for restocking of one or more display management systems in communication with the display management system controller device 2400, and the like. In one example, a physical key may be utilized to disarm communication between a display management system (1800, 2100 and/or 2300) and the display management system controller device 2400. In another example, and electronic communication device (not shown) may be carried by a user restocking one or more of the display management systems in communication with the display management system controller device 2400. As such, the electronic medication device may communicate across network 2408 to identify the user as a person engaged in restocking a display management system. In yet another example, one or more security features associated with the display management system controller device 2400 configured to identify potential attempted thefts may be temporarily suspended based upon instructions received by the display management system controller device 2400 from a user. In one specific example, this user may be a store manager, and the like. As such, a temporary suspension may be applied to a subset of display management systems (e.g. one or more of the display management systems 1800, 2100 and/or 2300) in communication with the display management system controller device 2400.

In yet another example, display management system controller device 2400 may be connected to an inventory control system (not shown). As such, information gathered by the display management system controller device 2400 related to a number of products removed from one or more display management systems (e.g. one or more of the display management systems 1800, 2100 and/or 2300) may be communicated to an inventory control system such that information related to an inventory held within a store may be updated in real-time, and the like.

In another example, the display management system controller device 2400 may communicate with one or more devices configured to provide data associated with one or more display management systems (e.g. one or more of the display management systems 1800, 2100 and/or 2300), one or more individuals within a store (e.g. customers removing one or more products from the display management systems), and/or one or more communication devices (e.g. cameras, electronic display screens, microphones, ambient light sensors, motion sensors, mobile devices, and the like), among others. As such, the display management system controller device 2400 may communicate with one or more of devices 2006, 2330, 2410, and/or 2412. However, in one implementation, communication between one or more of the devices 2006, 2130, 2410, and/or 2412 may not be using a direct network connection. As such, in one example, communication between one or more of the depicted devices 2006, 2130, 2410, and/or 2412 may utilize mesh networking methodologies, without departing from the scope of the disclosures described herein.

Figure 25:
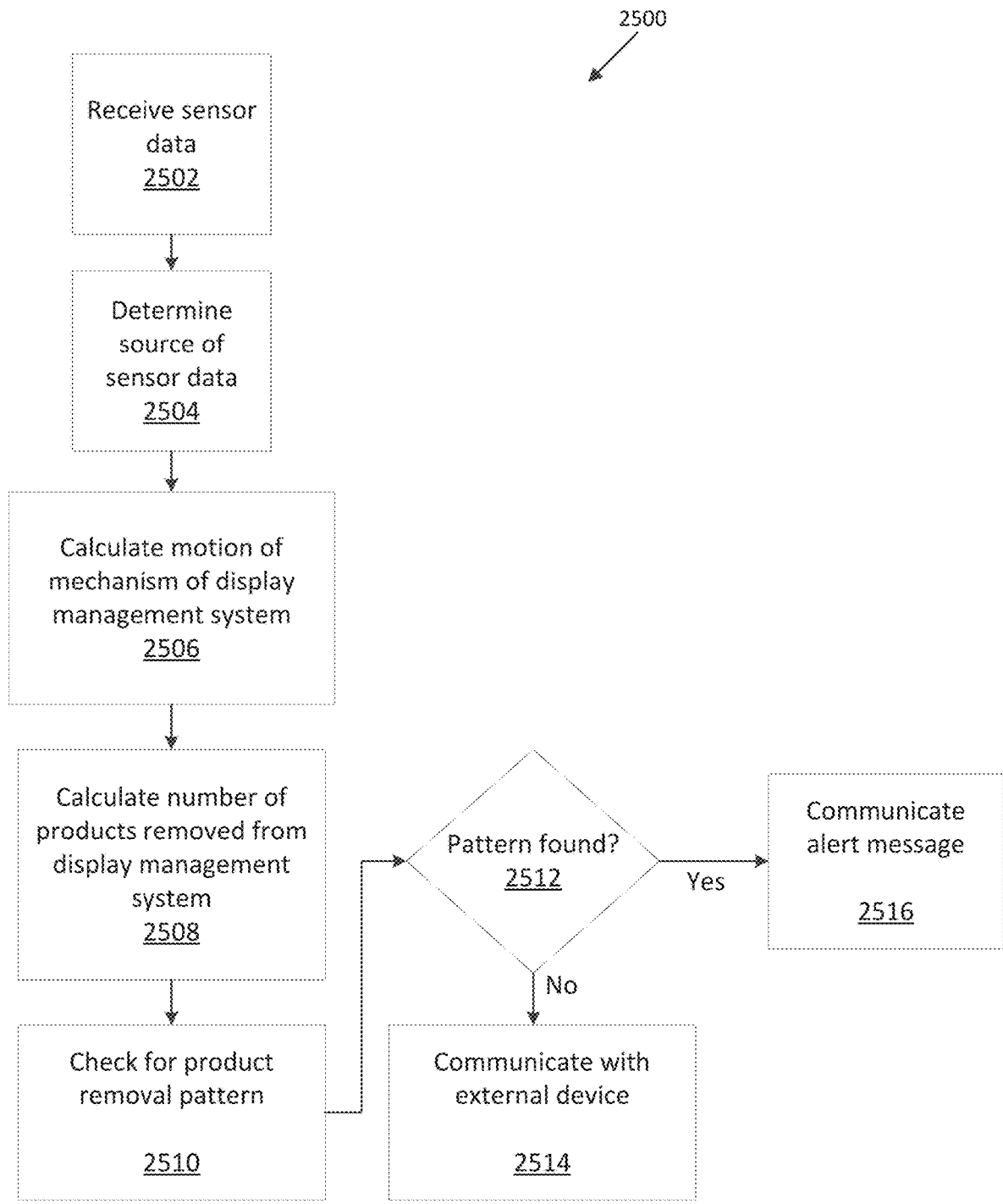
FIG. 25 schematically depicts a flowchart diagram of a process that may be executed by a display management system controller device to determine a number of products removed from a sensor-equipped display management system, according to one or more aspects described herein.

FIG. 25 schematically depicts a flowchart diagram of a process 2500 that may be executed by a display management system controller device 2400, and in particular, processor 2404. In particular, processor 2404 may receive sensor data from one or more sensors (e.g. one or more sensors 1822 and/or 2130, among others). In one example, the sensor data may be received at block 2502. In response to receiving sensor data, processor 2404 may execute one or more processes to determine a source of the received sensor data. In one implementation, processor 2404 may determine a source of the sensor data at block 2504 of process 2500. As such, the processor 2404 may determine a display management system source of the received sensor data, such as one or more of display management systems 1800, 2100, and/or 2300.

Upon determining a source of received sensor data, processor 2404 may execute one or more processes to calculate a motion of a mechanism of a display management system.

In particular, the processor 2404 may calculate a position of one or more of a pusher 1804, a flip window 2124, and/or a spiral rail 2302. From this position information, processor 2404 may calculate a distance moved by one or more of the respective mechanisms (1804, 2124, and/or 2302). As such, these one or more processes to calculate a motion of a mechanism of a display management system may be executed at block 2506 in accordance with motion calculation methods previously described in this document.

Further, process 2500 may calculate a number of products removed from the display management system. In particular, processor 2404 may execute one or more processes to infer, or lookup, from a lookup table stored within memory 2402, a depth of a product. Using this information, processor 2404 may compare a depth of a product to a distance moved by, in one example, a pusher 1804. In turn, processor 2404 may calculate the number of products removed from a display management system 1800. Similarly, processor 2404 may utilize substantially similar processes to determine a number of products inserted into a display management system 1800. Accordingly, this determination of a number of products removed from a display management system may be executed at block 2508 of process 2500.

In one example, upon calculation of a number of products removed from a display management system, processor 2404 may execute one or more processes to attempt to identify a pattern from the received sensor data. As such, processor 2404 may execute one or more processes to attempt to identify a product removal pattern from one or more display management systems, such as systems 1800, 2100, and/or 2300. In particular, processor 2404 may identify one or more product removal pattern indicative of a potential attempted theft based upon one or more product removal rates being above one or more threshold rate levels, and/or products being removed from a same display management system and/or multiple display management systems within a predetermined physical radius of one another. In one example, processor 2404 may attempt to identify one or more patterns from received sensor data at block 2510. Accordingly, decision block 2512 represents one or more processes executed by processor 2404 two check whether one or more one or more product removal patterns have been found from received sensor data. In one example, if a product removal pattern is identified by processor 2404, process 2500 may proceed to block 2516, wherein processor 2404 may communicate an alert message. As such, this alert message may be an audible message and/or siren emitted by a local audio box, such as local audio box 950. In another example, this alert message may be an electronic message communicated to security personnel within a store, among others. In another example, if a product removal pattern is not identified by processor 2404, process 2500 may proceed to block 2514, and such that display management system controller device 2400 may communicate with an external device, such as device 2410 and/or 2412.

Figure 26:
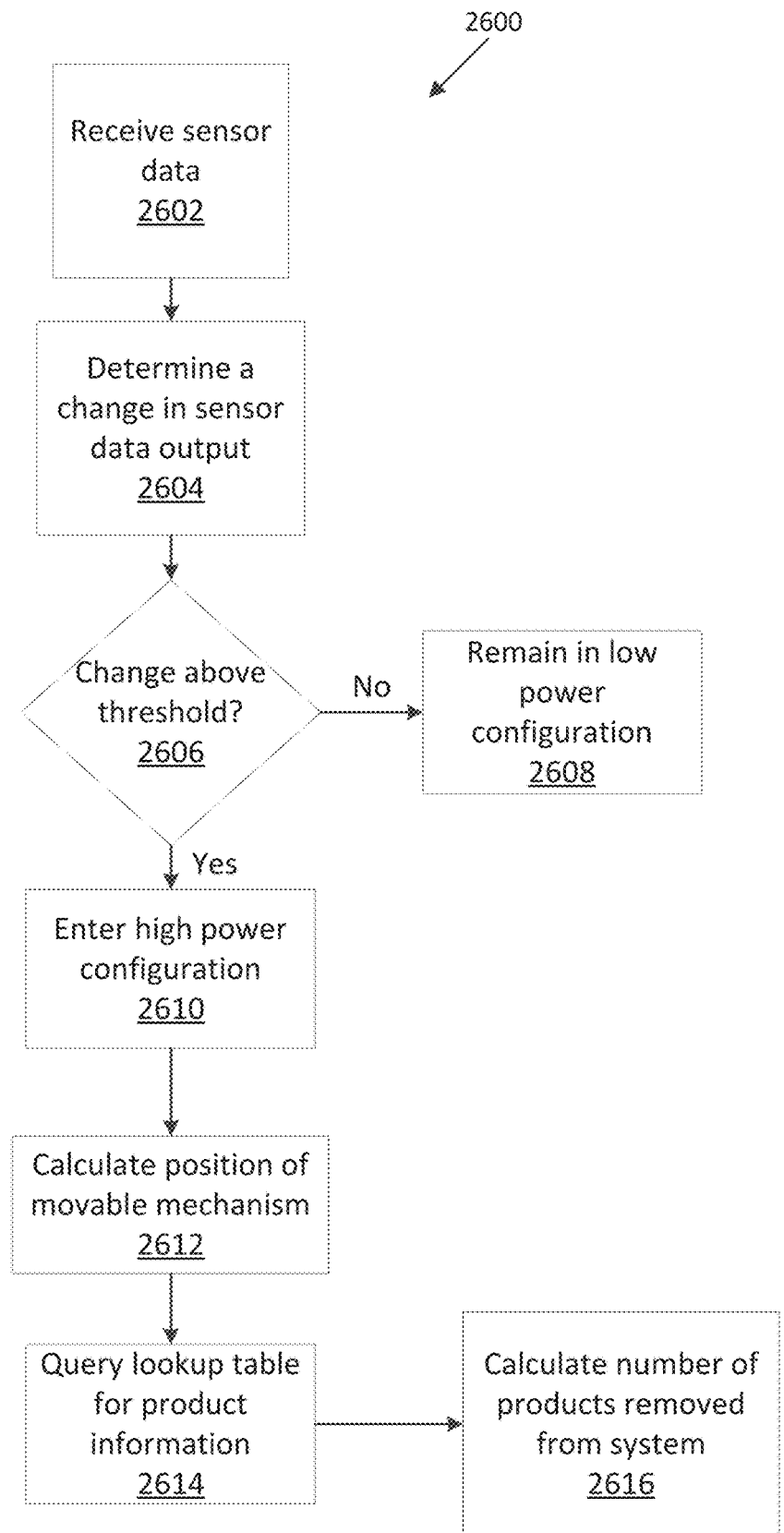
FIG. 26 is a flowchart diagram of a process for calculation of a number of products removed from a display management system, according to one or more aspects described herein.

FIG. 26 is a flowchart diagram of a process 2600 for calculation of a number of products removed from a display management system. In particular, process 2600 is described based upon sensor data received from a sensor (e.g. sensors 1822, and/or 2130) configured to output signals responsive to a motion of a movable mechanism (pusher 1804, flip window 2124, and/or spiral rail 2302, among others) within a display management system, such as display management system 1800, 2100, and/or 2300. In one example, this sensor data may be received at block 2602 of process 2600 by processor 2014. In response, one or more processes may be executed by processor 2014 to determine a change in the received output data. In particular, processor 2014 may execute one or more processes to query memory 2010 for a stored sensor value indicative of a previous output from a same sensor from which the data was received at block 2602. Accordingly, the processor 2014 may compare the stored sensor value to the new sensor value received from a display management system, and calculate a change in an output from the sensor In one implementation, and at decision block 2606, the processor 2014 may compare the calculated change in the output signal from the sensor to one or more predetermined threshold values. As such, the one or more predetermined threshold values may represent motion thresholds below which processor 2014 may discard the sensor data received at block 2602. Specifically, if the received sensor data is below the one or more predetermined threshold values, it may not be as a result of a product removal from a display management system, and may be due to random motion/vibration of a store shelf, among others. As such, in one example, block 2606 may have the behavior of an electronic filter, among others.

In one example, the processor 2014 may execute those processes associated with blocks 2602 and 2604 while operating in a low power configuration. In this way, assessment of received sensor data may be carried out while consuming a reduced amount of electrical energy, and thereby prolonging, in one example, the battery life of a sensor 1822, and/or 2130. Accordingly, if, at decision block 2606, it is determined that the received sensor data does not represent motion of a mechanism of a display management system above one or more threshold values, process 2600 proceeds to block 2608, and the processor 2014 remains in a low power configuration. If, however, it is determined that the received sensor data represents a motion of a mechanism of a display management system above the one or more threshold values, process 2600 proceeds to block 2610, and the processor 2014 may enter a high power configuration. In one example, the high power configuration may include communication of the sensor data to a remote processor, such as processor 2404. In another example, the high power configuration may include execution of one or more additional processes by the same processor 2014, wherein these additional processes may consume electrical energy at a higher rate than the processor 2014 consumers in a low power configuration.

In one example, process 2600 includes calculation of a position of a movable mechanism (e.g. pusher 1804, flip window 2124, and/or spiral rail 2302, among others) of a display management system. In particular, this calculation of a position of a movable mechanism of the display management system may be executed at block 2612. As such, calculation of a position of a movable mechanism of a display management system may include execution of one or more sub-processes to convert received sensor data into an indication of a position of the movable mechanism. Specifically, block 2612 may include execution of one or more processes to convert a value proportional to a capacitance of sensor 1822 into a position of pusher 1804. Additionally or alternatively, block 2612 may include execution of one or more processes to convert a value proportional to an acceleration sensed by accelerometer 2130 into a position of flip window 2124 or spiral rail 2302.

Upon calculation of a position of a movable mechanism of a display management system, processor 2014 and/or processor 2404 may query a lookup table, stored in memory 2010 and/or 2402 for information associated with one or more products stored within the display management system. This information may include a depth dimension of the product stored within the display management system. Accordingly, using this information, the processor 2014 and/or 2404 may calculate a number of products removed from the display management system. In particular, processor 2014 and/or 2404 may compare a distance moved by a movable mechanism of the display management system with the specific product dimensions. In one specific example, a distance moved by pusher 1804 may be divided by a depth dimension of a product stored within the display management system 1800. In one example, this calculation of a number of products removed from the display management system may be executed at block 2616.

Figure 27:
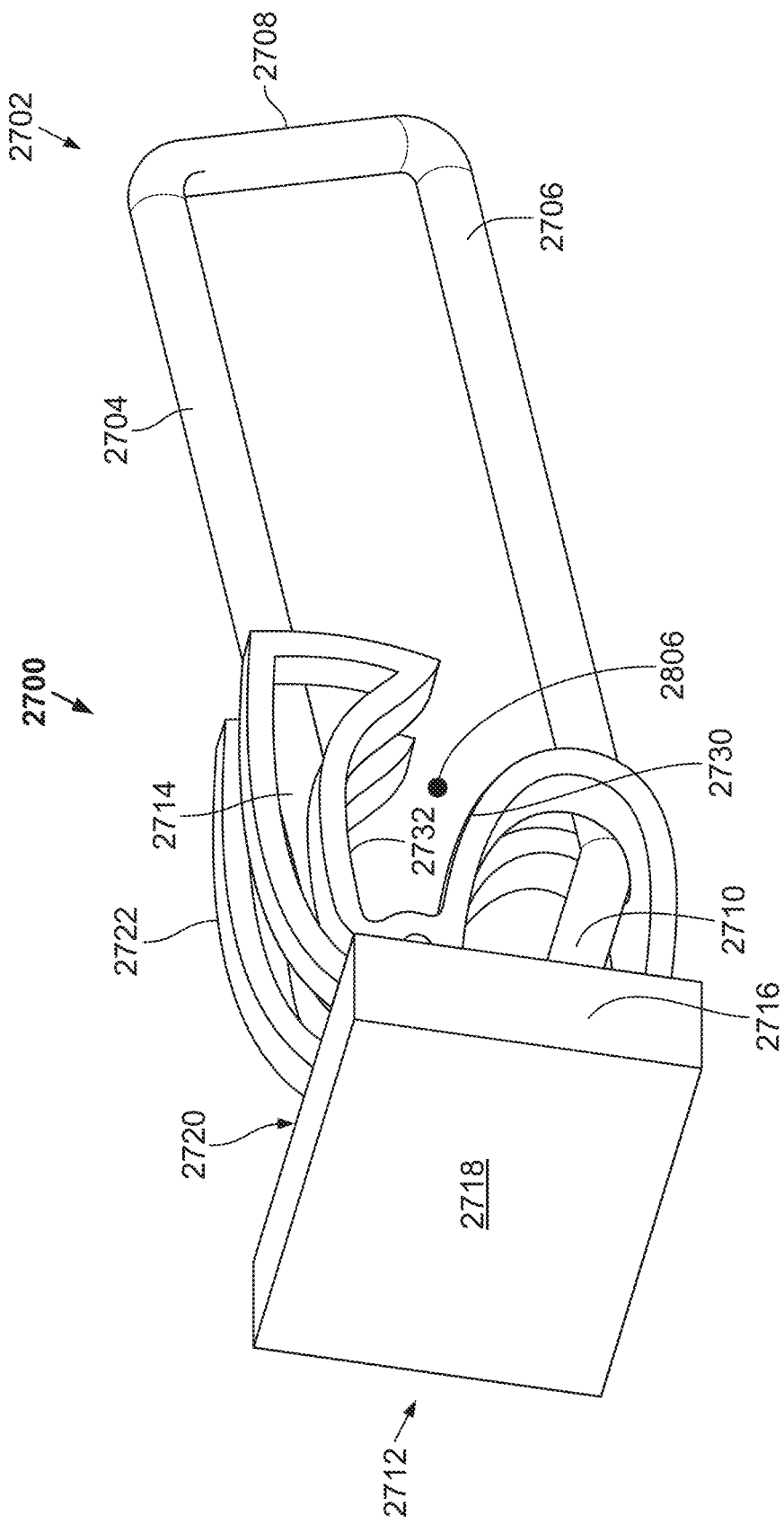
FIG. 27 depicts another implementation of a display management system, according to one or more aspects described herein, according to one or more aspects described herein.

FIG. 27 depicts another implementation of a display management system 2700. The display management system 2700 may be referred to as a peg hook system, and comprise a support structure 2702 that has an upper rail 2704 coupled to a lower rail 2706 at a first end 2708. The lower rail 2706 may be configured to support one or more hanging products (not shown in FIG. 27) that are added to, and removed from, the lower rail 2706 at a second end 2710. A label holder 2712 may be pivotably-coupled to a second end 2714 of the upper rail 2704. The display management system 2700 may be configured to be removably-coupled to a surface (not shown) at the first end 2708, such that the support structure 2702 may, in one example, be cantilevered out from a vertical peg hook surface, similar to surface 2312 as depicted in FIG. 23, for example. Accordingly, any coupling mechanism and geometry (peg hooks, and the like) may be utilized to removably-couple the display management system 2700 to a surface. The upper rail 2704 and the lower rail 2706 may comprise an electrically-conductive structure formed from a metal or alloy, and such that an electrical current may be passed from the second end 2714 of the upper rail 2704 to the second end 2710 of the lower rail 2706.

The label holder 2712 may comprise a display plate 2716 that has a front surface 2718 and a back surface 2720. In one example, the front surface 2718 of the display plate 2716 may be configured to receive a display label (not shown in FIG. 27). Accordingly, in one example, this display label may be configured to communicate product information (e.g. a product name, price, and the like) to a customer in a store, and the like. The label holder 2712 may also comprise an arm structure 2722 that is coupled to the back surface 2720 of the display plate 2718. As will be discussed in further detail below, the arm structure 2722 may comprise a geometry that prevents more than one product from being removed from the lower rail 2706 as the label holder 2712 is pivoted from a closed position, as depicted in FIG. 27, to an open position, as depicted in FIG. 28C. As such, the arm structure 2722 may comprise a lower bumper surface 2730 spaced apart from an upper bumper surface 2732 to form a channel 2806 therebetween. In one example, the label holder 2712 may be formed from one or more injection molding processes of one or more polymer materials. Additionally or alternatively, the label holder 2712 may be wholly or partially formed from one or more metals or alloys.

Figure 28A:
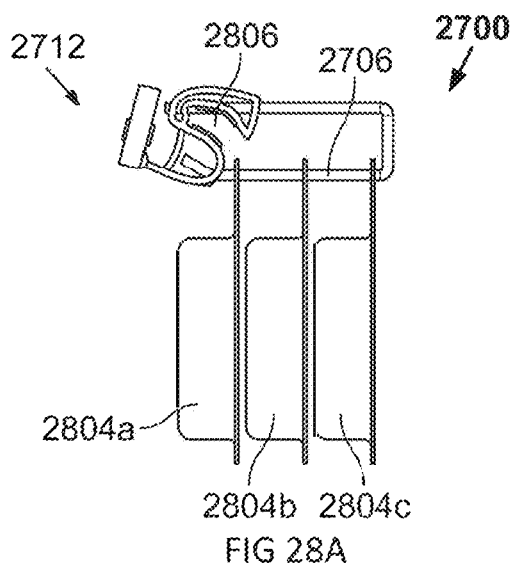
FIGS. 28A-28F depict a sequence of movements of a label holder as a product is removed from the display management system of FIG. 27, according to one or more aspects described herein.
Figure 28B:
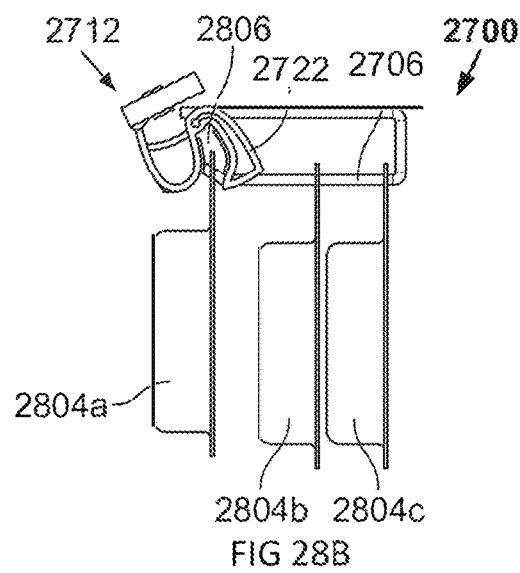
Figure 28C:
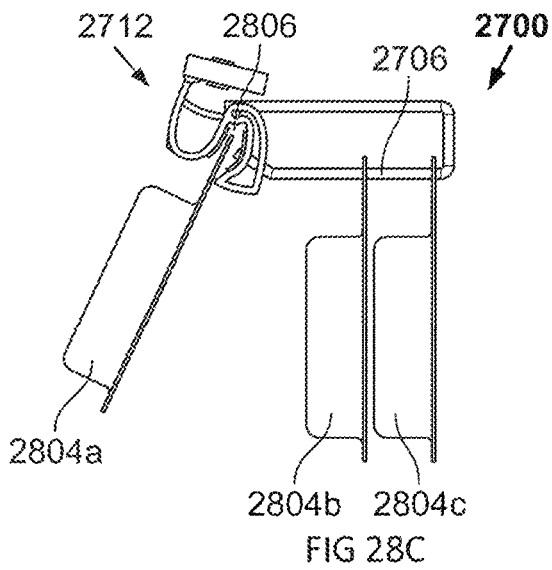
Figure 28D:
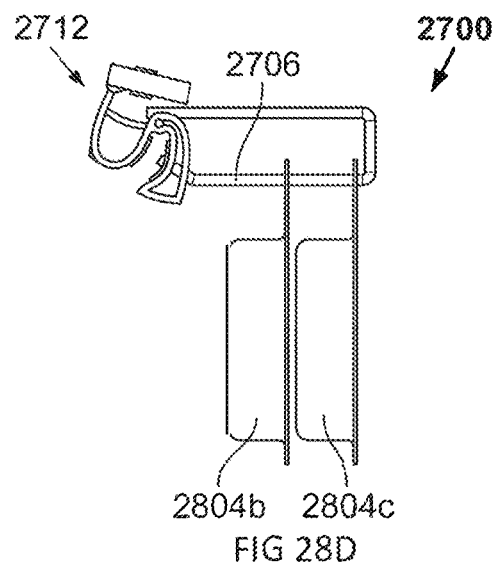
Figure 28E:
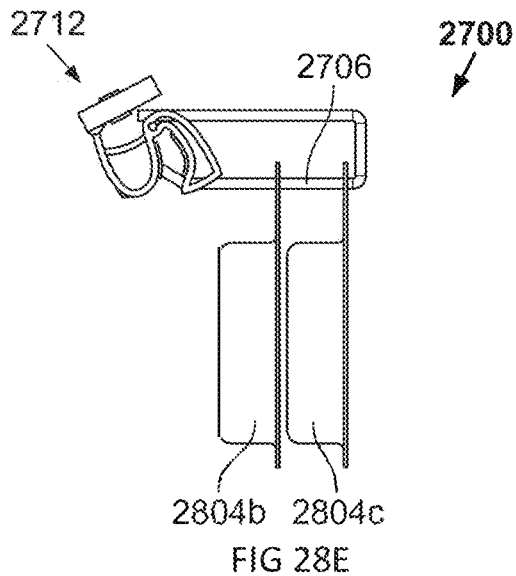
Figure 28F:
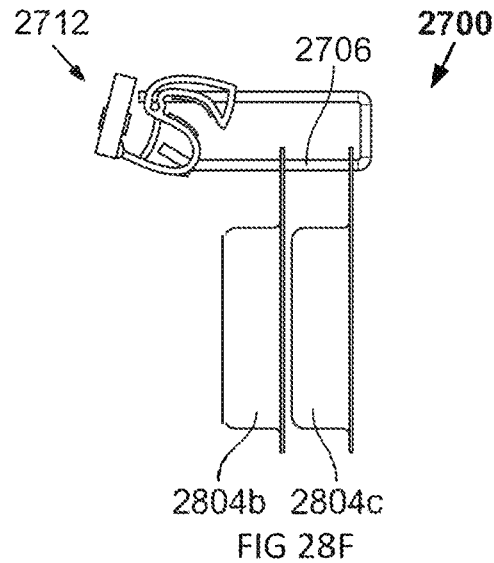

FIGS. 28A-28F depict a sequence of movements of the label holder 2712 as a product 2804a is removed from the display management system 2700. As such, the label holder 2712 may be configured to pivot between a closed position, as depicted in FIG. 28A, and an open position, as depicted in FIG. 28C. In one example, the arm structure 2722 may be configured to prevent more than one product (e.g. more than one of products 2804a-c) hanging from the lower rail 2706 from being removed from the display management system 2700 each time the label holder 2712 is pivoted from the closed position depicted in FIG. 28A to the open position depicted in FIG. 28C. Taking each step in turn, FIG. 28A depicts the label holder 2712 in a closed position, FIG. 28B depicts the label holder 2712 is a partially-pivoted position with product 2804a within channel 2806 of the arm structure 2722. Accordingly, the geometry of the arm structure 2722 is such that only one of the products, from products 2804a-2804c, will fit into the channel 2806. FIG. 28C depicts the label holder 2712 in a fully-pivoted position. FIG. 28D depicts the label holder 2712 in the fully-pivoted position after the product 2804a is removed from the lower rail 2706. Further, FIG. 28E depicts the label holder 2712 in the partially-pivoted position as it is returned to the closed position, as depicted in FIG. 28E.

In one example, the display management system 2700 may comprise a sensor device configured to output data responsive to a motion of the label holder 2712. As such, FIG. 29 schematically depicts the display management system 2700 that includes a label holder rotation sensor device 2902. In one implementation, the label holder rotation sensor device 2902 may comprise an accelerometer sensor, and may be substantially similar to sensor 2130, as previously described. In another example, the label holder rotation sensor device 2902 may be similar to the control circuit 2006, as previously described. As such, the label holder rotation sensor device 2902 may comprise a power supply similar to power supply 2008, a memory similar to memory 2010, an interface similar to interface 2012, and a processor similar to processor 2014. Accordingly, the label holder rotation sensor device 2902 may be configured to receive and process sensor data received from one or more sensor types, including, among others, accelerometers, force sensors, capacitance sensors, current sensors (ammeters/galvanometers), and voltage sensors (voltmeters). Accordingly, the label holder rotation sensor device 2902 may be configured to receive sensor data and detect a movement of the label holder 2712. For example, the label holder rotation sensor device 2902 can be configured to measure the angular movement of the label holder 2712. For example, the label holder rotation sensor device 2902 may be configured to measure a change in angle with a resolution of 10°, 5°, 1°, 0.1° or less. Further, other measurement resolutions may be utilized with the angular movement of the label holder 2712, without departing from the scope of these disclosures. The angular movement of the label holder 2712 may also measure an absolute angle of inclination of the label holder 2712 relative to a vertical plane (e.g. relative to gravity), and with a resolution of 10°, 5°, 1°, 0.1° or less. As such, an output from the label holder rotation sensor device 2902 may comprise a signal (e.g. an electronic analog or digital signal), that may be processed to receive an angular value that may correspond to a change in angular rotation of the label holder 2712, or an absolute value of inclination/rotation of the label holder 2712 (e.g. 14°, 61°, 104° etc.). The label holder rotation sensor device 2902 may, in one example, be positioned within a display plate 2716 of the label holder 2712. As such, the label holder rotation sensor device 2902 may comprise a circuit board, or a circuit shielded with a protective covering (e.g. a casing configured to receive the device 2902). The label holder rotation sensor device 2902 may be received into a recess (not depicted) on the front surface 2718 or back surface 2720 of the display plate 2716. In one example, the label holder rotation sensor device 2902 may be covered within the recess by a covering such that it is not externally visible. A display label, received by the label holder 2712 may, in one example, cover a recess configured to receive the label holder rotation sensor device 2902. In another example, the label holder rotation sensor device 2902 may be may be overmolded within the label holder 2712. The label holder rotation sensor device 2902 may, in another example, be externally visible on or within the label holder 2712. The label holder rotation sensor device 2902 may be removably-coupled to the label holder 2712, or may be rigidly coupled to the label holder 2712. Further, the label holder rotation sensor device 2902 may be coupled to a portion of the label holder 2712 other than the display plate 2716. For example, the label holder rotation sensor device 2902 may be coupled to the arm structure 2722.

In one implementation, the label holder rotation sensor device 2902 and can predict certain conditions of the label holder 2712. Specifically, in certain instances, the label holder rotation sensor device 2902 may execute one or more processes to detect a pattern from the received sensor data which may be indicative of an attempted theft of one or more products from the display management system 2700. For example, the label holder rotation sensor device 2902 may detect high-frequency movement of the label holder 2712 above a threshold frequency (it will be understood that any special frequency may be utilized without departing from the scope of these disclosures), which may be indicative of an attempted theft. In another example, the label holder rotation sensor device 2902 may detect that the whole display management system 2700 has been removed from a surface to which it was coupled (not depicted in FIG. 29). As such, this detection of a removal of the display management system 2700, which may be detected as a change in orientation from an accelerometer sensor, may be interpreted as an attempt to steal one or more products from the display management system 2700. Further, the label holder rotation sensor device 2902 may utilize multiple sensors of different types in combination with one another in order to interpret a movement of the label holder 2712. In other examples, the label holder rotation sensor device 2902 may be utilized for product inventory tracking on the display management system 2700. In particular, for example, the arm structure 2722, which only allows one product to be removed from the display management system 2700 at a time, the label holder rotation sensor device 2902 may recognize each transition of the label holder 2712 from a closed position (e.g. as depicted in FIG. 28A) to an open position (e.g. as depicted in FIG. 28C) as indicating a removal of a single product from the display management system 2700. In other examples, the label holder rotation sensor device 2902 may be utilized to track product inventory on the display management system 2700 utilizing one or more optical sensors to detect one or more products being inserted onto, or removed from, the display management system 2700. Additionally or alternatively, the label holder rotation sensor device 2902 may utilize an RFID sensor to track a number of products being inserted onto or removed from the display management system 2700.

Figure 30:
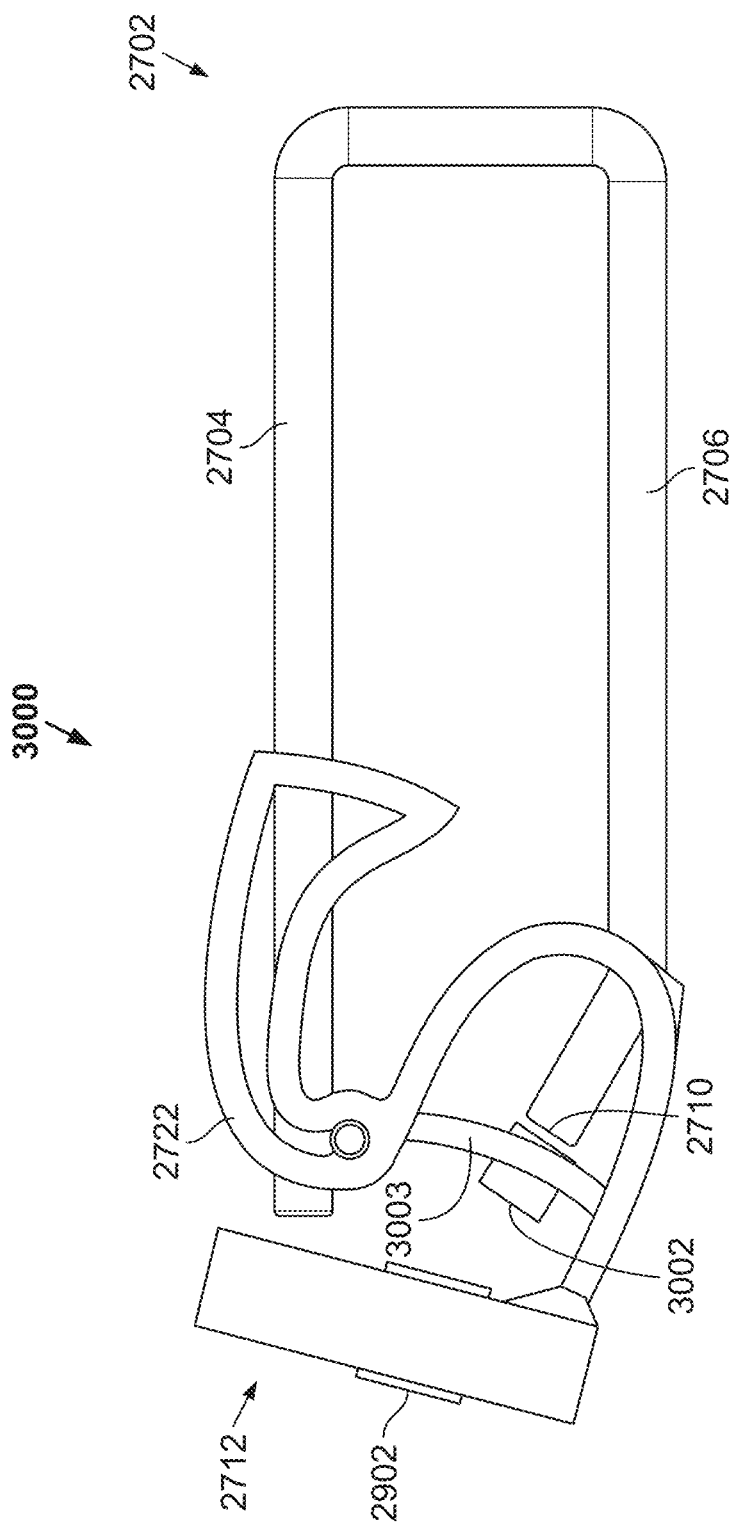
FIG. 30 schematically depicts another implementation of a display management system, according to one or more aspects described herein.

In one example, the label holder rotation sensor device 2902 may include one or more sensors on an integrated circuit. In another example, the label holder rotation sensor device 2902 may receive sensor data from a sensor element positioned elsewhere on the display management system 2700. For example, FIG. 30 schematically depicts a display management system 3000 similar to display management system 2700, and including the label holder 2712 comprising the label holder rotation sensor device 2902. In the example depicted in FIG. 30, display management system 3000 may also include an additional label holder contact sensor 3002, label holder contact sensor 3002, which may be configured to make contact with the second end 2710 of the lower rail 2706 when the label holder 2712 is in the closed position depicted FIG. 30. Label holder contact sensor 3002 may be configured to communicate data to label holder rotation sensor device 2902. Further, label holder contact sensor 3002 may comprise one or more of a force sensor, a capacitance sensor, a voltage sensor, or a current sensor configured to detect contact between label holder contact sensor 3002 and the second end 2710 of the lower rail 2706. Accordingly, the label holder contact sensor 3002 may be removably or rigidly coupled to a support arm 3003 of the arm structure 2722. As such, the label holder contact sensor 3002 may be coupled to the support arm 3003 by overmolding a portion or all of the label holder contact sensor 3002, by a fastener (such as a one or more screws, rivets, or bolts, or any other fastener known in the art), by an adhesive, by a weld process (including a polymer or a metallic weld), among others.

As will be discussed in further detail below with respect to FIG. 33, the label holder contact sensor 3002 can detect the bending of the lower rail 2706 to predict a potential theft. Also in certain examples, it is contemplated that the label holder contact sensor 3002 can be implemented in conjunction with the label holder rotation sensor device 2902 or alone as a lower cost option for predicting potential theft situations. As such, in one example, the label holder contact sensor 3002 may generate an electrical (analog or digital) signal that may be communicated by a wired or wireless pathway to the label holder rotation sensor device 2902. Further, the label holder rotation sensor device 2902 may receive the electrical signal from the label holder contact sensor 2002, and interpret the received signal as indicating that, among others, there is contact, partial contact, or no contact between the label holder contact sensor 3002 and the second end 2710 of the lower rail 2706. As such, the label holder rotation sensor device 2902 may receive periodic data from the label holder contact sensor 3002 with a frequency (any frequency may be utilized without departing from these disclosures e.g. 0.1 Hz, 1 Hz, 60 Hz). In another example, the label holder contact sensor 3002 may generate a non-periodic, or a continuous output signal. Additionally or alternatively, the label holder rotation sensor device 2902 may query the label holder contact sensor 3002 with a periodicity (any frequency may be utilized without departing from the scope of these disclosures), or with a non-periodic frequency. As such, the label holder contact sensor 3002 may only generate an output signal upon receipt of a query from the label holder rotation sensor device 2902.

FIG. 31 schematically depicts another display management system 3100 similar display management system 2700, having the label holder 2712 comprising the label holder rotation sensor device 2902. In the example depicted in FIG. 31, display management system 3100 may also include an upper label holder contact sensor 3104 and a lower label holder contact sensor 3102. In one example, the lower label holder contact sensor 3102 may be similar to the label holder contact sensor 3002 with regard to one or more of the functionality and location on the label holder 2712 described in relation to the label holder contact sensor 3002. Similarly, the upper label holder contact sensor 3104 may have functionality similar to the label holder contact sensor 2002 described in relation to FIG. 30, but may be removably or rigidly coupled to the back surface 2720 of the display plate 2716. Accordingly, the upper label holder contact sensor 3104 and the lower label holder contact sensor 3102 may be configured to make contact with the second end 2714 of the upper rail 2704 and the second end 2710 of the lower rail 2706, respectively, when the label holder 2712 is in the closed position depicted in FIG. 31. As such, sensors 3102 and 3104 may be configured to communicate data to label holder rotation sensor device 2902 or other devices as discussed herein. Further, upper label holder contact sensor 3104 and the lower label holder contact sensor 3102 may comprise one or more of a force sensor, a capacitance sensor, a voltage sensor, or a current sensor. In one example, contact between the lower label holder contact sensor 3102 and the second end 2710 of the lower rail 2706, and contact between the upper label holder contact sensor 3104 and the second end 2714 of the upper rail 2704 completes an electrical circuit such that an electrical current may be passed through the support structure 2702 between sensors 3102 and 3104. As such, detection of an electrical current at one or more of sensors 3102 and/or 3104 may be communicated to label holder rotation sensor device 2902 in order to determine that the label holder 2712 is in a closed position.

FIG. 32 schematically depicts another display management system 3200, similar to display management system 2700. The display management system 3200 may include the label holder 2712 comprising the label holder rotation sensor device 2902, and the support structure 2702. The display management system 3200 may include an upper product contact sensor 3204 and a lower product contact sensor 3202. As such, the upper product contact sensor 3204 and the lower product contact sensor 3202 may be configured to make contact with a product (e.g. a product similar to products 2804*a*-*c* as schematically depicted in FIG. 28A) as it is inserted onto and/or removed from the lower rail 2706. The sensors 3202 and 3204 may comprise force sensors. As such, the sensors 3202 and 3204 may utilize piezoelectric elements configured to generate an output signal responsive to one or more of the upper product contact sensor 3204 and the lower product contact sensor 3202 making contact with another object, such a product hanging on lower rail 2706 (not depicted in FIG. 32). In one implementation, sensors 3202 and 3204 may be coupled to surfaces 2730 and 2732 of the arm structure 2722 within the channel 2806 such that it is likely that a product being removed from, or inserted onto, the lower rail 2706 will make contact with one or more of the sensors 3202 and/or 3204. Accordingly, the coupling of the upper product contact sensor 3204 and the lower product contact sensor 3202 to surfaces 2730 and 2732 may be by partial overmolding, by a welding process, or using a fastener, among others. In other implementations, one or more of sensors 3202 and 3204 may comprise a capacitive sensor, an electrical resistance sensor, a voltage sensor, a current sensor, or a proximity sensor, among others. In yet another example the upper product contact sensor 3204 and the lower product contact sensor 3202 may comprise infra-red sensors. Accordingly, a product may be detected within the channel 2806 upon breaking an infra-red beam between the sensors 3204 and 3202.

Figure 32A:
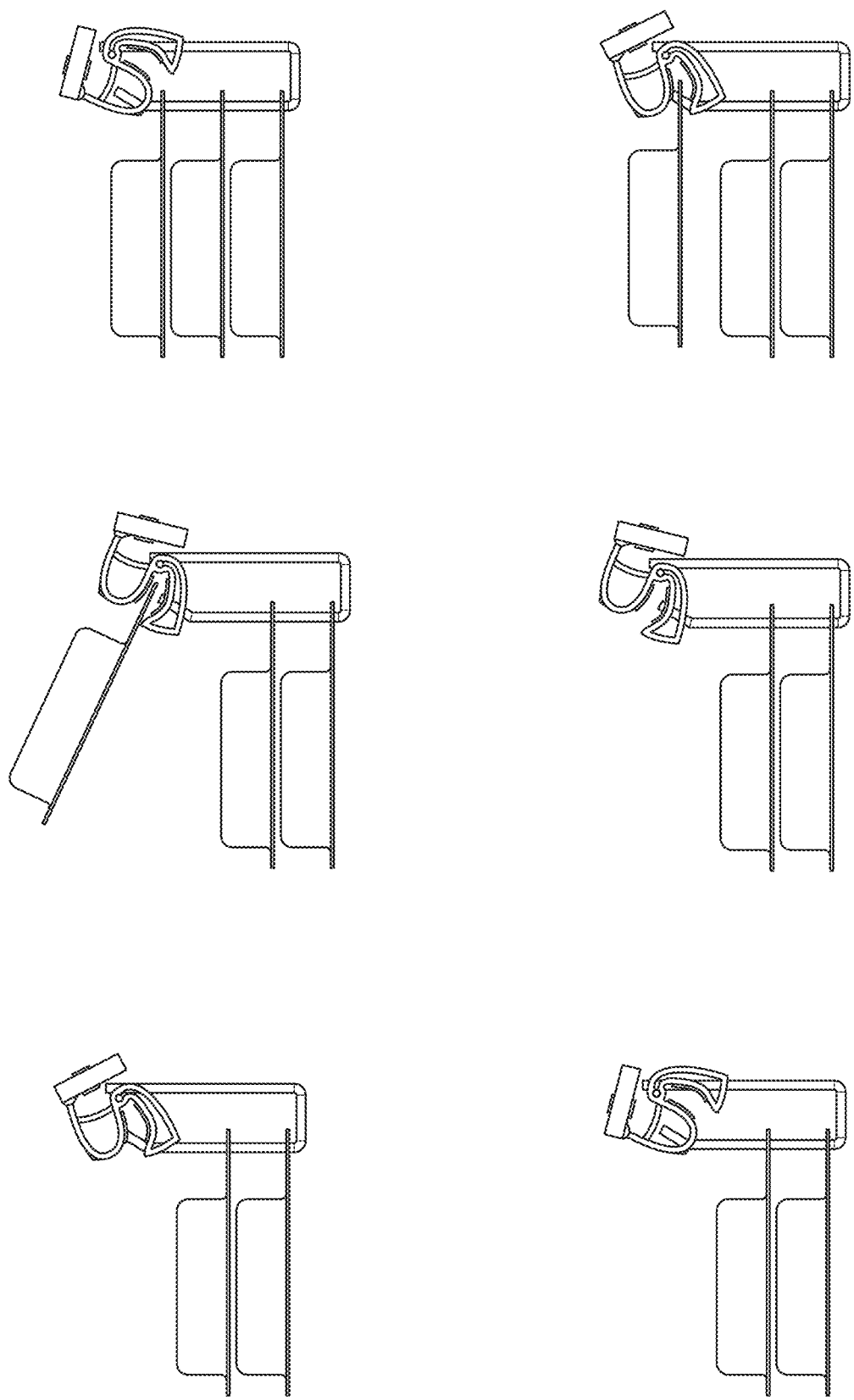

In one example, and as schematically depicted in FIGS. 32A-32C, sensors 3202 and 3204 can detect a product-removal event (FIG. 32A), a non-removal event (FIG. 32B), or a product-stocking event (FIG. 32C). The combination of the sensors 3202 and 3204 with the label holder rotation sensor device 2902 can help predict these events. Specifically referring to FIG. 32A, which shows a product removal event, the sensors 3202 and 3204 can sense product therebetween as the label holder 2712 is rotated from the closed position to the opened position. Additionally, as shown in FIG. 32B, although the output of the label holder rotation sensor device 2902 indicates that the label holder 2712 has been rotated because the output of the sensors 3202 and 3204 show no product therebetween, the system can log this event as a non-removal or false alarm event. Finally with respect to FIG. 32C, the combination of the label holder rotation sensor device 2902 and the sensors 3202 and 3204 can predict a product restocking event where product is added to the display management system 2700.

Figure 33:
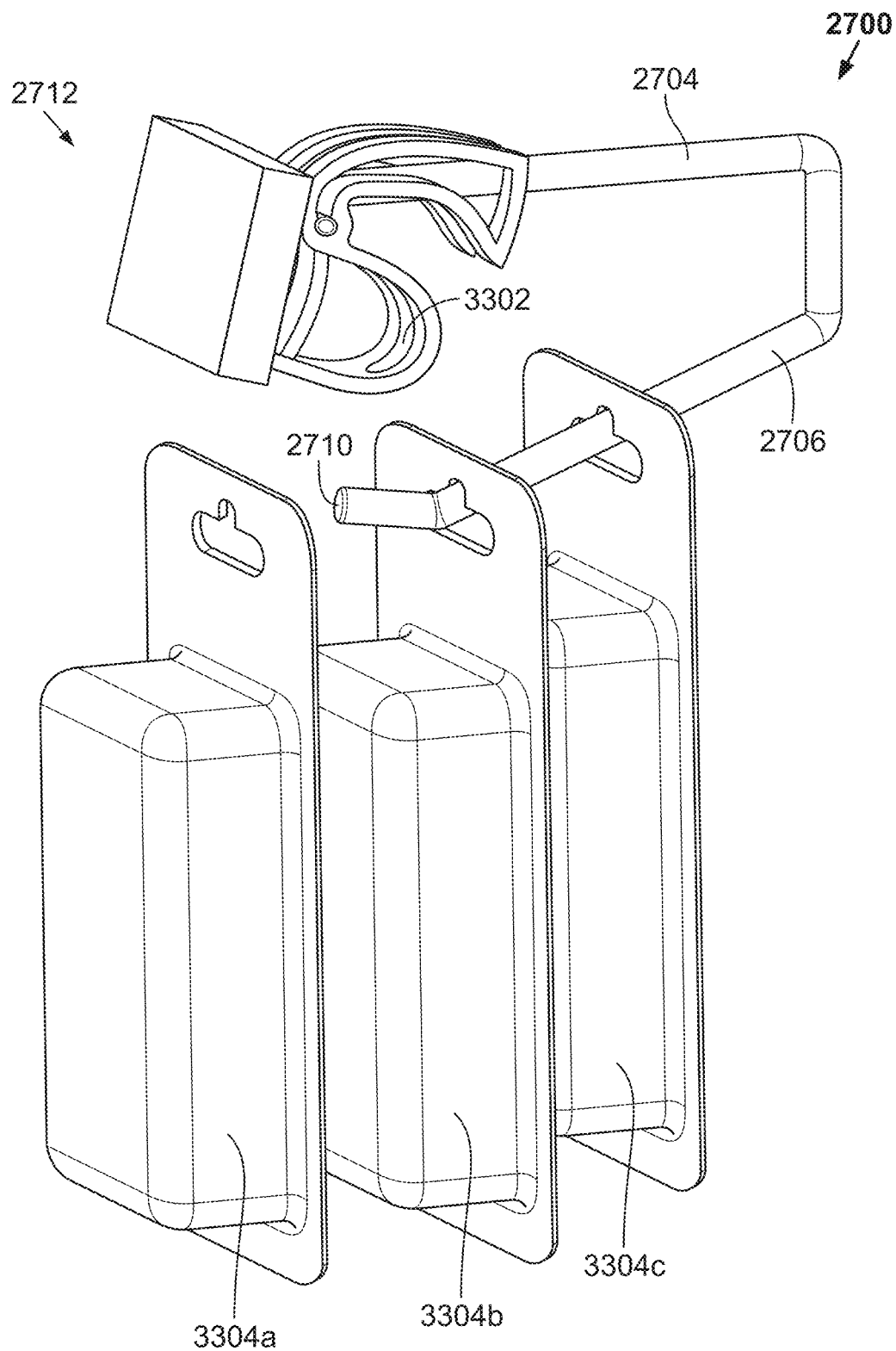
FIG. 33 schematically depicts another view of the display management system of FIG. 27, according to one or more aspects described herein.

FIG. 33 schematically depicts another view of the display management system 2700 of FIG. 27. In particular, FIG. 33 depicts the display management system 2700 with the lower rail 2706 bent such that one or more products 3304a-c may be removed from the display management system 2700 without the label holder 2712 pivoting from a closed position to an open position for each product being removed. However, in one implementation, the label holder 2712 may comprise an opening 3302 configured to receive the second end 2710 of the lower rail 2706 when the label holder 2712 is in a closed position, as schematically depicted FIG. 33. Accordingly, the opening 3302 may prevent the lower rail 2706 from being bent into the position schematically depicted in FIG. 33 without moving the label holder 2712. Accordingly, for those label holders 2712 comprising the label holder rotation sensor device 2902, as described in relation to FIGS. 29-31, motion of the label holder 2712, or a lack of contact between the label holder 2712 and one or more of the second end 2710 of the lower rail 2706 and/or the second end 2714 of the upper rail 2704 may be detected by the label holder rotation sensor device 2902. In turn, the label holder rotation sensor device 2902 may execute one or more processes to identify a potential attempted theft of products from the display management system 2700. In addition, FIG. 33 illustrates another potential theft situation. The bending of the lower rail 2706 may also cause the label holder 2712 to rotate upwardly. As discussed above, the label holder rotation sensor device 2902 can detect the rotation of the label holder 2712, which may also trigger one or more processes to indicate that a potential attempted theft of products is occurring.

Figure 34:
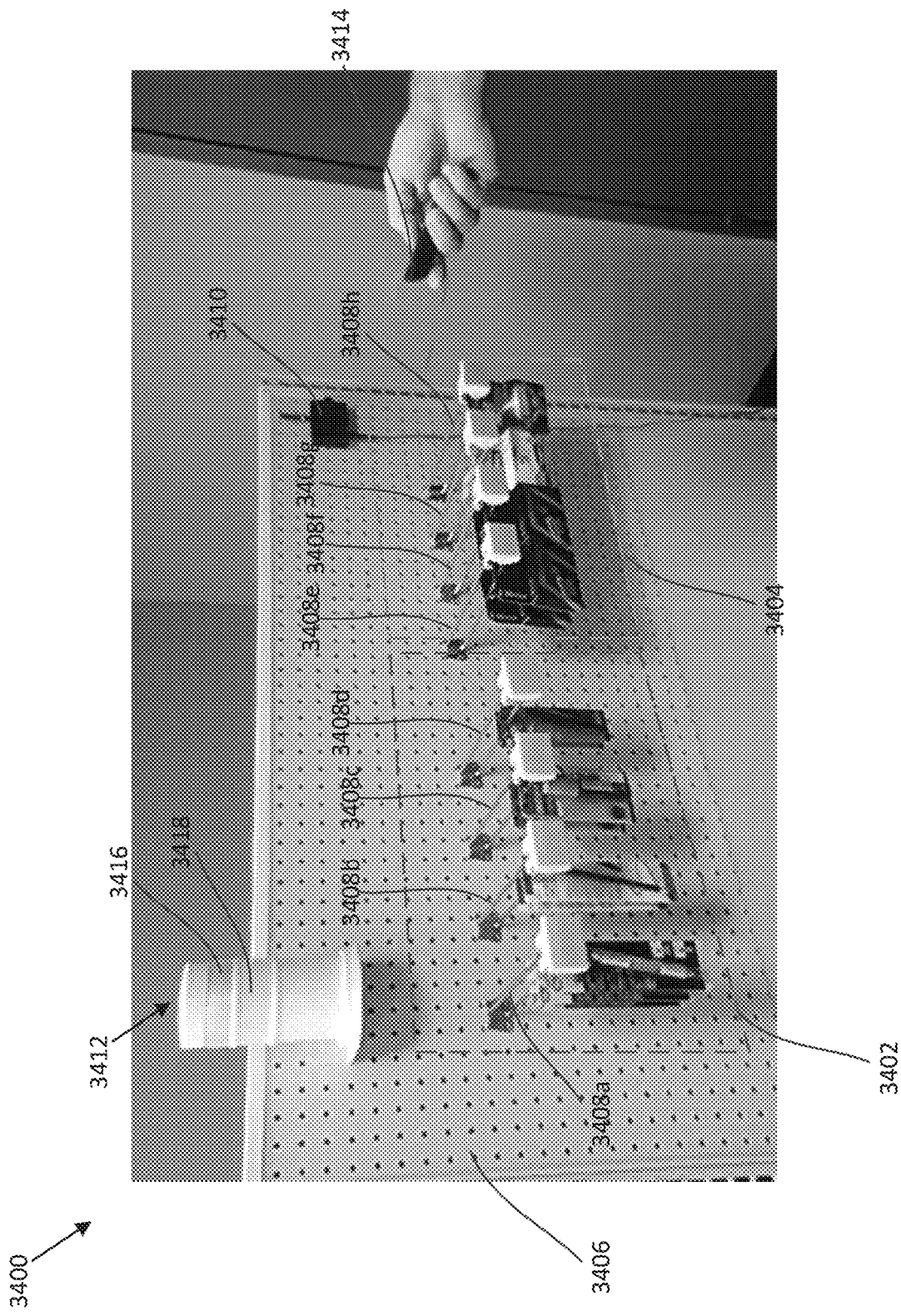
FIG. 34 depicts another implementation of a display management system, according to one or more aspects described herein.

FIG. 34 depicts another implementation of a display management system 2130, according to one or more aspects described herein. In one example, FIG. 34 schematically depicts two product sections 3402 and 3404. As such, a product section may correspond to a grouping of products in a same or related product category, and/or products displayed together in a same display area. In the example of FIG. 34, product section 3402 is a cosmetics section, and product section 3404 is a shaving section. It is contemplated that the display management system 3400 may be used to track and manage multiple product sections in addition to those two product sections 3402 and 3404 (e.g. 10 product sections, 50 product sections, 100 product sections, 500 product sections, 1000 product sections or more), and associate each product section with a different geographic area and/or product type within a store.

In one example, the display management system 3400 may be used in combination with a peg board 3406. However, it is contemplated that additional or alternative display hardware may be used, such as a wire grid, grid wall panels, a slat wall, or shelf surface, among others. As depicted, the example products are displayed to a user (e.g. a shopper or store employee) while hanging below peg hook structures 3408a-3408h. In one example, each of the peg hook structures 3408a-3408h may be similar to one or more of display management system 2700, display management system 3000, display management system 3100, and/or display management system 3200. As such, each of the peg hook structures 3408a-3408h may include a label holder rotation sensor device similar to device 2902.

Additionally, the display management system 3400 may include a control module 3410, which may otherwise be referred to as a router 3410. In one example, the control module 3410 may be similar to control module 940, control module 1040, control module 1140, and/or control module 1240. In one implementation, the control module 3410 may include a wired power supply and a processor that executes instructions received from a remote computer device, or stored in on-board memory. The control module 3410 may be configured to communicate with the peg hook structures 3408a-3408h, an annunciator device 3412, and a user interface controller 3414 As such, the peg hook structures 3408a-3408h, the annunciator device 3412, and the user interface controller 3414 may each communicate with the control module 3410 using one or more wireless, digital or analog communication protocols or methodologies, such as Bluetooth, Bluetooth Low Energy (BLE), Wi-Fi, a cellular network, ZigBee, Z-Wave, 6LoWPAN, Thread, WiFi-ah, NFC, NB-IoT, EnOcean, Dash7, WireslessHART, infra-red, and RFID, among others.

In one implementation, the control module 3410 may be used to receive sensor information and determine if a security event, such as an attempted theft of products from a display system, is taking place within a store. In one example, the control module 3410 may determine if a security event, such as an attempted theft, is occurring based on a frequency at which one or more products are being removed from a display, such as display management system 3400. The control module 3400 may be configured to communicate with and receive sensor data from a label holder rotation sensor device 2902 that is coupled to one or more of the peg hook structures 3408a-3408h. It is further contemplated that the control module 3410 may be configured to wirelessly communicate, or communicate using a wired channel with and receive sensor data from sensor 2130 that may be coupled to a spiral peg hook security device 2301, or door or flip window 2124. Additionally or alternatively, the control module 1040 may be configured to receive data, by wireless or wired communication channels, from any of the sensors described throughout these disclosures, such as sensors 30, 50, 130, 150, 230, 250, 936, 1822, 2004, 2130, 2902, 3002, 3102, 3104, 3202, and/or 3204.

In one example, each of the label holder rotation sensor devices (e.g., device 2902) associated with each of the peg hook structures 3408a-3408h may be configured to function in a low-energy state when stationary for a predetermined timeout duration. A label holder rotation sensor device is configured to transition from a low-energy state to a high-energy state when motion is detected. When in the low-energy state, a label holder rotation sensor device may consume a comparatively reduced amount of energy from an integrated battery, and when in the high-energy state, the label holder rotation sensor device is configured to process the data generated by a sensor as a result of motion of the label holder rotation sensor device, and communicate a signal to the control module 3410.

The annunciator device 3412 may include a light output device 3416 and/or a speaker device 3418. The light output device 3416 may be configured to generate and output a visible alert. It is contemplated that this visible alert may include one or more different colors and a persistent or intermittent illumination of a light source. It is further contemplated that the intermittent illumination of the light source may include any pattern of illumination, and the light source may include any light source technology, including one or more LEDs, among others. Further, it is contemplated that the speaker device 3418 may output an audible signal of any type (e.g. a siren, a persistent or intermittent tone, a musical sequence, one or more messages in a spoken language, among others), additionally, the audible signal from the speaker device 3418 may be outputted at any volume, and the volume may be adjusted during or between audible signal outputs. Similar to the peg hook structures 3408a-3408h, the annunciator device 3412 may be configured to transition between a low-energy state when not in use, to a high-energy state upon receipt of a specific data type from the control module 3410. In one example, the annunciator device 3412 may be powered by an integrated battery.

The user interface controller 3414 may include a remote control device for receiving user input control commands. It is contemplated that the controller 3414 may have any number of user interface controls, and use any interface technology, including one or more buttons, touch screens, or switches, among others. In one example, the user interface controller 3414 may include a smartphone device, a tablet device, a laptop, or a personal computer, among others. Additionally or alternatively, control module 3410 of the display management system 3400 maybe configured to receive voice control commands from a user, among others.

Figure 35:
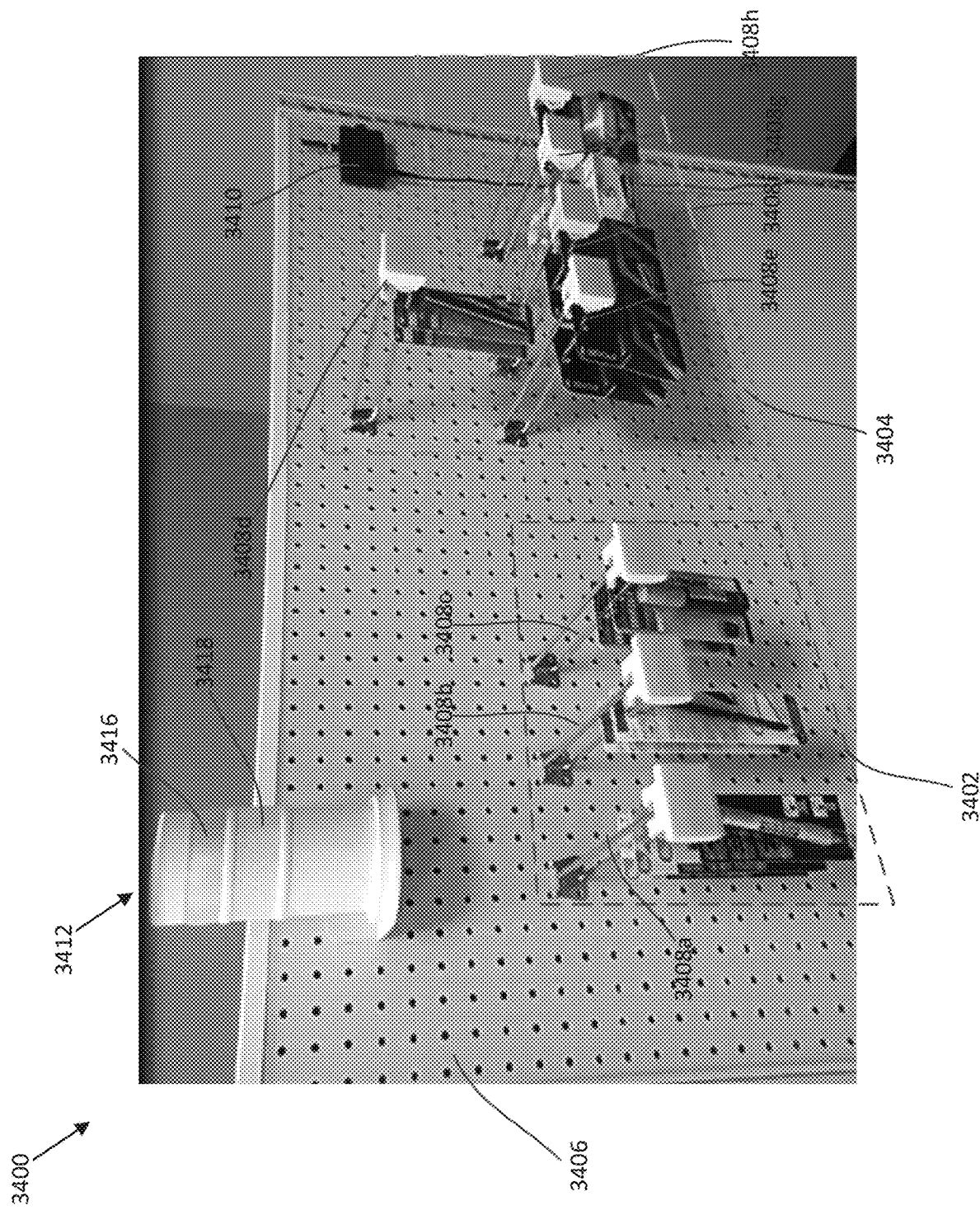
FIG. 35 depicts the display management system of FIG. 34 following the repositioning, and associated pairing of a peg hook structure into a different product section, according to one or more aspects described herein.

In one example, each peg hook structure, from the peg hook structures 3408a-3408h may be saved into memory of the control module 3410, or another computer device that is wired or wirelessly connected to the control module 3410. Further, each peg hook structure may be associated in memory with a product section in a store. The association of the peg hook structure with a product section may be detected by a sensor within a label holder rotation sensor device (e.g. detected by a location sensor, an RFID sensor, among others). Additionally or alternatively, the association of peg hook structure with a product section may be user-inputted using the user interface controller 3414. FIG. 35 depicts the display management system 3400 following the repositioning, and associated pairing of peg hook structure 3408d into product section 3404. In this example, the repositioning and pairing of the peg hook structure 3408d corresponds to peg hook structure 3408d being moved from product section 3402 to product section 3404. This pairing functionality is described in further detail in the following sections of this disclosure.

Figure 36:
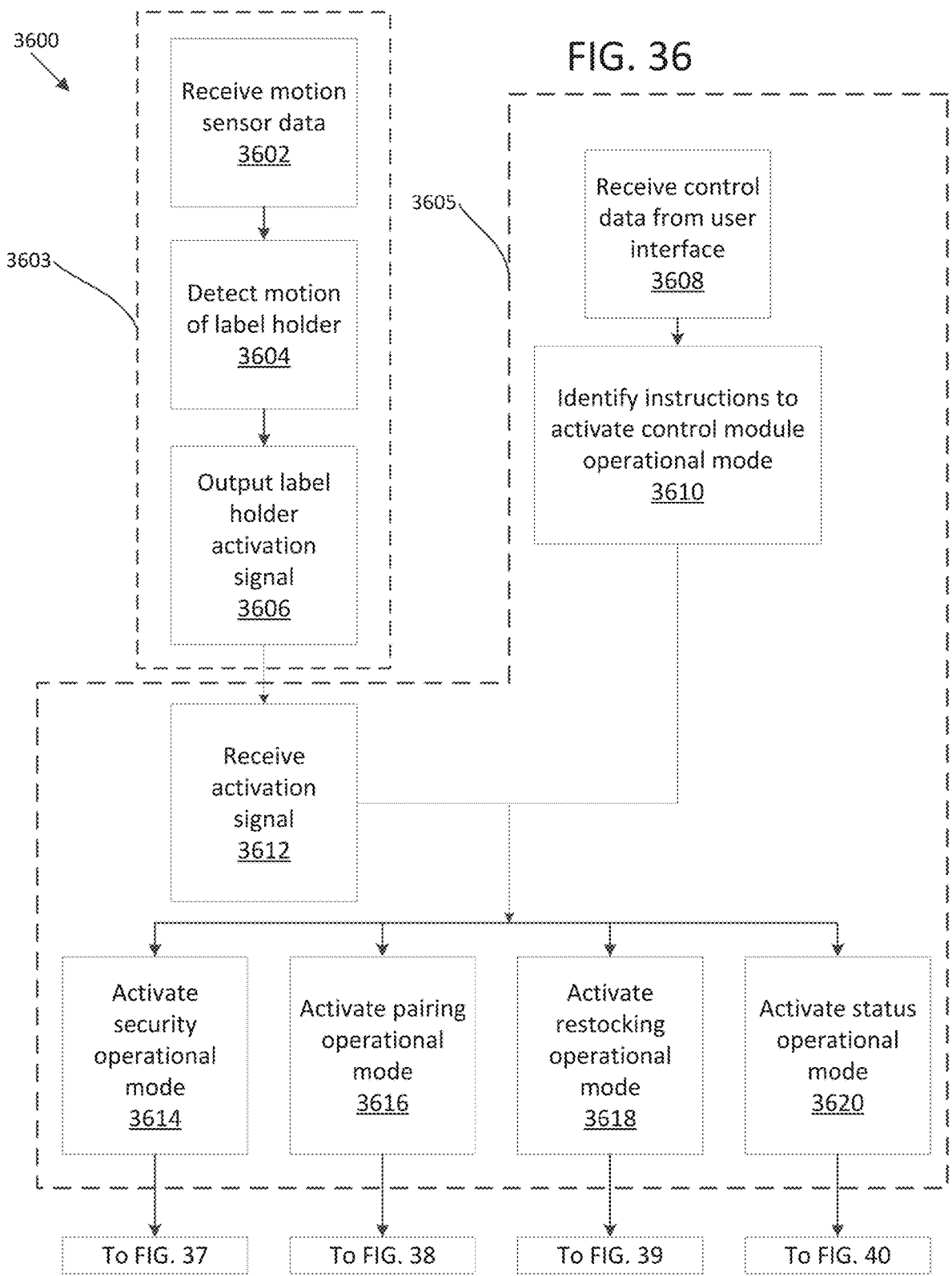
FIG. 36 depicts a flowchart diagram of a process that may be executed by the display management system of FIG. 34, according to one or more aspects described herein.

FIG. 36 depicts a flowchart diagram of a process 3600 that may be executed by the display management system 3400, according to one or more aspects described herein. In one example, the elements depicted within region 3603 may be executed by a processor of a peg hook structure, such as peg hook structures 3408a-3408h. In turn, the elements depicted within region 3605 may be executed by a processor of the control module 3410. It is contemplated that the data communication described in the following may use any combination of data communication protocols, hardware and/or firmware.

In one example, motion sensor data may be received from a sensor of a peg hook structure, such as a label holder rotation sensor 2902. The received motion data may be indicative of a motion of a label holder 2712. In one example, the one or more processes executed to receive motion sensor data may be executed at block 3602 of flowchart 3600.

The motion data received at block 3602 may be processed to determine if it is a motion that corresponds to a product being removed from (or added to) a lower rail 2706 of a display management system 2700, 3000, 3100, and/or 3200. Accordingly, one or more processes may be executed at block 3604 in order to analyze the received motion sensor data. This analysis may include comparing the received motion sensor data to one or more threshold values (e.g., orientation angle, duration of motion, speed of motion threshold values, among others) above which the motion data is determined to correspond to a product being removed from (or added to) a lower rail 2706.

If the received motion data is determined to correspond to a product being removed from a display management system, one or more processes may be executed to output a label holder activation signal. This label holder activation signal may include an indication that a motion sensor has been activated, and a unique identifier associated with the sensor and a given display management system (e.g., display management system 2700, 3000, 3100, and/or 3200). These one or more processes to output a label holder activation signal may be executed at block 3606. The control module 3410 may, in turn, execute one or more processes to receive the label holder activation signal at block 3612.

In one example, control data may be received from a user interface. The user interface may include the user interface controller 3414, which may be a handheld remote or smart phone device, a tablet, a laptop, or a personal computer, among others. One or more processes to receive the control data may be executed at block 3608.

The received control data may include instructions to activate a control module operational mode. From the received control data, one or more instructions to activate a control module operational mode may be identified. One or more processes executed to identify the control module operational mode may be executed at block 3610. In one implementation, the control module operational modes may include: a security operational mode, which may be activated at block 3614, a pairing operational mode, which may be activated at block 3616, a restocking operational mode, which may be activated at block 3618, and a status operational mode, which may be activated at 3620.

Figure 37:
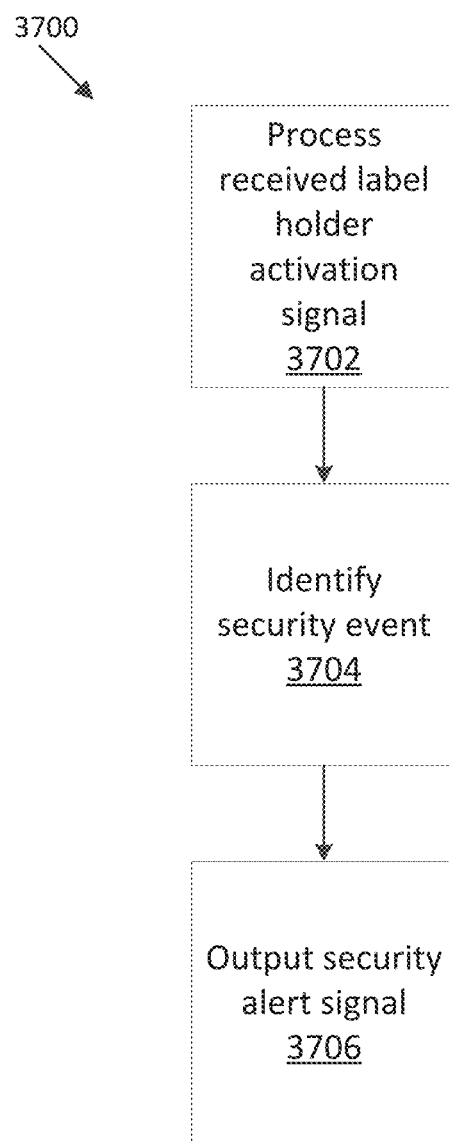
FIG. 37 is a flowchart diagram of a security operational mode of a control module, according to one or more aspects described herein.

FIG. 37 is a flowchart diagram 3700 of a security operational mode of the control module 3410, according to one or more aspects described herein. In one example, a label holder activation signal may be received and processed by the control module 3410 while operating within a security operational mode. These one or more processes may be executed at block 3702 of flowchart 3700. The control module 3410 may determine a number of discrete label holder activations that have been received within a timeout period, and from a same product section. It is contemplated that any timeout period may be used. In another example, the control module 3410 may combine label holder activation signals from multiple different product sections within a store. These one or more processes may be executed at block 3702.

The control module 3410 may identify a security event from the received label holder activation signal. The security event may be identified based upon a threshold number of label holder activations received within a timeout period, or an anomalous signal received from a label holder, which may correspond to a label holder 2712 being held in an open position for a prolonged, and predetermined period of time, among others. One or more processes to identify the security event may be executed at block 3704. In response, the control module 3410 may output a security alert signal. This security alert signal may be, in one example, communicated to the annunciator device 3402 and/or a remote computer device, such as the user interface controller 3414.

Figure 38:
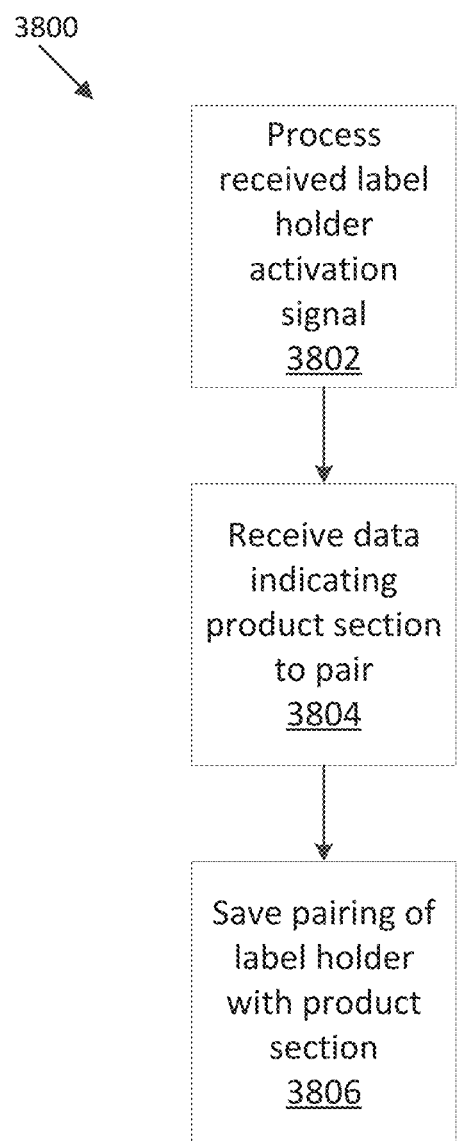
FIG. 38 is a flowchart diagram of a pairing operational mode of a control module, according to one or more aspects described herein.

FIG. 38 depicts a flowchart diagram 3800 of a pairing operational mode of the display management system 3400, according to one or more aspects described herein. In one example, a label holder activation signal may be received and processed by the control module 3410 while operating within a pairing operational mode. This label holder activation signal may be used to identify a specific peg hook structure (e.g., from peg hook structures 3408a-3408h) to be paired. These one or more processes may be executed at block 3802 of flowchart 3800. Additional data may be received from a user interface controller 3414. This additional data may include an indication of a product section with which to pair the identified specific peg hook structure (e.g., the identified specific peg hook structure is to be paired with a cosmetics product section). One or more processes may be executed to receive this data indicating a product section to pair at block 3804. The control module 3410 may, in response to receipt of an indication of a specific peg hook structure to be paired with a specific product section, save into memory an association of the specific peg hook structure with the specific product section at block 3806.

Figure 39:
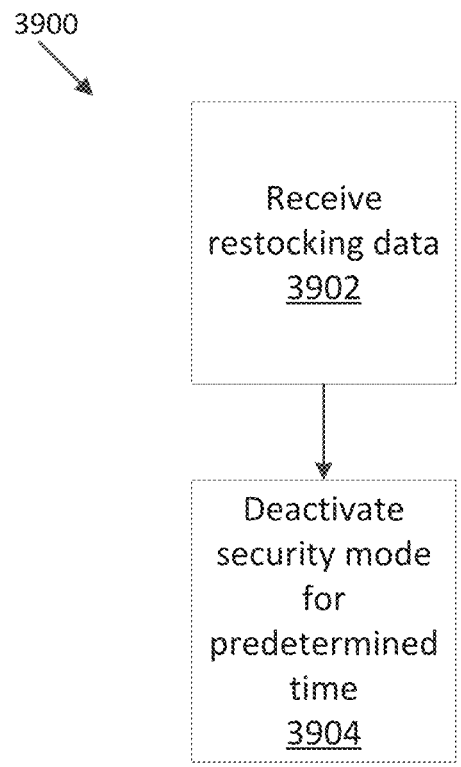
FIG. 39 is a flowchart diagram of a restocking operational mode of a control module, according to one or more aspects described herein.

FIG. 39 depicts a flowchart diagram 3900 of a restocking operational mode of the display management system 3400, according to one or more aspects described herein. In one example, restocking data may be received from a user. In particular, this restocking data may be received from the user interface controller 3414 and/or a remote computer device. In one example, the restocking data may include an identification of a product section, or one or more specific peg hook structures to be restocked. Additionally, the restocking data may identify a timeout period during which the identified product section and/or specific peg hook structures may be restocked without triggering a security alert signal. It is contemplated that any timeout period may be utilized, without departing from the scope of these disclosures One or more processes may be executed by the control module 3410 to receive the restocking data at block 3902. In response, the control module 3410 may deactivate a security mode for the identified timeout period at block 3904.

Figure 40:
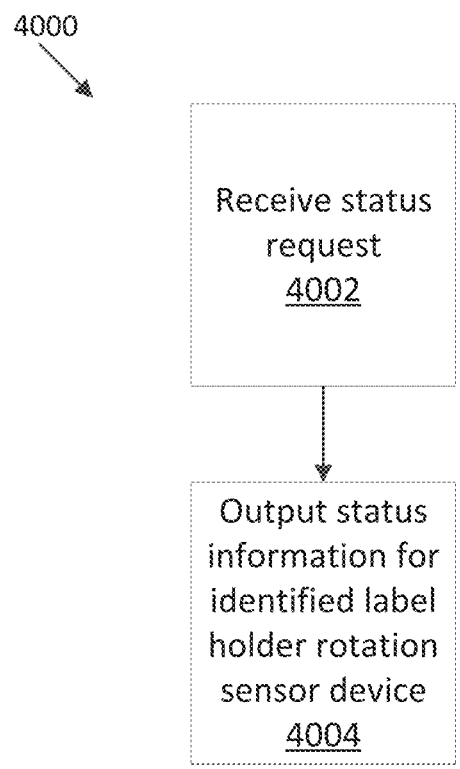
FIG. 40 is a flowchart diagram of a status operational mode of a control module, according to one or more aspects described herein.

FIG. 40 depicts a flowchart diagram 4000 of a status operational mode of the display management system 3400, according to one or more aspects described herein. In one example, a request for status information of a product section, or one or more specific peg hook structures, may be received by the control module 3410 from the user interface controller 3414 and/or a remote computer device. The control module 3410 may identify the product section, and/or the one or more specific peg hook structures based upon the sensor activation signal received at block 3612. The control module 3410 may receive the status request at block 4002, and output status information for the identified product section and/or the one or more specific peg hook structures at block 4004. The status information may include one or more battery charge levels of one or more label holder rotation sensor devices associated with the peg hook structures, and/or a number of activations of label holder rotation sensor devices within a product section, or of a single peg hook structure, among others.

Figure 41:
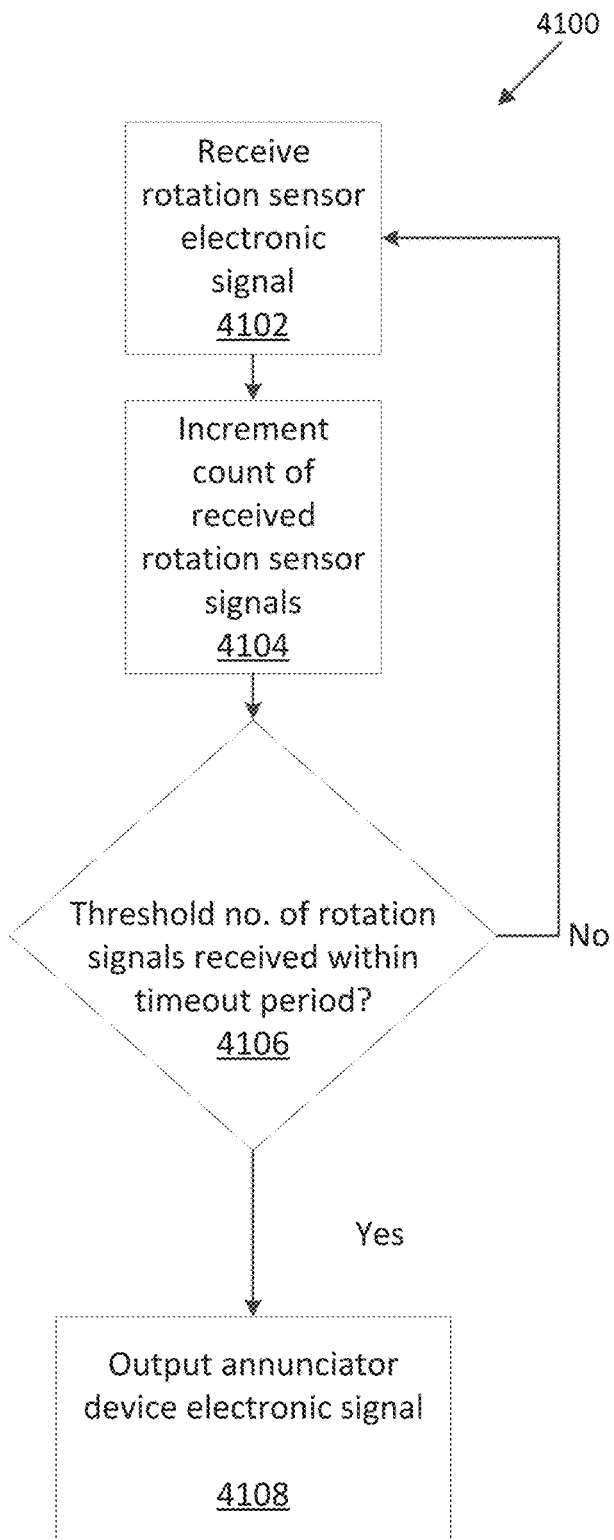
FIG. 41 depicts a flowchart diagram of another process that may be executed by the display management system of FIG. 34, according to one or more aspects described herein.

FIG. 41 depicts a flowchart diagram of a process 4100 that may be executed by the display management system 3400, according to one or more aspects described herein. In one example, the control module 3410 may include a non-transitory computer-readable medium that stores computer-executable instructions that may be executed by a processor to receive a rotation sensor electronic signal. This rotation sensor electronic signal may be generated by a label holder rotation sensor device of one or more peghook structures 3408a-3408h. Further, the rotation sensor electronic signal may be generated in response to a motion of a label holder, such as label holder 2712. Additionally or alternatively, the process 4100 may be executed by display management system 3400 using data received by the control module 3410 from additional sensors, such as sensor 2130 that may be coupled to a spiral peg hook security device 2301, or door or flip window 2124. Additionally or alternatively, the control module 3410 may be configured to execute process 4100 using data, received by wireless or wired communication channels, from any of the sensors described throughout these disclosures, such as sensors 30, 50, 130, 150, 230, 250, 936, 1822, 2004, 2130, 2902, 3002, 3102, 3104, 3202, and/or 3204.

In one example, a rotation sensor electronic signal may be generated in response to a threshold amount of motion of a label holder, and it is contemplated that any threshold amount of motion of the label holder may be used, without departing from the scope of these disclosures. In one example, the rotation sensor electronic signal may be communicated from a wireless or wired communication interface of the label holder rotation sensor device, and received by a wireless or wired communication interface of the control module 3410. In one example, one or more processes executed by the control module 3410 to receive the rotation sensor electronic signal may be executed at block 4102.

Upon receipt of the rotation sensor electronic signal, the control module 3410 may increment a counter stored in memory. This counter may be implemented using any known methodology, and may include a software, a firmware, and/or a hardware counter, or combinations thereof. In one example, the counter may be configured to reset to a null or zero count upon expiration of a threshold timeout period. It is contemplated that this threshold timeout period may be configured with any value, and may be adjustable by a user in software, firmware or hardware, or a combination thereof. In one example, one or more processes may be executed by the control module 3410 to increment the counter upon receipt of the rotation sensor electronic signal at block 4104 of flowchart 4100.

The control module 3410 may, upon receipt of the rotation sensor electronic signal, determine if the counter has reached a threshold value corresponding to a threshold number of rotations signals received within the timeout period. In one implementation, the threshold value may be determined to correspond to, among others, an attempted theft of one or more products from a display management system within a store. In another example, the threshold value may be determined to correspond to a user who is having difficulties removing one or more products from a display management system, and who may be in need of assistance from an employee within a store. These one or more processes to check if the counter has reached the threshold value may be executed at decision block 4106.

If the control module 3410 determines that a threshold number of rotation signals have been received within a timeout period, the control module 3410 may execute one or more processes to output an annunciator device electronic signal. This annunciator device electronic signal may include one or more instructions that are received by the annunciator device 3412. In response to receipt of the annunciator device electronic signal, the annunciator device 3412 may output one or more audible or visible signals that may include, among others, a siren, a tone, a sequence of musical notes, a sequence of flashing lights, a spoken language security announcement, or a spoken language announcement that assistance is needed for a customer at a specific location within a store, or combinations thereof. The one or more processes executed by the control module 3410 to output the annunciator device electronic signal may be executed at block 4108. Additionally or alternatively, if the control module 3410 determines that a threshold number of rotation signals have been received within a timeout period, the control module 3410 may communicate a signal to a remote device without indicating to a user who has caused the label holder to move that a threshold number of rotation signals have been received. In one example, the remote device may be associated with, among others, security personnel and/or management of a store.

Figure 42:
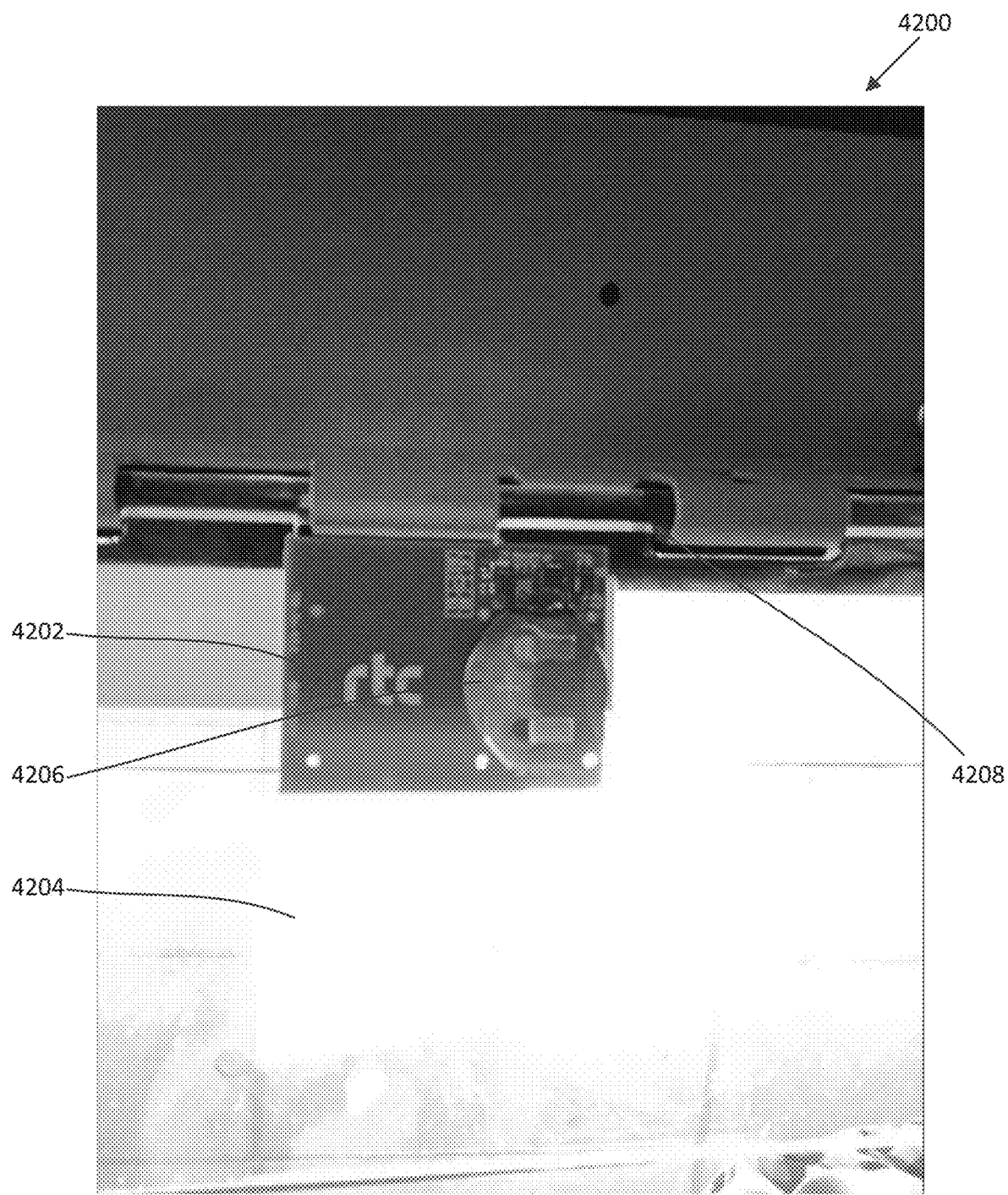
FIG. 42 depicts an implementation of a display management system, according to one or more aspects described herein.

FIG. 42 depicts an implementation of a display management system 4200, according to one or more aspects described herein. The display management system 4200 may include a sensor device 4202 that is coupled to a flip window 4204. As such, the sensor device may otherwise be referred to as a window sensor device. The flip window 4204, which may otherwise be referred to as a security window 4204, may be partially or wholly transparent, and used to display one or more products within the display management system 4200. As such, the flip window 4202 may form a portion of one or more of the display management systems described throughout this disclosure. In one example, the sensor device 4202 may be similar to device 2130 depicted in FIG. 21A as being coupled to the flip window 2124.

The sensor device 4202 may be configured to detect motion of the flip window 4204. For example, the sensor device 4202 may detect when a user rotates the flip window 4204 about the hinge 4208. In one example, the sensor device 4202 may output a sensor activation signal or motion signal for any motion of an element to which it is coupled. In another example, the sensor device 4202 may output a sensor activation signal or motion signal when motion of an element to which it is coupled is above one or more fixed of user-definable motion thresholds. Further, the sensor device 4202 may be configured to communicate information to a remote device using one or more wireless communication channels. In one example, the sensor device 4202 may be configured to communicate with the control module 3410, as previously described. As such, the sensor device 4202 may be used in combination with the display management system 3400, as previously described. Accordingly, the sensor device 4202 may be utilized in one or more of the processes described in relation to FIGS. 36-41.

The sensor device 4202 may comprise a circuit board that integrates an accelerometer (single axis, two axis, or three axis accelerometer), a gyroscope, a light sensor (including an infra-red sensor and/or a sensor of light in the visible spectrum), a capacitive sensor, and/or a mechanical switch. Additionally, the sensor device 4202 may include any analog and/or digital circuitry used to facilitate the functionality of the one or more integrated sensors. The sensor device 4202 may include a power source. This power source may be in the form of a cell or battery 4206. Additionally or alternatively, the sensor device 4202 may include an energy harvesting device configured to convert kinetic energy from the motion of the flip window 4204 into electrical energy that may be stored in the battery 4206 and/or used to power the one or more electronic elements of the sensor device 4202. This energy harvesting device may be in the form of a dynamo that is implemented with any known electromechanical design, without departing from the scope of these disclosures. Additionally or alternatively, the sensor device 4202 may include one or more photovoltaic cells configured to convert light energy into electrical energy may be stored within the battery 4206 and/or used to power the one or more electronic elements of the sensor device 4202.

The sensor device 4202 may additionally include a transmitter or transceiver, hereinafter referred to as a transceiver, configured to facilitate one-way or two-way communication from, or from and to, the sensor device 4202. The transceiver may include any adapter hardware, firmware and/or software for communication using any wireless communication protocol, such as BLUETOOTH, BLUETOOTH LOW ENERGY (BLE), WI-FI, A CELLULAR NETWORK, ZIGBEE, Z-WAVE, 6LOWPAN, THREAD, WIFI-AH, NFC, NB-IOT, ENOCEAN, DASH7, WIRESLESSHART, INFRA-RED, AND RFID.

The sensor device 4202 may be coupled to the flip window 4204 by any mechanical coupling element, which may include, among others, an adhesive, a screw, a bolt, a rivet, a staple, a hook and loop fastener. Additionally or alternatively, the sensor device 4202 may be positioned within a slot or cutout of the flip window 4204 and may be loosely held within said slot or cutout, or held by way of an interference fit.

In another example, the sensor device 4202 may be coupled to a stationary portion of the display management system 4200, and the sensor device may detect products removed from or added to the display management system 4200 as a result of vibrations being propagated through one or more mechanical elements of the display management system 4200 to the sensor device 4202.

In one implementation, the sensor device 4202 may include firmware and/or processes stored within a non-transitory computer-readable medium (that may be any form of volatile memory, or any persistent form of memory). This firmware and/or processes may facilitate functionality to: filter, compress, interpolate or otherwise process data outputted from a sensor of the sensor device 4202, and/or identify patterns within sensor data received from the sensor of sensor device 4202. Additionally, the firmware and/or processes stored with in a non-transitory computer-readable medium may be used to communicate with a remote device through the transceiver.

In one example, the sensor device 4202 may be used in combination with any of the security systems, and attached to any of the movable window or other elements described in U.S. application Ser. No. 14/046,385, filed 4 Oct. 2013, now U.S. Pat. No. 9,167,913, the entire contents of which are incorporated herein by reference for any and all non-limiting purposes.

Figure 43:
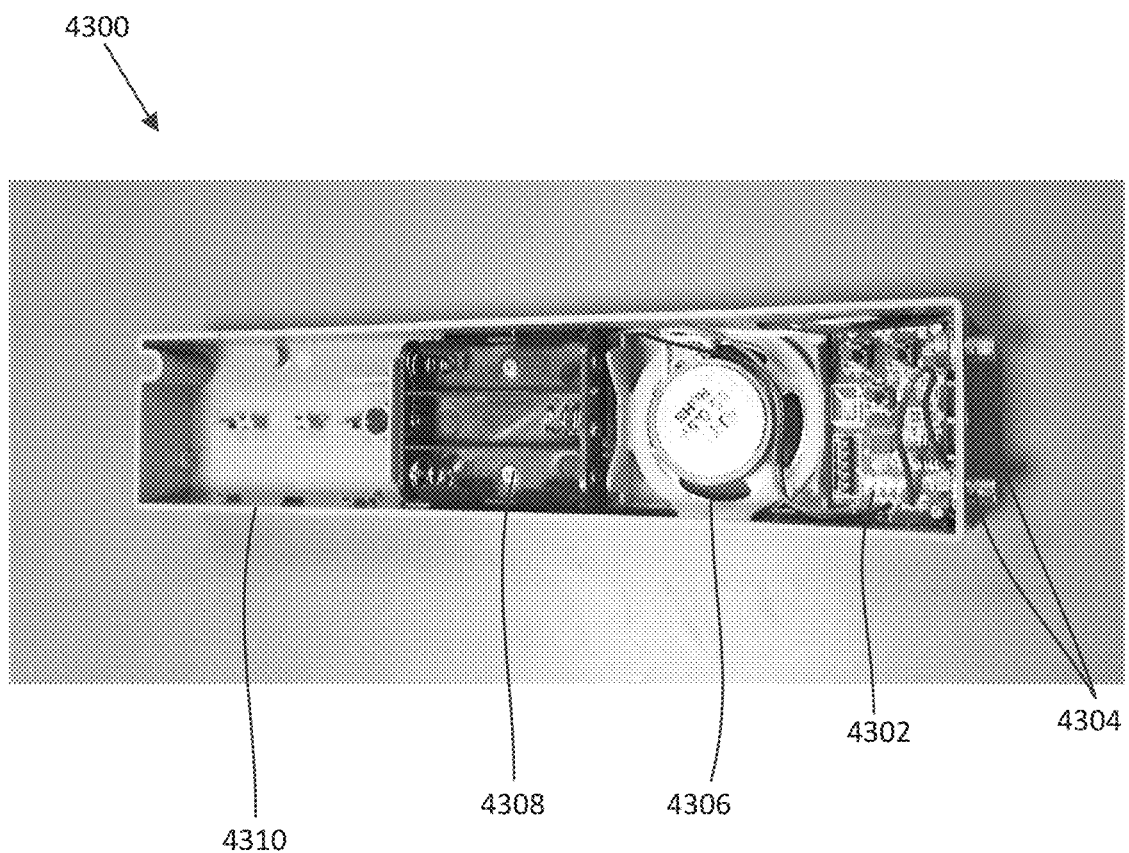
FIG. 43 depicts an example annunciator device, according to one or more aspects described herein.

FIG. 43 depicts an example annunciator device 4300, according to one or more aspects described herein. In one example, the annunciator device 4300 may be similar to device 1060 described in relation to FIG. 15A. In one implementation, the annunciator device 4300 may include circuit board 4302 that includes one or more sub-components configured to receive and process sensor information received through the terminals, or docketing contacts 4304. The docking contacts 4304 may be configured to communicate with one or more external devices, such as one or more mechanical switches. These mechanical switches, in turn, may be positioned on one or more of the inventory or display management systems described throughout this disclosure, whereby a switch may be activated as a user removes or adds one or more products from or to a display system. As such, it is contemplated that any mechanical switch implementation may be used in combination with the annunciator device 4300 to connect through terminals 4304. The circuit board 4302 may include one or more user interfaces, such as push buttons, switches, and/or a screen. Additionally, the circuit board 4302 may include one or more logic chips and/or microprocessors configured to output one or more audible signals to the speaker device 4306. The audible signals may include one or more tones, alarms, or spoken language messages. Further, the conditions under which the one or more audible signals may be outputted may be adjustable, by using an external device to program one or more logic elements of the circuit board 4302. The circuit board 4302 and speaker device 4306 may be powered by one or more batteries, which may be held within battery retainer 4308. The circuit board 4302, speaker device 4306 and battery retainer 4308 may be encased within a protective shell 4310, which may include one or more removable covering elements that are not depicted in FIG. 43.

Figure 44:
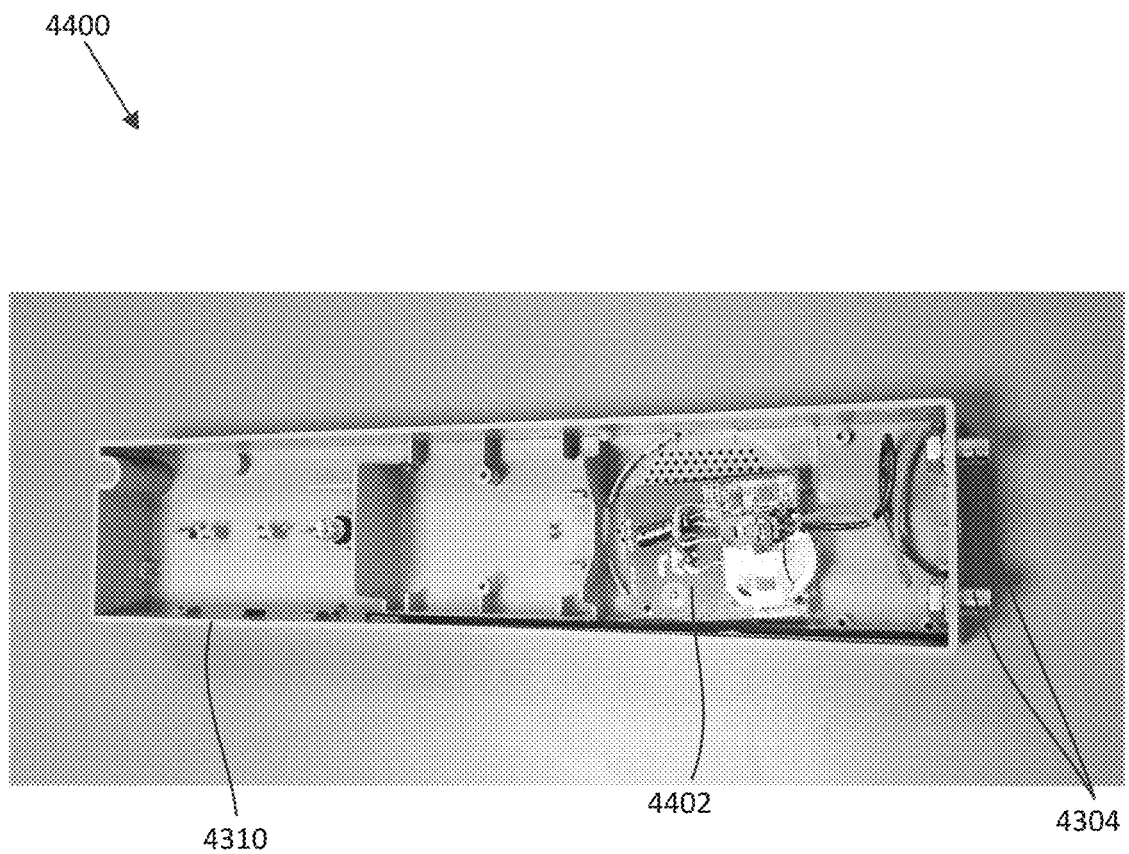
FIG. 44 depicts a retrofitted annunciator device, according to one or more aspects described herein.

FIG. 44 depicts a retrofitted annunciator device 4400, according to one or more aspects described herein. FIG. 44 depicts an implementation of a communication device 4402 that may be retrofitted into the protective shell 4310 such that activation signals from external sensors (e.g. one or more wired mechanical switches or motion sensing devices) may be received through existing connection hardware terminals 4304, and communicated wirelessly to a remote device. In one example, the retrofitted annunciator device 4400 may receive sensor signals from one or more mechanical/electromechanical switches and/or other types of sensors described throughout this disclosure and connected to a flip window of a display management system, similar to display window/flip window 2124, and display window/flip window 4204. Additionally or alternatively, the retrofitted annunciator device 4400 may receive sensor signals from one or more mechanical/electromechanical switches and/or other types of sensors described throughout this disclosure and coupled to alternative structures of a display management system.

The communication device 4402 may be used in combination with the display management system 3400, as previously described. Accordingly, the communication device 4402 may be utilized in one or more of the processes described in relation to FIGS. 36-41.

The communication device 4402 may include elements similar to control sensor 2130, system controller device 2400, and/or communication device 4402, as previously described. In one example, the communication device 4402 may include a power source, such as a battery, an energy harvesting device, and/or one or more photovoltaic cells. The communication device 4402 may additionally include one or more logic circuits and/or microprocessors configured to receive, process and/or interpret sensor data received through terminals 4304. It is contemplated that any sensor data processes may be implemented by the communication device 4402, including, among others, filtering, interpolating, compressing, identifying one or more patterns within sensor data, and/or storage of multiple sensor activations. The communication device 4402 may additionally include a wireless transmitter or transceiver, which is hereinafter referred to as a transceiver. This wireless transceiver may include hardware, such as one or more antennae, and supporting firmware and software configured to communicate using any wireless communication channel and/or protocol. In one example, the communication device 4402 may communicate using one or more of BLUETOOTH, BLUETOOTH LOW ENERGY (BLE), WI-FI, A CELLULAR NETWORK, ZIGBEE, Z-WAVE, 6LOWPAN, THREAD, WIFI-AH, NFC, NB-IOT, ENOCEAN, DASH7, WIRELESSHART, INFRA-RED, AND RFID. Additionally, the communication device may be configured to connect to a control module, similar to control module 3410, such that sensor hardware already installed within a display management system using a wired connection to terminals 4304 may be upgraded to having a wireless connection to control module 3410.

In one aspect, a display management system may include a support structure with an upper rail connected to a lower rail at a first, or proximal end. The support structure may be configured to be removably coupled to a surface at the first end, and the lower rail may be configured to support a hanging product that is added to and removed from the lower rail at a second, or distal end. The display management system may have a label holder that is pivotably coupled to a second, or distal end of the upper rail, with the label holder pivoting between a closed position and an open position. The label holder may further have a display plate that has a front surface for receiving a display label, and a back surface. Additionally, the label holder may have an arm structure extending from the back surface of the display plate, with the arm structure having a geometry that prevents more than one product from being removed from, or added to, the lower rail each time the label holder is pivoted from the closed position to the open position. The label holder of the display management system may additionally include a label holder rotation sensor device that is configured to output a rotation sensor electronic signal when the label holder is moved from a closed position to an open position. The display management system may additionally include an annunciator device, and a control module that is connected to the label holder rotation sensor device and the annunciator device. The control module may have a non-transitory computer-readable medium that has computer-executable instructions that are executed by a processor to receive the rotation sensor electronic signal from the label holder rotation sensor device. Further, the control module may be configured to output an annunciator device electronic signal upon receipt of a threshold number of rotation holder electronic signals from the label holder rotation sensor device within a threshold time period. The annunciator device, in turn, may be configured to receive the annunciator device electronic signal, and output an audible or visible signal.

The control module may communicate with the label holder rotation sensor device and the annunciator device using one or more wireless communication channels.

In one example, the control module may include a router device.

In another example, the label holder rotation sensor device may include an accelerometer sensor.

In one aspect, this disclosure includes a display management system having a mechanism that may be configured to move in response to a product being removed from the display management system. The display management system may additionally have a sensor that outputs motion data in response to movement of the mechanism. Further, the display management system may have a control circuit that receives the motion data and communicates the motion data to a remote processor if it exceeds a threshold value. Additionally, the display management system may have a non-transitory computer-readable medium comprising computer-executable instructions that may be executed by the remote processor to calculate the current position of the mechanism from the motion data, and calculate the number of products removed from the display management system based on the position of the mechanism.

In another aspect, this disclosure includes a display management system that may have a mechanism configured to move in response to a product being removed from the display management system. The display management system may further have a sensor that outputs motion data in response to movement of the mechanism. Additionally, the display management system may have a transmitter circuit that transmits the motion data to a remote processor, and a non-transitory computer readable medium comprising computer-executable instructions that may be executed by the remote processor to calculate the current position of the mechanism and calculate a product removal pattern.

In yet another aspect, this disclosure includes a non-transitory computer-readable medium comprising computer-executable instructions that when executed by a processor may be configured to receive sensor data from sensors associated with one or more display management systems. Additionally, the sensor data may be used to calculate a number of products removed from the one or more display management system, and may be used to detect product removal pattern based on the number of products removed from the display management systems.

In another aspect, this disclosure includes a display management system that has a support structure with an upper rail connected to a lower rail, the lower rail configured to support a hanging product. The display management system may have a label holder that is pivotably coupled to one end of the upper rail, with the label holder pivoting between a closed position and an open position. The label holder may further have a display plate that has a front surface for receiving a display label, and a back surface. Additionally, the label holder may have an arm structure extending from the back surface of the display plate, with the arm structure having a geometry that prevents more than one product from being removed from, or added to, the lower rail each time the label holder is pivoted from the closed position to the open position.

In another aspect, this disclosure relates to a display management system that has a support structure with an upper rail coupled to a lower rail, with the lower rail configured to support a hanging product. The display management system may have a label holder that is pivotably coupled to one end of the upper rail, with the label holder pivoting between a closed position and an open position. The label holder may also include a display plate that has a front surface configured to receive a display label, and a back surface. Additionally, the label holder may have a sensor device and a non-transitory computer-readable medium that has computer-executable instructions. When executed by a processor, the computer-executable instructions may receive data from the sensor device, and calculate a product removal pattern from the display management system.

In one aspect, a display management system may include a support structure with an upper rail connected to a lower rail at a first, or proximal end. The support structure may be configured to be removably coupled to a surface at the first end, and the lower rail may be configured to support a hanging product that is added to and removed from the lower rail at a second, or distal end. The display management system may have a label holder that is pivotably coupled to a second, or distal end of the upper rail, with the label holder pivoting between a closed position and an open position. The label holder may further have a display plate that has a front surface for receiving a display label, and a back surface. Additionally, the label holder may have an arm structure extending from the back surface of the display plate, with the arm structure having a geometry that prevents more than one product from being removed from, or added to, the lower rail each time the label holder is pivoted from the closed position to the open position.

The display management system may also include a label holder rotation sensor device in operative communication with a sensor. The label holder rotation sensor device may have a first non-transitory computer-readable medium with computer-executable instructions that are executed by a processor to receive motion data from the sensor, detect from the received motion data, a motion of the label holder, and output a label holder activation signal indicating that the label holder has been moved.

In one example, the display management system may include a control module that has a second non-transitory computer-readable medium with computer-executable instructions that are executed by a processor to receive control data from a user interface controller, and identify from the received control data and instruction to activate a control module operational mode.

The control data received from the user interface controller may include an instruction to operate the control module in a security operational mode. As such, the second non-transitory computer-readable medium may include computer-executable instructions that are executed by a processor to activate the security mode of the display management system. Additionally, the instructions may receive the label holder activation signal from the label holder rotation sensor device may identify, based on the received label holder activation signal, a security event, and output, based on the identified security event, a security alert signal.

The identification of the security event may further include identifying, based on the received label holder activation signal, a threshold number of activation signals received within a predetermined period of time from the label holder rotation sensor device, or from multiple label holder rotation sensor devices within a same product section.

The display management system may additionally include an annunciator device that has at least one of a speaker output device and a light output device. The annunciator device may also include a third non-transitory computer-readable medium that stores computer-executable instructions that are executed by a processor to receive a security alert signal, and output at least one of an audible or visible alert indication.

The control data received from the user interface controller may include an instruction to operate the control module in a pairing operational mode. As such, the second non-transitory computer-readable medium may include computer-executable instructions that are executed by a processor to activate a pairing mode of the display management system, receive a label holder activation signal, receive data from the user interface controller indicating a product section with which to associate the label holder rotation sensor device, and save into memory a record associating the product section and the label holder rotation sensor device.

The control data received from the user interface controller may include an instruction to operate the control module in a restocking operational mode. As such, the second non-transitory computer-readable medium may include computer-executable instructions that are executed by a processor to receive data from a user interface controller indicating a product section and a time delay during which the product section is to be restocked. Additionally, the processor may execute instructions to deactivate a security mode for the product section for a duration of the time delay and ignore the received the label holder activation signal for the duration of the time delay.

The control data received from the user interface controller may include an instruction to operate the control module in a status operational mode. As such, the second non-transitory computer-readable medium may include computer-executable instructions that are executed by a processor to output status data associated with the label holder rotation sensor device. The status data may include a battery charge level and a number of activations of the label holder rotations sensor device.

In one example, the sensor of the display management system may be an accelerometer or a product contact sensor coupled to the arm structure.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that the invention is not to be limited to the embodiments disclosed herein, but is to be understood from the following clauses, which are to be interpreted as broadly as allowed under the law.

What is claimed is:

1. A product management and securement system, comprising:
   a housing;
   a flip window mounted to the housing, wherein:
     the flip window is movable between an open position and a closed position;
     the flip window, when in the closed position, substantially obstructs access to the housing;
   an accelerometer sensor coupled to the flip window for movement with the flip window, the accelerometer sensor configured to generate a signal indicating when the flip window is the open position; and
a notification device configured to:
   obtain the signal; and
   provide a notification that the flip window has been in the open position for a predetermined time period;
wherein the accelerometer sensor is configured to generate a signal indicating that the flip window is in a third position between the closed position and the open position.

2. The product management and securement system of claim 1, wherein the flip window is sufficiently transparent so as to allow a user to see through the flip window and see products in the housing.

3. The product management and securement system of claim 1, wherein the accelerometer sensor is configured to generate a signal indicating that the flip window is in the open position.

4. The product management and securement system of claim 1, wherein the notification device is mounted in proximity to the housing.

5. The product management and securement system of claim 1, wherein the notification device is mounted on a support structure.

6. The product management and securement system of claim 1, wherein the notification comprises an audible notification.

7. The product management and securement system of claim 1, wherein the notification comprises a visual notification.

8. A product management and securement system, comprising:
a housing;
a flip window mounted to the housing, wherein:
   the flip window is movable between an open position and a closed position;
   the flip window, when in the closed position, substantially obstructs access to the housing;
an accelerometer sensor coupled to the flip window for movement with the flip window, the accelerometer sensor configured to:
   generate a signal indicating when the flip window is in the open position; and
   wirelessly transmit the generated signal;
a notification device configured to:
   receive the wireless signal; and
   provide a notification based on the received wireless signal;
wherein the accelerometer sensor is configured to generate a signal indicating that the flip window is in a third position between the closed position and the open position.

9. The product management and securement system of claim 8, wherein the flip window is sufficiently transparent so as to allow a user to see through the flip window and see products on the housing.

10. The product management and securement system of claim 8, wherein the generated signal indicates that the flip window is in the open position.

11. The product management and securement system of claim 8, wherein the notification device is mounted in proximity to the housing.

12. The product management and securement system of claim 8, wherein the notification device is mounted on a support structure.

13. The product management and securement system of claim 8, wherein the notification comprises an audible notification.

14. The product management and securement system of claim 8, wherein the notification comprises a visual notification.

15. A product management and securement system, comprising:
a support structure;
a flip window mounted to the support structure, wherein:
   the flip window is movable between an open position and a closed position;
   the flip window, when in the closed position, substantially obstructs access to the support structure;
an accelerometer sensor coupled to the flip window for movement with the flip window, the accelerometer sensor configured to generate a signal indicating movement of the flip window from the closed position toward the open position;
a processor configured to receive information from the accelerometer sensor regarding movement of the flip window, and configured to provide an audible notification upon receiving the signal indicating movement of the flip window;
a transmitter configured to emit a wireless signal to a remote processing device regarding movement of the flip window; and
a remote processing device configured to receive the signal sent from the transmitter, wherein the remote processing device is configured to provide an audible notification upon receiving the signal from the transmitter;
wherein the accelerometer sensor is configured to generate a signal indicating that the flip window is in a third position between the closed position and the open position.

16. The product management and securement system of claim 15, wherein the processor is configured to provide a notification that the flip window has been in the open position for a predetermined time period.

17. A product management and securement system, comprising:
multiple product display systems, each product display system comprising at least one housing;
a first housing associated with one of the multiple product display systems;
a flip window mounted to the first housing, wherein:
   the flip window is movable between an open position and a closed position;
   the flip window, when in the closed position, substantially obstructs access to the first housing;
an accelerometer sensor coupled to the flip window for movement with the flip window, the accelerometer sensor configured to generate a signal indicating movement of the flip window from the closed position to the open position;
a processor configured to receive information from the accelerometer sensor regarding movement of the flip window, and configured to provide an audible notification upon receiving the signal indicating movement of the flip window;
a transmitter attached to the first housing and configured to emit a wireless signal to a remote processing device regarding movement of the flip window; and
a remote processing device configured to receive the signals sent from the transmitter, wherein the remote processing device is configured to provide an audible notification upon receiving at least one signal from the transmitter;

wherein the accelerometer sensor is configured to generate a signal indicating that the flip window is in a third position between the closed position and the open position.

18. The product management and securement system of claim 17, wherein the remote processing device is configured to provide an audible notification upon receiving at least one signal from the transmitter indicating the flip window has been in the open position for a predetermined time period.

19. The product management and securement system of claim 17, wherein the remote processing device is configured to provide an audible notification upon receiving at least one signal from the transmitter indicating that the flip window is in the open position.

20. The product management and securement system of claim 15, wherein the flip window is sufficiently transparent so as to allow a user to see through the flip window.

21. The product management and securement system of claim 15, wherein the support structure is configured to support a hanging product.

22. The product management and securement system of claim 15, wherein the support structure includes a support surface configured to support a product.

* * * * *